United States Patent
Svedman et al.

(10) Patent No.: US 12,256,407 B2
(45) Date of Patent: Mar. 18, 2025

(54) RELIABILITY ENHANCEMENT FOR PDCCH

(71) Applicant: IPLA HOLDINGS INC., New York, NY (US)

(72) Inventors: Patrick Svedman, Wilmington, DE (US); Mohamed Awadin, Wilmington, DE (US); Qing Li, Wilmington, DE (US); Yifan Li, Wilmington, DE (US); Allan Tsai, Wilmington, DE (US); Pascal Adjakple, Wilmington, DE (US)

(73) Assignee: IPLA HOLDINGS INC., New York, NY (US)

( * ) Notice: Subject to any disclaimer, the term of this patent is extended or adjusted under 35 U.S.C. 154(b) by 350 days.

(21) Appl. No.: 17/797,730

(22) PCT Filed: Feb. 12, 2021

(86) PCT No.: PCT/US2021/017760
§ 371 (c)(1),
(2) Date: Aug. 5, 2022

(87) PCT Pub. No.: WO2021/163408
PCT Pub. Date: Aug. 19, 2021

(65) Prior Publication Data
US 2023/0076897 A1      Mar. 9, 2023

Related U.S. Application Data

(60) Provisional application No. 62/976,095, filed on Feb. 13, 2020.

(51) Int. Cl.
*H04L 5/00*       (2006.01)
*H04W 72/23*    (2023.01)

(52) U.S. Cl.
CPC .......... *H04W 72/23* (2023.01); *H04L 5/0048* (2013.01); *H04L 5/0053* (2013.01); *H04L 5/0094* (2013.01)

(58) Field of Classification Search
None
See application file for complete search history.

(56) References Cited

U.S. PATENT DOCUMENTS 10,164,754 B1 * 12/2018 Patel ..................... H04L 5/0053
2019/0281587 A1   9/2019 Zhang
(Continued)

FOREIGN PATENT DOCUMENTS

| CN | 110049561 A | 7/2019 |
| CN | 110474751 A | 11/2019 |

(Continued)

OTHER PUBLICATIONS

International Search Report and Written Opinion mailed on May 14, 2021, received for PCT Application PCT/US2021/017760, filed on Feb. 12, 2021, 14 pages.

*Primary Examiner* — Ajit Patel
(74) *Attorney, Agent, or Firm* — XSENSUS LLP

(57) ABSTRACT

Systems and methods for PDCCH reliability are disclosed. The PDCCH may be improved by introducing multi-TRP, multi-beam or repeated, PDCCH transmission and reception. In some methods and systems, PDCCH is transmitted on multiple CORESETs (Control Resource Set), where each CORESET is associated with a TCI state. In some cases, it is beneficial if a UE can determine that multiple received DCIs are duplicates, in order not to duplicate the corresponding UE action. Methods and systems for DCI duplication determination are disclosed. In some methods and systems, PDCCH is transmitted in a single CORESET, where the CORESET is associated with multiple TCI states. Various ways to apply the different TCI states to different disjoint frequency parts of the CORESET or the whole CORESET are proposed. Furthermore, the TCI state used for PDCCH may be used for subsequent PDSCH reception as well, in some cases. The disclosure also presents methods
(Continued)

and systems on how to apply multiple TCI states of a received PDCCH to a subsequent PDSCH reception.

20 Claims, 21 Drawing Sheets

(56) References Cited

U.S. PATENT DOCUMENTS

| | | |
|---|---|---|
| 2019/0297603 A1 | 9/2019 | Guo et al. |
| 2019/0297637 A1 | 9/2019 | Liou |
| 2020/0107353 A1* | 4/2020 | Jung .................... H04W 72/23 |
| 2020/0221428 A1 | 7/2020 | Moon et al. |
| 2020/0259896 A1* | 8/2020 | Sachs ................ H04W 56/0065 |

FOREIGN PATENT DOCUMENTS

| | | |
|---|---|---|
| CN | 110519843 A | 11/2019 |
| CN | 111431685 A | 7/2020 |
| EP | 3606129 A1 | 2/2020 |
| WO | 2019/031850 A1 | 2/2019 |
| WO | WO-2019066618 A1 | 4/2019 |
| WO | WO-2019244222 A1 | 12/2019 |

* cited by examiner

RELIABILITY ENHANCEMENT FOR PDCCH

CROSS REFERENCE TO RELATED APPLICATIONS

This application is based on PCT filing PCT/US2021/017760, filed Feb. 12, 2021, which claims the benefit of U.S. Provisional Patent Application No. 62/976,095, filed on Feb. 13, 2020, entitled "RELIABILITY ENHANCEMENT FOR PDCCH," the contents of each are hereby incorporated by reference herein.

BACKGROUND

A challenge for ultra-reliable and low latency wireless communication is the sudden deterioration of radio conditions that may happen due to UE mobility and a dynamic environment. For example, the channel between the UE and the serving TRP (transmission- or reception-point) may be suddenly blocked, for example by a building or a truck. This phenomenon is particularly pronounced in the millimeter wave spectrum. Such sudden deep fading of the radio channel may prohibit ultra-reliable and low latency communication.

In most cellular communication systems, the downlink control channel, for example the PDCCH (Physical Downlink Control Channel) in 3GPP NR, is a significant for maintaining a link, since it can be used for purposes such as select a beam or TRP for a subsequent DL or UL data transmission, adapt the modulation and coding scheme on a data transmission, schedule retransmissions of data transmission and rapidly increase UL transmit power. The subsequent data transmission, e.g. NR PDSCH or PUSCH (Physical Downlink Shared Channel or Physical Uplink Shared Channel), are also significant since they can be used to report beam failure or reconfigure the link, but they typically rely on the downlink control channel for being scheduled in the first place and for retransmissions. Hence, improved reliability of the downlink control channel, e.g. NR PDCCH, is significant to guarantee an ultra-reliable and low-latency communication link, especially in millimeter wave spectrum.

SUMMARY

System and methods that may improve reliability of a Physical Downlink Control Channel (PDCCH) in a communication network are disclosed. A process for providing a PDCCH may include transmitting, via a plurality of transmission mediums and to a user device, PDCCH transmissions. The plurality of transmission mediums may be at least one of a transmission from a plurality of Transmission/Reception Points (TRP)s, multi-beam transmission, and repeated transmission of the PDCCH transmissions. The PDCCH may be transmitted on a plurality of Control Resource Sets (CORESET)s wherein each of the plurality of CORESETs is associated with a Transmission Control Indicator (TCI) state. The PDCCH may also be transmitted on a single Control Resource Set (CORESET) and the single CORESET is associated with a plurality of Transmission Control Indicator (TCI) states.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF THE DRAWINGS

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive eCall, disaster alerts, real-time gaming, multi-person video calls, autonomous driving, augmented reality, tactile internet, and virtual reality to name a few. All of these use cases and others are contemplated herein.

Figure 1A:
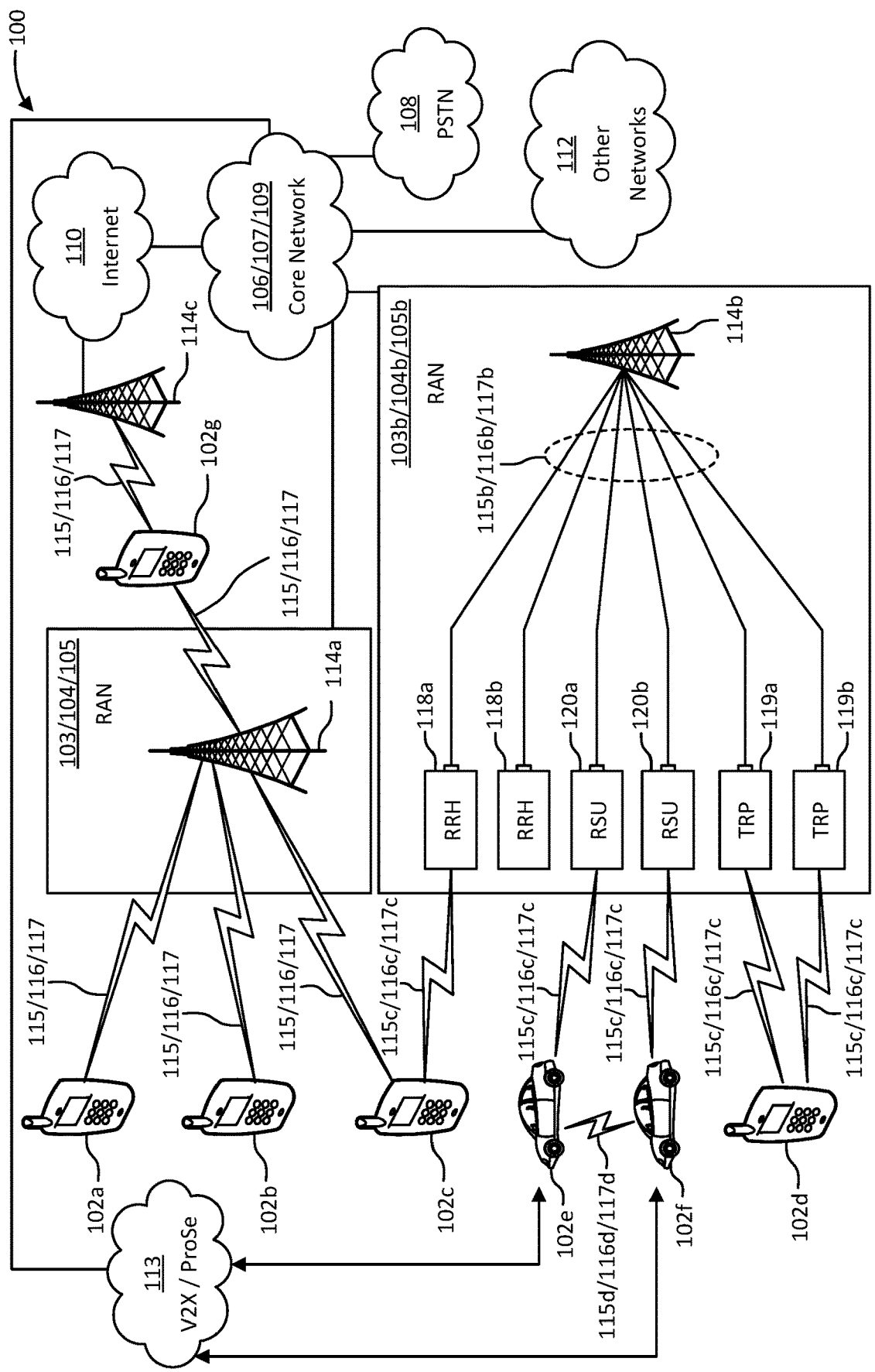
FIG. 1A illustrates an example communications system in which the methods and apparatuses described and claimed herein may be embodied.

FIG. 1A illustrates one embodiment of an example communications system 100 in which the methods and apparatuses described and claimed herein, such as described in and associated with FIG. 2-FIG. 15. As shown, the example communications system 100 may include wireless transmit/receive units (WTRUs) 102a, 102b, 102c, 102d, 102e, 102f, or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, or network elements. Each of the WTRUs 102a, 102b, 102c, 102d, 102e, 102f, 102g may be any type of apparatus or device configured to operate or communicate in a wireless environment. Although each WTRU 102a, 102b, 102c, 102d, 102e, 102f, 102g is depicted in FIG. 1A-FIG. 1E as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, or the other networks 112. Base stations 114b may be any type of device configured to wiredly or wirelessly interface with at least one of the RRHs (Remote Radio Heads) 118a, 118b, TRPs (Transmission and Reception Points) 119a, 119b, or RSUs (Roadside Units) 120a and 120b to facilitate access to one or more communication networks, such as the core network 106/107/109, the Internet 110, the other networks 112, or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, or the other networks 112. TRPs 119a, 119b may be any type of device configured to wirelessly interface with at least one of the WTRU 102d, to facilitate access to one or more communication networks, such as the core network 106/107/109, the Internet 110, or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations or network elements.

The base station 114a may be part of the RAN 103/104/105, which may also include other base stations or network elements (not shown), such as a base station controller (BSC), a radio network controller (RNC), relay nodes, etc. The base station 114b may be part of the RAN 103b/104b/105b, which may also include other base stations or network elements (not shown), such as a base station controller (BSC), a radio network controller (RNC), relay nodes, etc. The base station 114a may be configured to transmit or receive wireless signals within a particular geographic region, which may be referred to as a cell (not shown). The base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT). The base stations 114b may communicate with one or more of the RRHs 118a, 118b, TRPs 119a, 119b, or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT)

The WTRUs 102a, 102b, 102c, 102d, 102e, 102f, or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an embodiment, the base station 114a and the WTRUs 102a, 102b, 102c, or RRHs 118a, 118b, TRPS 119a, 119b, or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114a in the RAN 103/104/105 and the WTRUs 102a, 102b, 102c, or RRHs 118a, 118b, TRPS 119a, 119b or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., or perform high-level security functions, such as user authentication.

Although not shown in FIG. 1A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include another core network connected to one or more RANs, which may employ the same RAT as the RAN 103/104/105 or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
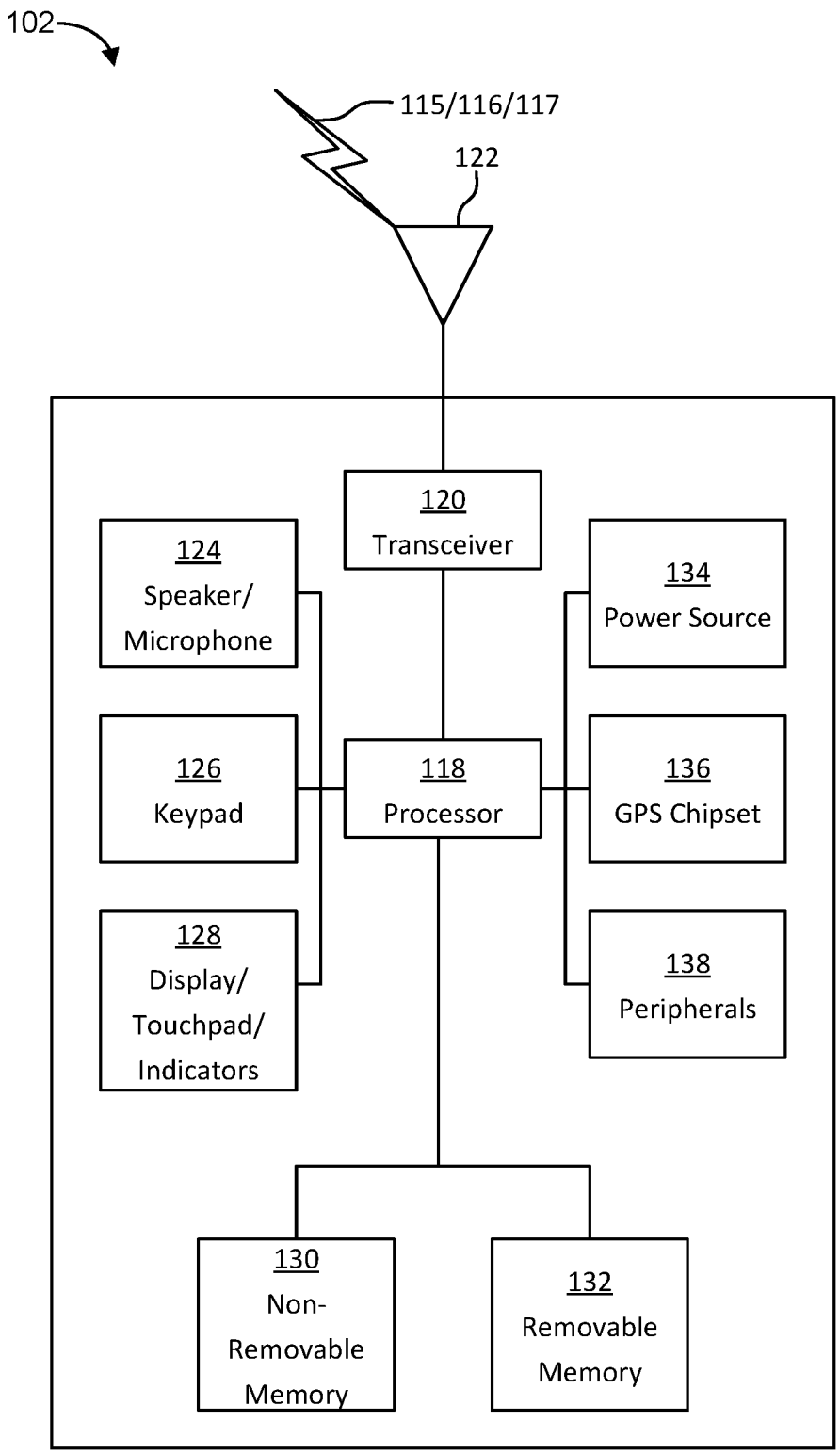
FIG. 1B illustrates a block diagram of an example apparatus or device configured for wireless communications.

FIG. 1B is a block diagram of an example apparatus or device configured for wireless communications in accordance with the embodiments illustrated herein, such as for example, a WTRU 102 (e.g., UEs described with association of FIG. 2-FIG. 15). As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit or receive RF signals. In an embodiment, the transmit/receive element 122 may be an emitter/detector configured to transmit or receive IR, UV, or visible light signals, for example. In yet an embodiment, the transmit/receive element 122 may be configured to transmit and receive both RF and light signals. It will be appreciated that the transmit/receive element 122 may be configured to transmit or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit). The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software or hardware modules that provide additional features, functionality or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
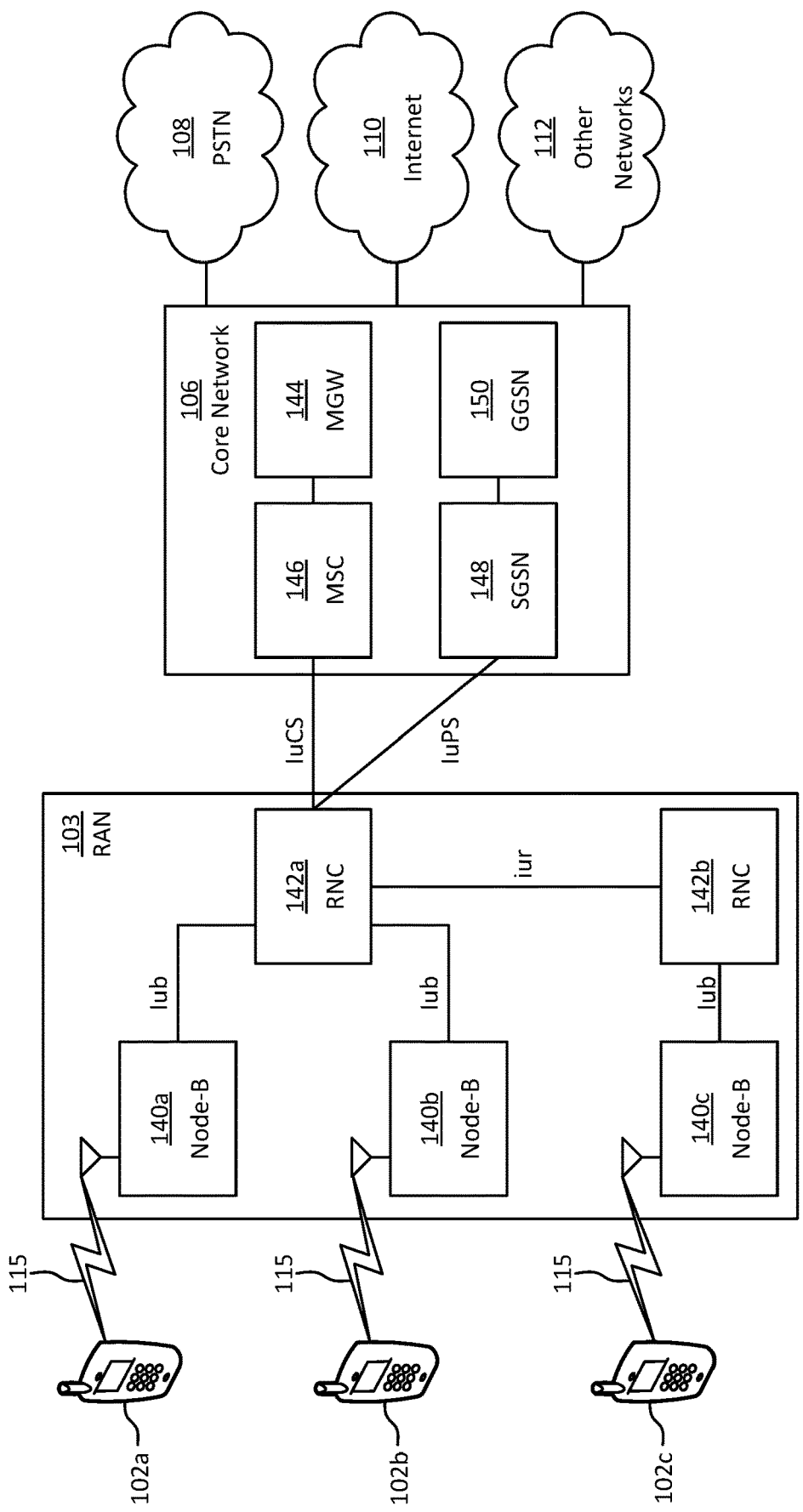
FIG. 1C illustrates a system diagram of an example radio access network (RAN) and core network.

FIG. 1C is a system diagram of the RAN 103 and the core network 106 according to an embodiment, such as described in and associated with FIG. 2-FIG. 15. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, or a gateway GPRS support node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned or operated by other service providers.

Figure 1D:
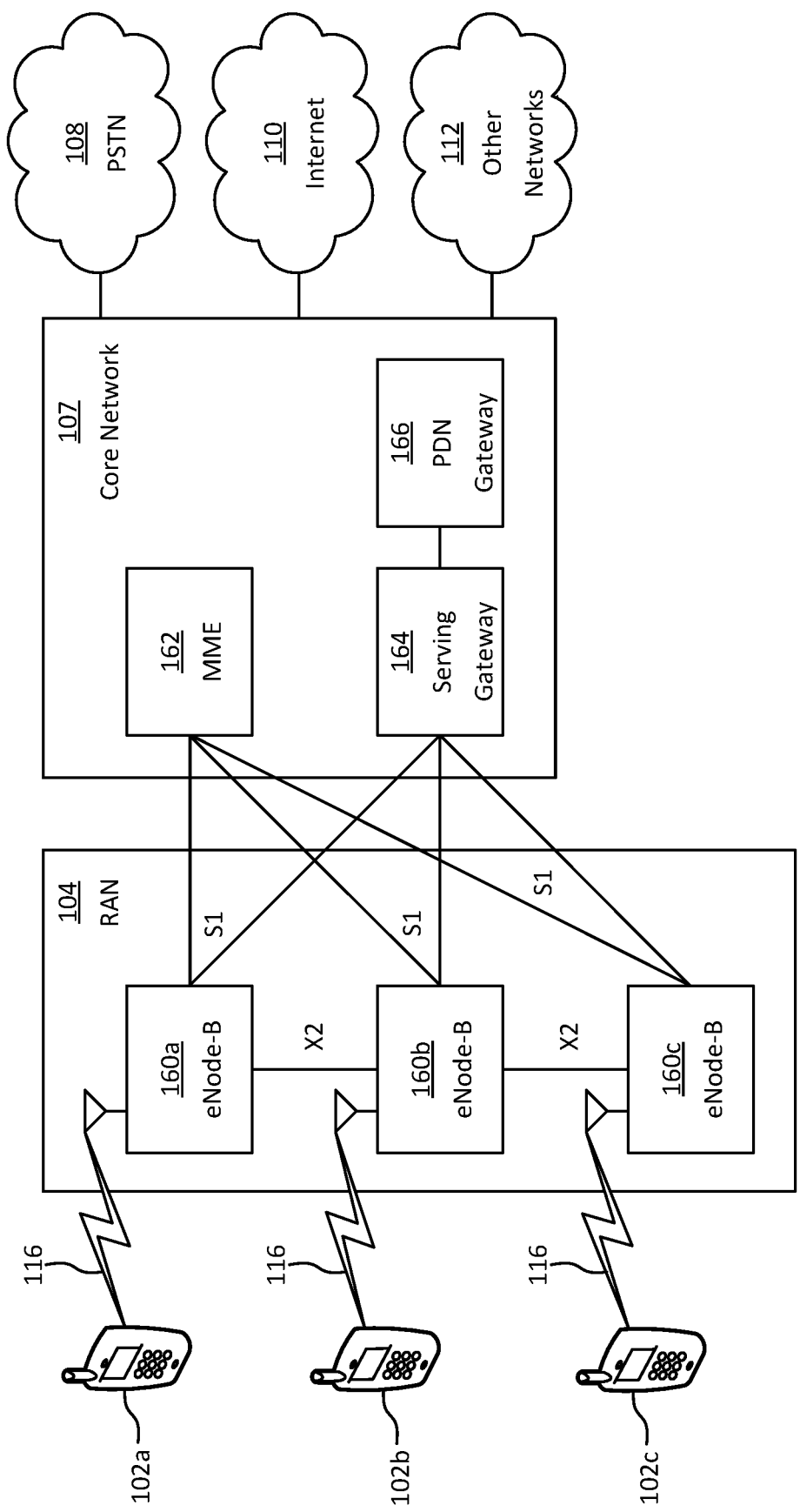
FIG. 1D illustrates a system diagram of another example RAN and core network.

FIG. 1D is a system diagram of the RAN 104 and the core network 107 according to an embodiment, such as described in and associated with FIG. 2-FIG. 15. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned or operated by other service providers.

Figure 1E:
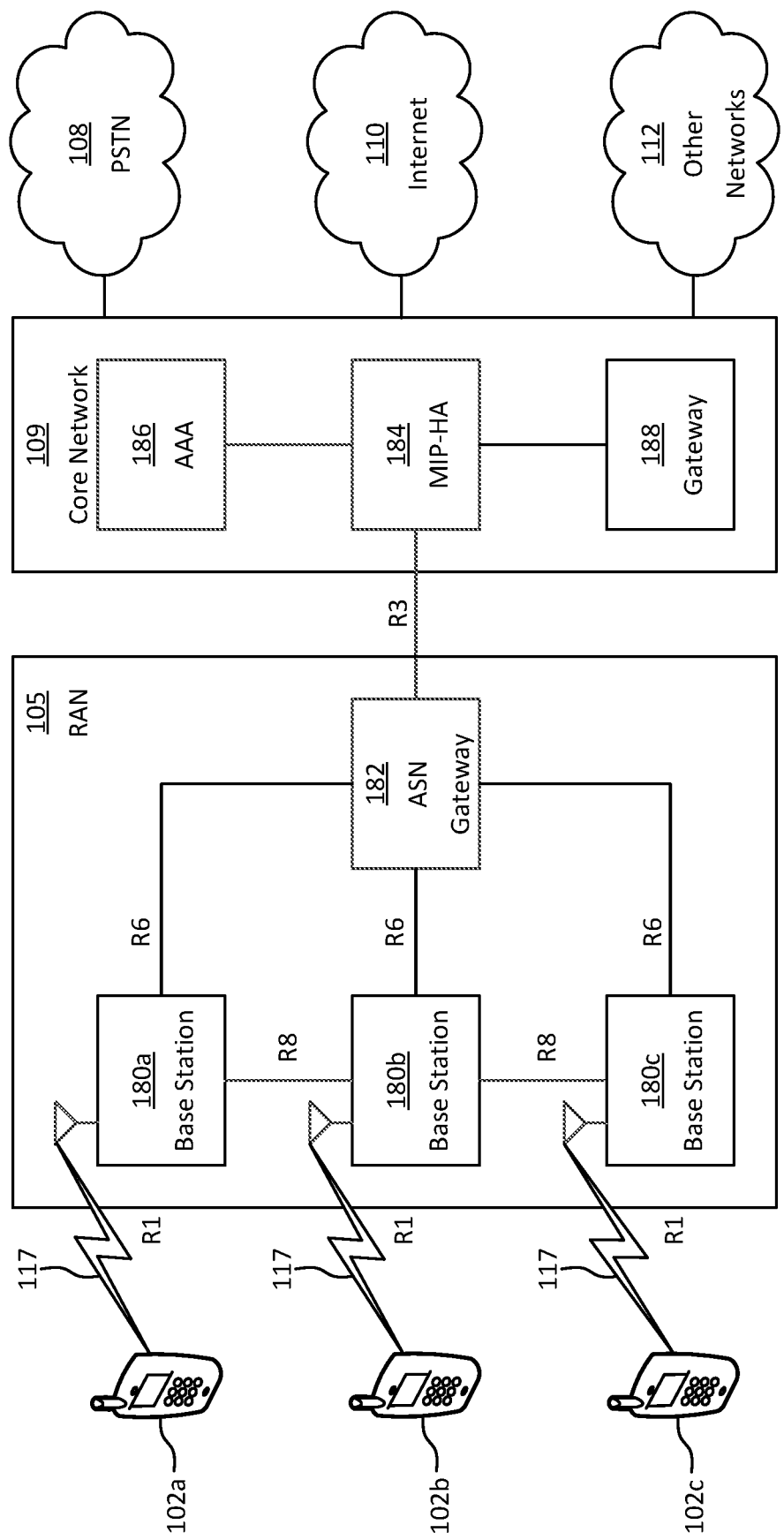
FIG. 1E is a system diagram of another example RAN and core network.

FIG. 1E is a system diagram of the RAN 105 and the core network 109 according to an embodiment, such as described in and associated with FIG. 2-FIG. 15. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell in the RAN 105 and may include one or more transceivers for communicating with the WTRUs 102*a*, 102*b*, 102*c* over the air interface 117. In an embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned or operated by an entity other than the core network operator.

The MIP-HA may be responsible for IP address management, and may enable the WTRUs 102*a*, 102*b*, and 102*c* to roam between different ASNs or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIG. 1A, FIG. 1C, FIG. 1D, and FIG. 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 1A—FIG. 1E are provided by way of example only, and it is understood that the subject matter disclosed and claimed herein may be embodied or implemented in any similar communication system, whether presently defined or defined in the future.

Figure 1F:
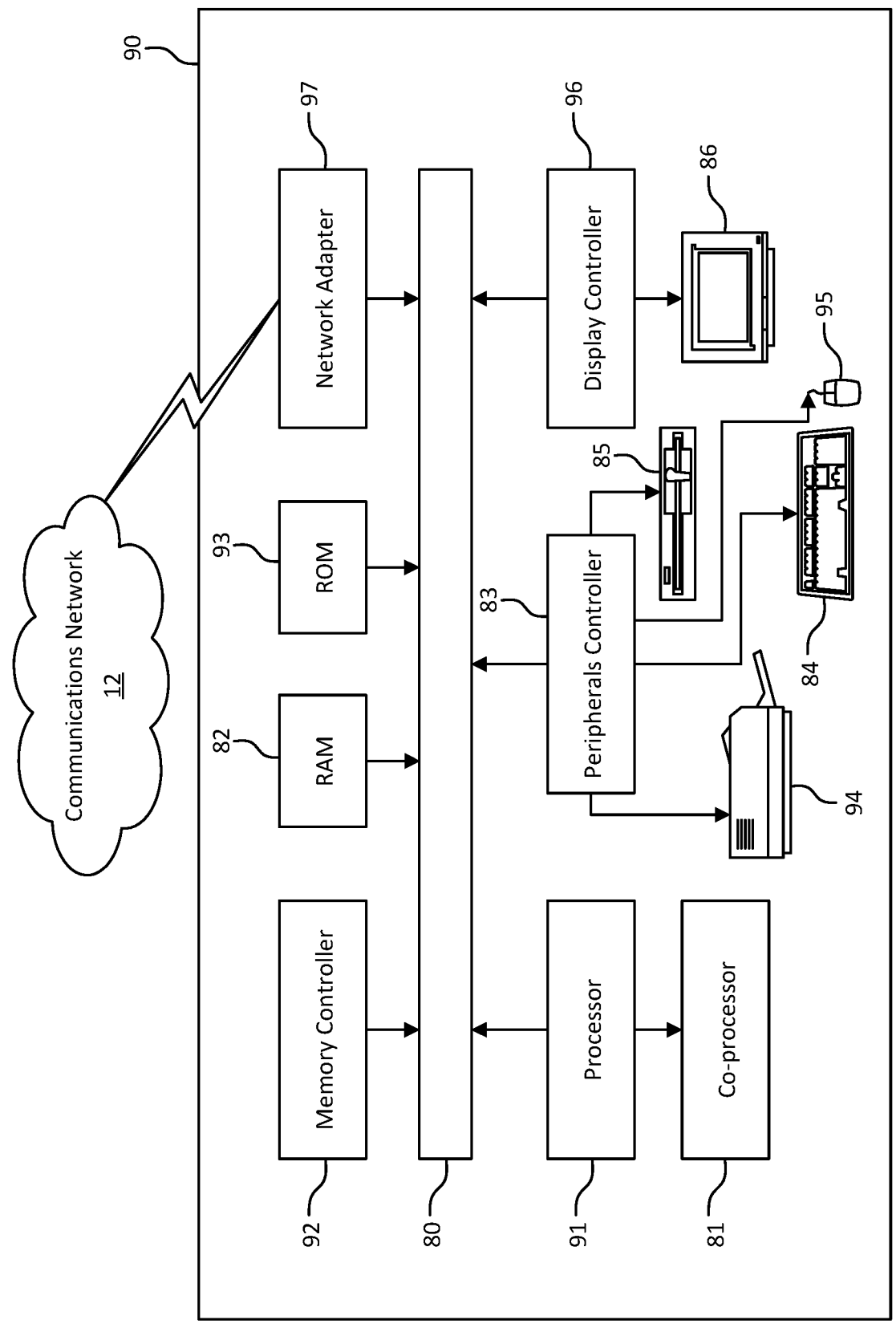
FIG. 1F illustrates a block diagram of an example computing system.

FIG. 1F is a block diagram of an exemplary computing system 90 in which one or more apparatuses of the communications networks illustrated in FIG. 1A, FIG. 1C, FIG. 1D and FIG. 1E may be embodied, such as certain nodes or functional entities in the RAN 103/104/105, Core Network 106/107/109, PSTN 108, Internet 110, or Other Networks 112 that may be described and associated with FIG. 2-FIG. 15. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory coupled with system bus 80 include random access memory (RAM) 82 and read only memory (ROM) 93. Such memory include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a network adapter 97, that may be used to connect computing system 90 to an external communications network, such as the RAN 103/104/105, Core Network 106/107/109, PSTN 108, Internet 110, or Other Networks 112 of FIG. 1A—FIG. 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
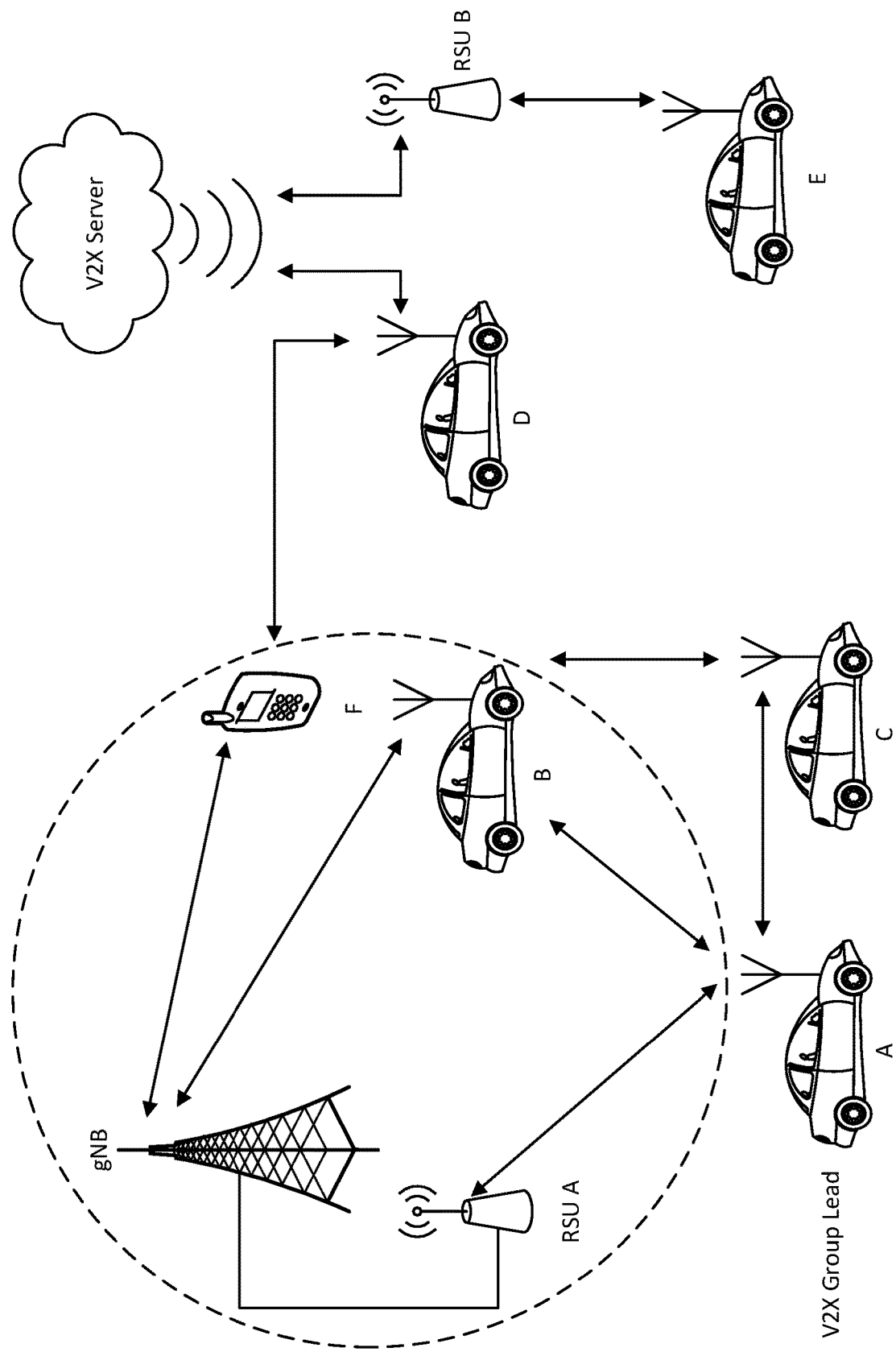
FIG. 1G illustrates a block diagram of another example communications system.

FIG. 1G illustrates one embodiment of an example communications system 111 in which the methods and apparatuses described and claimed herein may be embodied, such as described in and associated with FIG. 2-FIG. 15. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless network communications or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Control Resource Set (CORESET)

A bandwidth part (BWP) may be configured with one or more CORESETs. A CORESET configuration relates to many aspects of PDCCH reception.

A CORESET can be configured with one or more of the following parameters: a CORESET identity (e.g. controlResourceSetId), frequency domain resources, time duration, control channel element (CCE) to Resource Element Group (REG) bundle mapping type (e.g. cce-REG-MappingType), configuration associated with CCE to REG bundle mapping type being interleaved, precoder granularity, list of TCI state IDs, indication whether a TCI field is present or absent in DL-related DCI (e.g. tci-PresentInDCI), PDCCH DMRS scrambling sequence initialization ID (e.g. pdcch-DMRS-ScramblingID), or CORESET pool index, among other things.

With reference to frequency domain resources (e.g. frequencyDomainResources), a bitmap may be configured, where a bit represents a group of resource blocks (RBs), for example 6 RBs. The first bit may correspond to the first RB group in the BWP etc. A bit that is set to 1 indicates that this RB group belongs to the frequency domain resource of this CORESET.

Time duration: the time duration may be configured in a number of symbols (OFDM symbols), where the symbol duration is based on the sub-carrier spacing used in the BWP. The duration may be 1, 2, or 3 symbols.

Control channel Element (CCE) to Resource Element Group (REG) bundle mapping type (e.g. cce-REG-MappingType) may be interleaved or non-interleaved. If the CCE to REG bundle mapping type is interleaved, the following may be configured: 1) REG bundle size (e.g. reg-BundleSize), which may be 2, 3 or 6 REGs; 2) interleaver size (e.g. interleaverSize), which may be 2, 3 or 6; or 3) REG shift index (e.g. shiftIndex).

Precoder granularity (e.g. precoderGranularity), which defines over which REGs the UE may assume that the transmitter has used the same transmission scheme, e.g. precoding. One granularity may be according to REG bundle (e.g. sameAsREG-bundle), e.g., the UE may assume that within an REG bundle, the same transmission scheme (e.g. precoder) is used. In this case, the UE shall assume that the PDCCH DMRS are mapped only to REGs constituting the PDCCH the UE attempts to decode. One granularity may be according to set(s) of contiguous RBs (e.g. allContiguousRBs). In this case, the UE shall assume that the PDCCH DMRS are mapped to all REGs within the set of contiguous RBs in the CORESET where the UE attempts to decode the PDCCH.

A list of TCI state IDs (e.g. configured by tci-StatesPDCCH-ToAddList and tci-StatesPDCCH-ToReleaseList). The actual TCI states and corresponding IDs may be configured in IE PDSCH-Config.

A CORESET pool index (e.g. CORESETPoolIndex): A binary index can be used divide CORESETs into two pools. The two values can correspond to different TRPs. A PDCCH from a first TRP can be transmitted using a CORESET of a first pool. A PDCCH from a second TRP can be transmitted using a CORESET of a second pool. A UE can be configured to feed back HARQ-ACK separately for PDSCH(s) scheduled from the first pool and for PDSCH(s) scheduled from the second pool. This allows the TRPs to operate more independently, e.g. in terms of scheduling. This may be necessary in a scenario with non-ideal backhaul between the TRPs, e.g. with communication latency in the order of milliseconds or tens of millisecond.

Search Space Set

In some cases, a search space set is called search space. For example, "search space set" is used in some situations while "search space" is used in other situations. The terms will be used interchangeably herein.

A BWP may be configured with one or more search space sets. A search space set configuration relates to many aspects of PDCCH reception.

A search space set can be configured with at least the following parameters: search space set identity (e.g. searchSpaceId); an association between the search space set and a CORESET, for example by configuring a CORESET identity (e.g. controlResourceSetId); a PDCCH monitoring periodicity and monitoring offset (in reference to a certain system frame number) (e.g. monitoringSlotPeriodicityAndOffset); a PDCCH monitoring pattern within a slot, indicating first symbol(s) of the CORESET within a slot (e.g. monitoringSymbolsWithinSlot); a duration, e.g. the number of slots the search space set exists (e.g. duration); a number of PDCCH candidates per control channel element (CCE) aggregation level; an indication if the type of the search space set is common (CSS) or UE-specific (USS) (e.g. searchSpaceType); or DCI formats the UE shall monitor in the search space set, among other things.

There may be a number of PDCCH candidates per control channel element (CCE) aggregation level. Can be configured for example by parameter nrofCandidates which is a sequence of: 1) aggregationLevel1: the number of PDCCH candidates for CCE aggregation level 1; or 2) aggregationLevel2: the number of PDCCH candidates for CCE aggregation level 2; etc.

Problem Statement

The configured search space set and associated CORESET define how the UE shall receive PDCCH. Note that there are also other configurations with potential impact on PDCCH monitoring, such as transmitted SSBs, slot format, DRX, power saving, etc.

A challenge for ultra-reliable and low latency wireless communication is the sudden deterioration of radio conditions that may happen due to UE mobility and a dynamic environment. For example, the channel between the UE and the serving TRP (transmission- or reception-point) may be suddenly blocked, for example by a building or a truck. This phenomenon is particularly pronounced in the millimeter wave spectrum. Such sudden deep fading of the radio channel may prohibit ultra-reliable and low latency communication.

In most cellular communication systems, the downlink control channel, for example the PDCCH (Physical Downlink Control Channel) in 3GPP NR, is significant for maintaining a link, since it can be used for purposes such as select a beam or TRP for a subsequent DL or UL data transmission, adapt the modulation and coding scheme on a data transmission, schedule retransmissions of data transmission, or rapidly increase UL transmit power. The subsequent data transmission, e.g. NR PDSCH or PUSCH (Physical Downlink Shared Channel or Physical Uplink Shared Channel), are also significant since they can be used to report beam failure or reconfigure the link, but they typically rely on the downlink control channel for being scheduled in the first place and for retransmissions. Hence, improved reliability of the downlink control channel, e.g. NR PDCCH, may be significant to guarantee an ultra-reliable and low-latency communication link, especially in millimeter wave spectrum.

A way to address the challenge with sudden radio link blocking is to introduce diversity, for example in the form of multi-TRP communication. In multi-TRP communication links, the UE is simultaneously served by multiple TRPs, which are typically geographically separated. If the radio channel to one TRP is suddenly blocked, the communication link can still function properly by using the remaining serving TRPs.

PDCCH reliability can be achieved by introducing multi-TRP, multi-beam or repeated, PDCCH transmission and reception. A TRP or beam can correspond to a Transmission Configuration Indicator (TCI) state.

In some methods, PDCCH is transmitted on multiple CORESETs (Control Resource Set), where each CORESET is associated with a TCI state.

In some cases, it is beneficial if a UE can determine that multiple received DCIs are duplicates, in order not to duplicate the corresponding UE action. There are multiple methods that may address DCI duplication determination are disclosed herein.

In some cases, it is beneficial if a UE can determine a small set of PDCCH candidates over which the network will transmit a duplicated DCI or not transmit a DCI. With such prior knowledge, a UE can avoid unnecessary duplication actions and, in some cases, even perform DCI soft combining with limited additional complexity.

In some methods, PDCCH is transmitted in a single CORESET, where the CORESET is associated with multiple TCI states. Various ways to apply the different TCI states to different disjoint frequency parts of the CORESET or the whole CORESET are proposed.

Furthermore, the TCI state used for PDCCH may be used for subsequent PDSCH reception as well, in some cases. The disclosure also presents methods on how to apply multiple TCI states of a received PDCCH to a subsequent PDSCH reception.

PDCCH Resource

A time-frequency resource used for receiving a set of PDCCH candidates can be defined by a combination of a CORESET and a Search Space Set, in various cases. A CORESET configuration may define aspects related to frequency domain resources, time duration, beam/precoder assumptions, DMRS sequence, etc. A search space set configuration may define aspects related to where in time the time-frequency resource used for receiving a set of PDCCH candidates is, e.g. in which slots and in which symbols in a slot.

For brevity, a time-frequency resource used for receiving a set of PDCCH candidates is called a "PDCCH resource" herein. A PDCCH resource is an occasion of a CORESET, for example a particular set of PRBs in the first two symbols in a particular slot. Multiple PDCCH candidates may be received in a PDCCH resource, using the same or different aggregation levels. The time duration of a PDCCH resource may be the time duration of the CORESET.

Two different PDCCH resources may be associated with the same CORESET and search space set, or the same CORESET but different search space sets, or different CORESETs but the same search space set, or different CORESETs and search space sets.

In some cases, PDCCH resource is equivalent or identical to "PDCCH monitoring occasion", e.g. as defined in 38.213. In some cases, PDCCH monitoring occasion refers to the time domain component of PDCCH resource.

Figure 2:
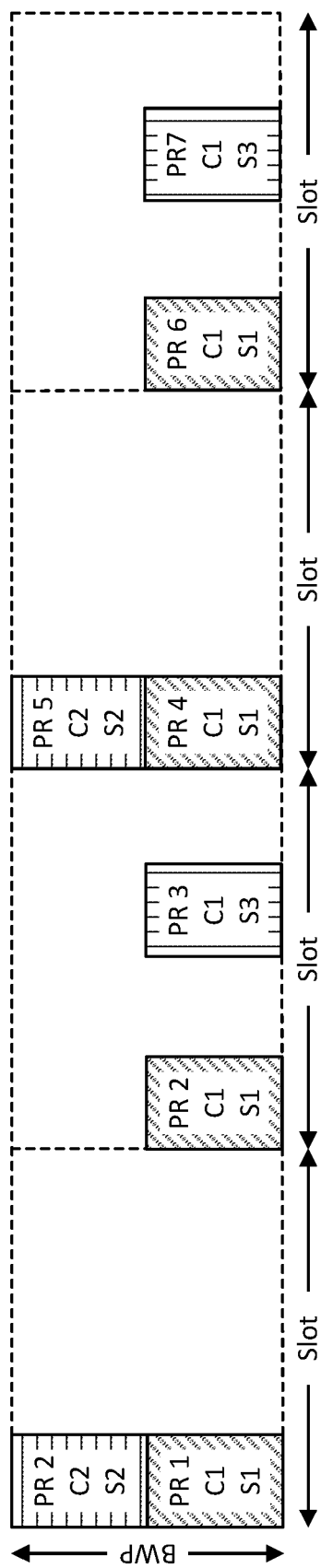
FIG. 2 illustrates seven PDCCH resources (PR1-PR7) in a BWP during four slots, based on three combinations of CORESET (C1 and C2) and associated search space set (S1, S2, and S3).

FIG. 2 illustrates seven PDCCH resources (abbreviated PR 1 to PR 7 in the figure) in a BWP in four consecutive slots. The PDCCH resource indexing is added for illustrative purposes. There might not be any explicit indexing or number of PDCCH resources. Two CORESETs (C1 and C2) and three corresponding search space sets (S1, S2, and S3) are shown. The first search space set (S1) has periodicity 1 slot, starts in the beginning of the slot, and is associated with CORESET C1. The second search space set (S2) has periodicity 2 slots, starts in the beginning of the slot, and is associated with CORESET C2, which occupies different PRBs than the first CORESET C1. The third search space set (S3) also has periodicity 2 slots but an additional slot offset, starts in the middle of the slot, and is also associated with CORESET C1. In other words, CORESET C1 is associated with two different search space sets (S1 and S3).

Time-(in)Sensitive DCI, Duplication-(in)Sensitive DCI

The following terms will be used herein:

Time-Sensitive and Time-Insensitive DCI

The time instance a UE performs a procedure following the reception of a DCI typically depends on the time instance the corresponding PDCCH was received. For example, if the DCI schedules a PUSCH transmission, the UE transmits the PUSCH a certain number of symbols or slots after the slot the PDCCH was received.

In some cases, the UE behavior also depends on in which symbol(s) in a slot a PDCCH carrying a DCI is received. For example, if a PDCCH scheduling a PDSCH with a certain timing is received in the first symbol in a slot, the UE shall use a TCI state indicated in the DCI to receive the scheduled PDSCH. If, on the other hand, the PDCCH is received later in the same slot, e.g. in symbol 7, the UE shall use a default TCI state to receive the scheduled PDSCH.

A DCI may be time-insensitive within a certain time interval. This means that the UE behavior, as indicated by the DCI, is identical regardless of the symbol(s) (within the time interval) on which the DCI is transmitted/received. If, on the other hand, the UE behavior, as indicated by the DCI, depends on in which symbol(s) (within the time interval) the DCI is transmitted/received, the DCI is time-sensitive.

For example, the UE behavior may be identical if the corresponding PDCCH is received during any symbol(s) within a slot, but different if the PDCCH is received in another slot.

Note that a DCI of certain DCI format may be time-sensitive in some cases and time-insensitive in some cases.

In some cases, it may be undefined if a DCI is time-sensitive or time-insensitive.

Note that the last symbol of a PDCCH may be equivalent to the last symbol of the PDCCH resource used for receiving the PDCCH (or PDCCH candidate). Similarly, the first symbol of a PDCCH may be equivalent to the first symbol of the PDCCH resource used for receiving the PDCCH (or PDCCH candidate).

Duplication-Sensitive and Duplication-Insensitive DCI

For a duplication-sensitive DCI, the UE behavior would be different if the UE simultaneously received multiple (duplicated) identical DCIs, rather than a single DCI. For a duplication-insensitive DCI, the UE behavior wouldn't change. Two DCIs may be considered to be identical if the DCI format, RNTI, and all parameter values, are the same.

For example, consider a UE that simultaneously receives a duplicated DCI with an activation of a semi-persistently scheduled UL grant. This DCI would be duplication-insensitive since duplicated activation results in activation, which is the same behavior as without duplication.

In another example, consider a UE that simultaneously receives a duplicated DCI with a transmit power control (TPC) command in the case that the UE performs TPC command accumulation. This DCI would be duplication-sensitive since a duplicated TCP command would result in multiple accumulations, which results in a different UE behavior than if the DCI wasn't duplicated.

In some cases, it may be undefined, e.g. in the specification, if a DCI is duplication-sensitive or duplication-insensitive, e.g., the corresponding UE behavior might not be described, or it is described to be up to the UE.

Multi-TRP transmission of PDCCH is a use case for improved PDCCH reliability. However, the network topology may be transparent to the UE, which means that a UE may not be able to distinguish different TRPs from different beams. This means that methods herein are also applicable to single-TRP transmission of PDCCH, for example PDCCH transmissions across multiple Tx beams of a single TRP, or a combination of multiple Tx beams from multiple TRPs. Additionally, methods herein may also apply to a case with PDCCH repetition on the same beam. Also, the case with a combination of PDCCH repetition on particular beam(s) and across different beams or TRPs is applicable. For simplicity, the multi-TRP PDCCH terminology is used herein, with the understanding that it also includes the cases discussed above.

The methods herein can be applied to a serving cell of a UE. The methods can be applied to the scenario of self-scheduling (PDCCH transmitted in a cell schedules a transmission in the same cell) or cross-carrier scheduling (PDCCH transmitted in a cell schedules a transmission in another cell).

For simplicity, the methods described herein mainly use the example of transmission from two TRPs, e.g. two different values of the CORESET parameter CORESET-PoolIndex. However, the methods are readily applicable to more than two TRPs or to a single TRP case.

Examples herein with RRC information elements (IE) and parameters are from NR specification 38.331.

A TCI state may comprise one or more pieces of QCL information. A piece of QCL information may indicate one or more RS and associated QCL type(s), e.g. which kind of information that can be estimated or derived from the RS. If a first TCI states includes a first RS that is transmitted from a first TRP and a second TCI state includes a second RS that is transmitted from a second TRP, the TCI states may be associated with the corresponding TRPs.

Overview of Methods for Multi-TRP PDCCH

Various methods to the multi-TRP PDCCH problem are presented. The following frameworks are considered.

Framework 1

Methods are based on the assumption that a CORESET may have at most one activated TCI state ID.

Framework 2

Methods are based on the assumption that a CORESET may have multiple activated TCI state IDs.

Other Methods

Various other methods related to the multi-TRP (multi-TCI) PDCCH are discussed. For example, the reference timing may be an issue if a DCI is repeated across multiple TDMed PDCCH candidates, e.g. with different TCI state IDs. Methods may be based on the definition of a reference resource are disclosed below.

In many cases, the TCI state(s) used for receiving a PDSCH may be based on the TCI state(s) of a recently monitored CORESET or of the CORESET that carried the scheduling DCI. Various related problems arise when PDCCHs are associated with multiple TCI-states. Various methods and systems may address these problems are presented below.

Framework 1: One TCI State Activated Per CORESET

Overview

In Framework 1, it is assumed that at most one TCI state can be activated into the UE for a CORESET. Even though TCI state reconfiguration and switching for a CORESET is possible, this might not be sufficient, e.g., fast enough, for enabling PDCCH reception on two TCI states, which would enable two-TRP PDCCH, since TCI state switching/reconfiguration also involves PDCCH.

Hence, in Framework 1, transmission and reception of PDCCH(s) with two TCI states is achieved by involving multiple CORESETs, with each CORESET being associated with at most one TCI state.

The are several ways to achieve two-TRP PDCCH transmission, e.g. for increased reliability. The methods can for example be categorized according to the following: 1) the same DCI, with the same parameter values, is transmitted on two different PDCCH resources, e.g., the DCI is repeated; 2) separate DCIs are transmitted in two different PDCCH resources; or 3) single PDCCH, carrying a DCI, is transmitted across two PDCCH resources. With reference to two separate DCIs are transmitted in two different PDCCH resources, the separate DCIs may still refer to the same kind of UE action (e.g., dynamic scheduling of PDSCH or PUSCH). The parameters in the separate DCIs may have the same or different values.

With reference to a single PDCCH, carrying a DCI, transmitted across two PDCCH resources, the PDCCH may be mapped to CCEs in two different PDCCH resources.

In the state-of-the-art, configuration of multiple CORESETs in a BWP is already supported. In other words, a UE can receive PDCCHs from multiple TRPs. However, these PDCCHs carry different DCIs, which means that the reliability of an individual DCI cannot be enhanced through the diversity of multi-TRP reception. Different DCIs may mean that the DCIs are treated as different DCIs by a UE. Various methods herein address this short-coming of the state-of-the-art.

A baseline framework for PDCCH reception from two TRPs in a BWP in the case of one activated TCI state per CORESET is presented below. The network configures a set of TCI states in a BWP, e.g. in the configuration for PDSCH (e.g. in the PDSCH-Config IE), with each TCI state (e.g. a list of TCI-State IEs) being configured with a TCI state ID (e.g. with the TCI-StateId IE). The network configures a first set of TCI states for a first CORESET in the BWP and a second set of TCI states for a second CORESET in the BWP. The first set of TCI states may include a first subset of TCI states that correspond to transmission from a first TRP, a second subset of TCI states that correspond to transmission from a second TRP or a third subset of TCI states correspond to simultaneous transmission from multiple (e.g. both) TRPs. Similarly, the second CORESET may include such subsets. Note that one or more of these subsets may be empty. For example, the third set if simultaneous transmission from both TRPs is not used. In another example, a CORESET is configured with TCI states from a single TRP, e.g. a first or a second TRP. Note that the subsets may be transparent to the UE, e.g. the UE might not know to which set (if any) a particular TCI state belongs. Note that the configuration of a set of TCI states for a CORESET in a BWP may be achieved by configuring a list of TCI state IDs, which could refer to the TCI states and TCI state IDs configured for PDSCH in the same BWP. The network may also configure a CORESET pool index (e.g. CORESET-PoolIndex) for some CORESETs in a BWP, e.g. all CORESETs. Different CORESETs configured in a BWP may be configured with the same or different CORESET pool indices. For instance, a first subset of CORESETs in the BWP may be configured with a first CORESET pool index and a second subset of CORESETs in the BWP may be configured with a second CORESET pool index. In some cases, a first subset of CORESETs with the same CORESET pool index are configured with TCI states corresponding to a first TRP and a second subset of CORESETs with the same CORESET pool index are configured with TCI states corresponding to a second TRP.

In Framework 1, it is assumed that at most one TCI state can be activated for a CORESET. If a CORESET is configured with multiple TCI states (e.g. by configuring multiple TCI state IDs), one of these TCI states can be activated by a MAC. For at least some of the CORESETs configured in the same BWP, different TCI states (e.g. different TCI state IDs) are simultaneously activated. For example, the first activated TCI state for a first CORESETs in the BWP may correspond to transmission from a first TRP and the second activated TCI state for a second CORESETs in the BWP may correspond to transmission from a second TRP. If a CORESET is configured with a single TCI state, this TCI state may be applicable (e.g. activated) to the CORESET without activation by MAC CE. In one example, four CORESETs are configured in a BWP. For the BWP, a first set of TCI states are configured that correspond to transmission from a first TRP and a second set of TCI states are configured that correspond to transmission from a second TRP. For two of the CORESETs, TCI states from the first set are configured and for the other two CORESETs, TCI states from the second set are configured. If a CORESET has been configured with more than one TCI state, but a TCI state has not been activated, the UE may assume that the DM-RS antenna port associated with PDCCH receptions is quasi co-located with the SS/PBCH block the UE identified during the initial access procedure.

With continued reference to the baseline framework, a UE receives PDCCH on a PDCCH resource, with the reception being based on the activated TCI state of the corresponding CORESET. For example, the UE assumes that the DM-RS antenna port associated with PDCCH receptions in the PDCCH resource is quasi co-located with the one or more DL RS configured by the activated TCI state.

A UE that successfully receives a PDCCH addressed to the UE, e.g. the scrambling of the CRC matches an RNTI monitored by the UE, shall typically follow the DCI carried by the PDCCH. In state-of-the-art systems, a UE that receives multiple PDCCH, each carrying a DCI, shall typically follow each DCI. However, in some cases, the UE may discard the DCI, e.g. if the information is invalid or inconsistent.

For example, for any HARQ process ID(s) in a given scheduled cell, a UE is not expected to receive a PDSCH that overlaps in time with another PDSCH. In other words, the two DCIs scheduling two PDSCH overlapping at least in time should indicate different HARQ process IDs.

In one example, a UE may receive two PDCCHs in a BWP, each PDCCH carrying a consistent DCI and each DCI scheduling a PDSCH transmission overlapping in time with the other PDSCH, where the DCI parameters (for example allocated time and frequency resources, RV, or MCS) are identical, except the HARQ process ID. In some cases, also the downlink assignment index (DAI), e.g. the counter part of the DAI, in the two DCIs need to be different for the DCIs to be consistent, for example if the two PDCCHs are received in the same PDCCH monitoring occasion. In such cases, both DCIs would be consistent and valid, and the UE would expect two separate overlapping PDSCHs.

In another example, for any HARQ process ID(s) in a given scheduled cell, a UE is not expected to transmit a PUSCH that overlaps in time with another PUSCH. Furthermore, the UE is not expected to be scheduled to transmit another PUSCH (e.g. by DCI format 0_0, 0_1 or 0_2 scrambled by C-RNTI or MCS-C-RNTI) for a given HARQ process until after the end of the expected transmission of the last PUSCH for that HARQ process. In other words, the two DCIs scheduling two PUSCH overlapping at least in time should indicate at least different HARQ process IDs to be valid.

Figure 3:
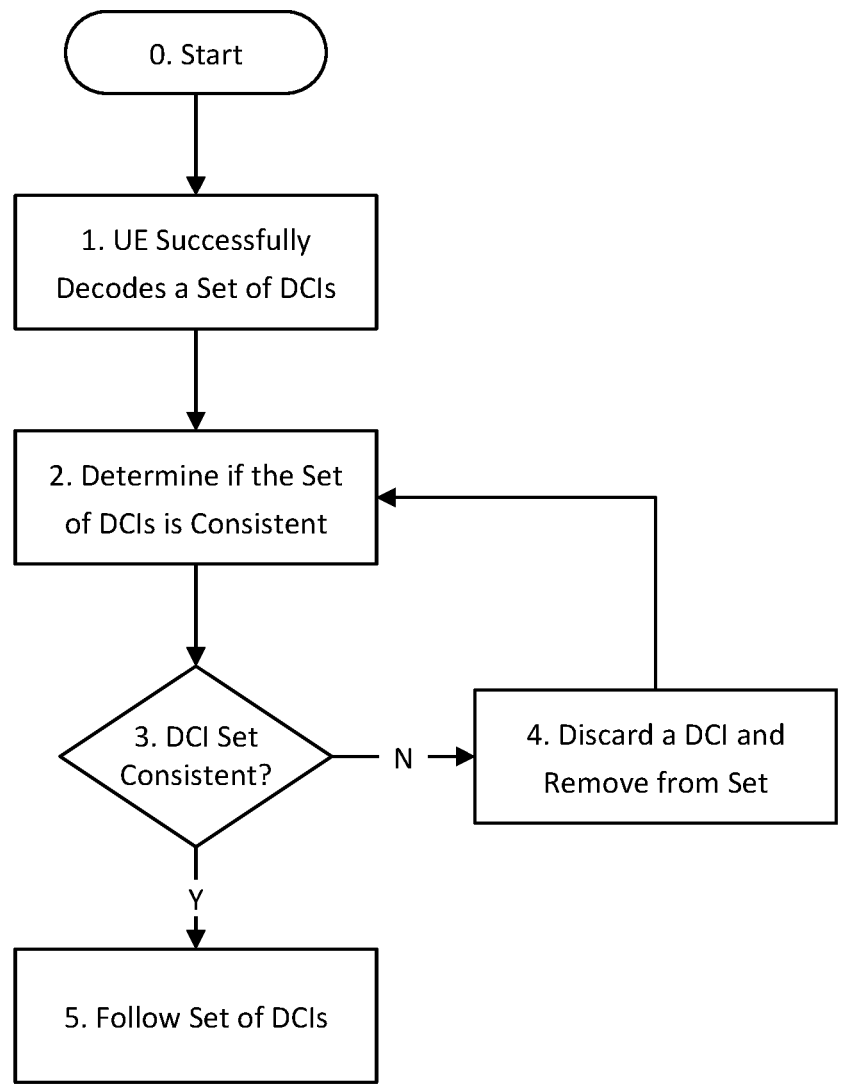
FIG. 3 illustrates a procedure performed by a UE to handle a set of DCIs that are not consistent.

It is significant to be able to schedule a single PDSCH or PUSCH transmission, also in some cases in which a DCI is repeated. To this end, in some cases, DCI repetition across multiple PDCCHs that are transmitted in different PDCCH resources does not seem to introduce any problems at the UE or network side, e.g. for the case that the DCIs schedule PDSCH or PUSCH overlapping in time on the same HARQ process and the multiple PDCCH are received in the same symbol(s). If the UE successfully receives just a single DCI, it follows the DCI. In some cases, if the UE successfully receives multiple DCIs, each DCI scheduling a PDSCH or PUSCH overlapping in time on the same HARQ process, the UE could discard all DCIs but one, since they would be invalid or inconsistent. A remaining valid DCI could be determined to be valid after the other DCIs have been discarded as invalid. Such a procedure is illustrated in FIG. 3. FIG. 3: Illustration of UE procedure to handle a set of DCIs that is not consistent. In step 201, UE successfully decodes a set of DCIs. In step 202, the UE evaluates if the DCIs in the set are consistent and valid, both one-by-one and together. For example, a first DCI may be consistent/valid by itself, but it may be inconsistent/invalid in relation to a second DCI in the set, e.g. since it schedules a first PDSCH on resources overlapping with a second PDSCH scheduled by the second DCI on the same HARQ process ID. See step 203. In step 204, the UE discards a DCI from the set according to some criterion. For example, the UE first discards any DCI that is inconsistent/invalid by itself. Secondly, the UE discards any DCI that is consistent/valid by itself, but inconsistent/invalid in relation to another DCI in the set, for example in the order or reverse order the DCIs were received, or in the order or reverse order of CORESET ID on which the DCIs were received. Step 205, the follow set of DCIs.

However, in some cases, a UE that successfully receives and decodes a set of DCIs, each DCI scheduling a PDSCH or PUSCH overlapping in time on the same HARQ process, the UE could discard all DCIs, since they would all be invalid/inconsistent. In this case, multi-TRP PDCCH might not function properly, since it would typically be more likely that multiple PDCCH would be successfully received than that only a single PDCCH would be successfully received. The methods and systems are disclosed below.

Beside the examples with PDSCH and PUSCH scheduling, as discussed above, there are multiple other uses for DCI carried by PDCCH, some of which are briefly discussed below. In general, if multiple identical DCIs are received in the same symbol(s), this shouldn't cause any ambiguity, unless when noted.

A use for DCI carried by PDCCH may be scheduling, activation or release of semi-persistent scheduling (SPS) of PDSCH or for SPS of PUSCH (e.g. UL grant type 2 in NR). In some cases, a UE is expected to provide HARQ-ACK information in response to a SPS PDSCH release after N symbols from the last symbol of a PDCCH providing the SPS PDSCH release. Hence, a UE that receives multiple identical activation or release commands for SPS with different last symbols may experience an ambiguity.

A use for DCI carried by PDCCH may be PDCCH monitoring indication and dormancy/non-dormancy behavior for SCells.

A use for DCI carried by PDCCH may be search space set switching. The search space set switching time may depend on in which slot the DCI is received. Hence, a UE that receives multiple identical search space set switching indications in different slots may experience an ambiguity.

A use for DCI carried by PDCCH may be HARQ-ACK information for PUSCH transmissions. The validity of PUSCH HARQ-ACK information conveyed in a DCI may depend on the timing of the first symbol of the PDCCH that carries the DCI. Hence, a UE that receives multiple identical HARQ-ACK indications in PDCCHs with different first symbols may experience an ambiguity.

A use for DCI carried by PDCCH may be for paging and system information change notification or group-common slot format indication.

A use for DCI carried by PDCCH may be for group-common downlink preemption indication. The timing of the preempted symbols in the indication depend on the timing of the first symbol of the PDCCH that carried the DCI. Hence, a UE that receives multiple preemption indications in PDCCHs with different first symbols may experience an ambiguity.

A use for DCI carried by PDCCH may be for group-common UL cancellation indication. The timing of the cancelled symbols in the indication depend on the timing of the last symbol of the PDCCH that carried the DCI. Hence, a UE that receives multiple cancellation indications in PDCCHs with different last symbols may experience an ambiguity.

A use for DCI carried by PDCCH may be for group-common PUCCH, PUSCH and SRS TPC command. If TPC accumulation is enabled and if a UE receives multiple identical TPC commands, the UE may accumulate power multiple times, according to the multiple commands, also if the DCIs were received in the same symbol(s). This may be a problem, e.g. if the network intended to just transmit a single TPC command with higher reliability using multi-TRP PDCCH.

The multi-TRP transmission of group-common PDCCH can be a part of a beam sweeping of a group-common PDCCH, where a UE is configured to receive a subset of the beams/TRPs, e.g. two beams.

Note that in general any time-frequency relationship between the multiple PDCCH resources is considered herein, e.g., time-, frequency-, or spatial multiplexing as well as fully or partially overlapping PDCCH resources in time or frequency. The cases of time-, frequency- and spatial-multiplexing of PDCCH resources are discussed below.

TDM of PDCCH Resources

In some cases, PDCCH resources are multiplexed in time (TDMed), e.g. in partly overlapping or non-overlapping sets of symbols in a slot. In some cases, the TDMed PDCCH resources are associated (through the corresponding CORESETs) with different TCI states IDs, which may correspond to different TRPs or beams. TDM of two PDCCH resources is illustrated in FIG. 4.

TDM on non-overlapping sets of symbols of PDCCHs with different TCI states has the benefit that UEs may receive a single TCI state at a time, which may simplify UE implementation. For example, analog Rx beamforming using a single UE antenna panel, with a single receiver chain may be used. Such a UE may use a first Rx beam receiving the first PDCCH resource, then switch to a second Rx beam for receiving the second PDCCH resource.

Figure 4:
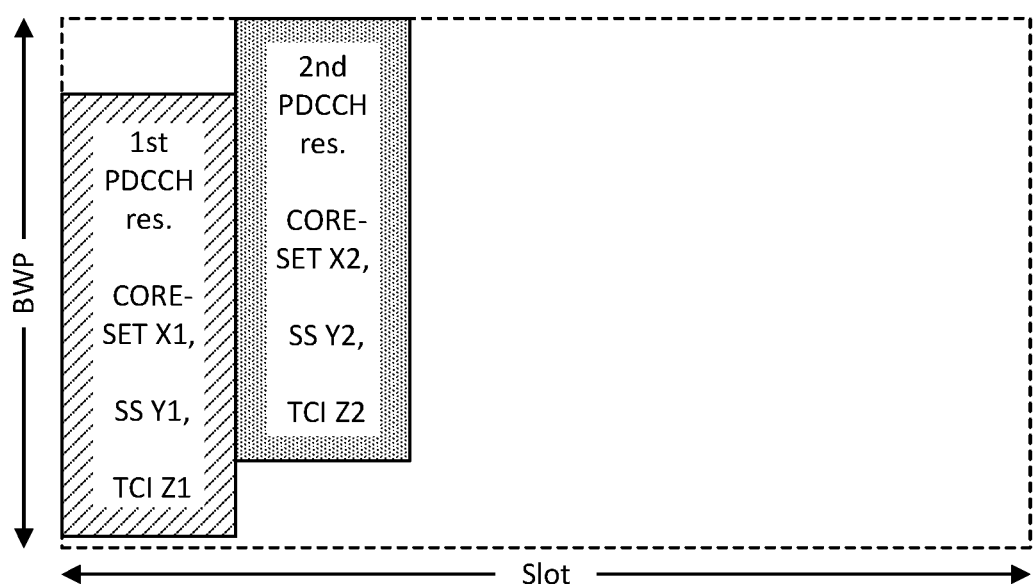
FIG. 4 illustrates TDMed PDCCH resources including a first PDCCH resource that is associated with CORESET X1, search space set Y1 and activated TCI state Z1, and the second PDCCH resource that is associated with CORESET X2, search space set Y2 and activated TCI state Z2.

FIG. 4 is an illustration of TDMed PDCCH resources. A first PDCCH resource is associated with CORESET X1, search space set Y1 and activated TCI state Z1, whereas the second PDCCH resource is associated with CORESET X2, search space set Y2 and activated TCI state Z2.

FDM of CORESETs

In some cases, PDCCH resources are multiplexed in frequency (FDMed), e.g. in partly overlapping or non-overlapping sets of PRBs. In some cases, the FDMed PDCCH resources are associated (through the corresponding CORESETs) with different TCI states IDs, which may correspond to different TRPs or beams. FDM of two PDCCH resources is illustrated in FIG. 5.

FDM of PDCCHs with different TCI states has the benefit that UEs may receive PDCCHs associated with different TCI states at a time, which may reduce latency. Another benefit may be that, in the case of repetition of PDCCHs across the FDMed PDCCH resources, there is no uncertainty on the network side regarding the time instance of PDCCH reception. This may simplify the communication protocol. However, simultaneous reception of different TCI states, e.g. transmissions on different beams or from different TRPs, may require a more complex UE implementation.

Figure 5:
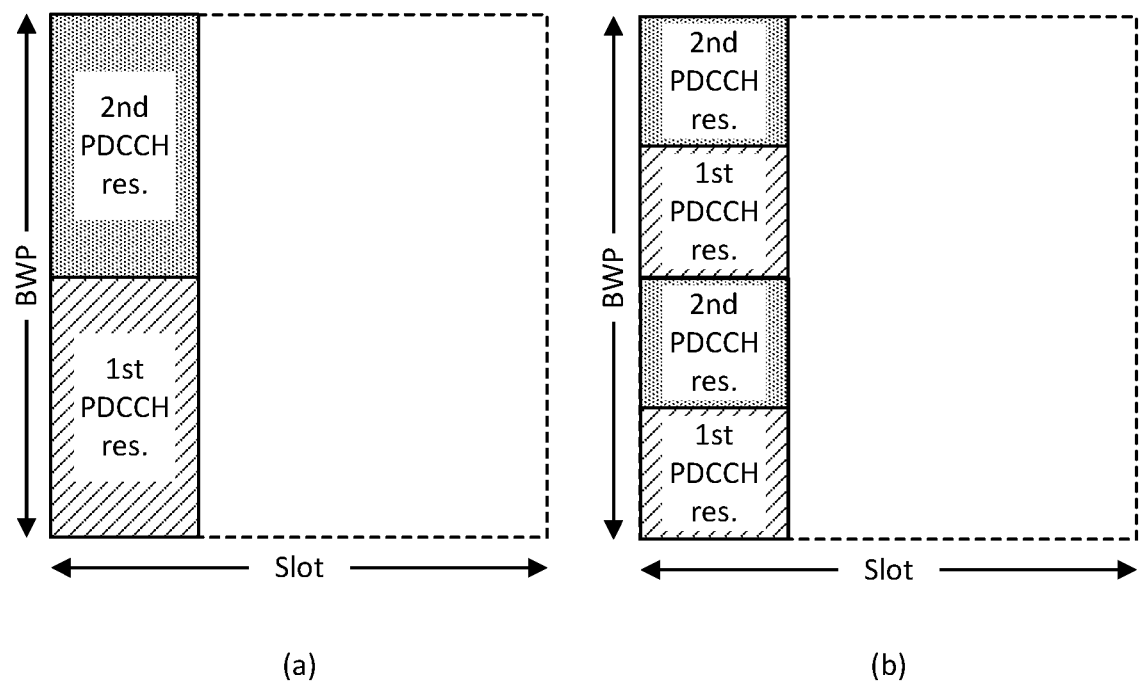
FIG. 5 illustrate FDMed PDCCH resources.

FIG. 5 is an illustration of FDMed PDCCH resources. In both (a) and (b) of FIG. 5 first PDCCH resource is associated with CORESET X1, search space set Y1 and activated TCI state Z1, whereas the second PDCCH resource is associated with CORESET X2, search space set Y2 and activated TCI state Z2. In (a), both PDCCH resources are contiguous ("localized") in frequency. In (b), both PDCCH resources are non-contiguous ("distributed") in frequency. In (b), the PDCCH resources are interlaced.

SDM of CORESETs

In some cases, PDCCH resources are spatially multiplexed (SDMed), e.g. in partly overlapping or overlapping time-frequency resources. In some cases, the SDMed PDCCH resources are associated (through the corresponding CORESETs) with different TCI states IDs, which may correspond to different TRPs or beams.

SDM of PDCCHs with different TCI states has the benefit that fewer time-frequency resources are used compared to TDM and FDM. A disadvantage may be that UEs may have to be capable to simultaneously receive according to multiple TCI states in the same time-frequency resources to fully reap the performance benefits of the scheme, which may imply higher UE complexity. Receiving multiple TCI states in the same time-frequency resource may correspond to simultaneously receiving with multiple Rx beams in the same time-frequency resource.

Methods and Systems Based on Duplication Sets

In some cases, a DCI is repeated across PDCCH resources without the UE being informed or aware of this in advance, e.g. by configuration. Soft combining of DCIs may be prohibited in such cases, but more network flexibility is allowed. Some such cases are discussed below.

In some cases, a UE expects that a DCI can be repeated across multiple, e.g. two, PDCCH resources, e.g., that some PDCCHs in different PDCCH resources can carry the same DCI. Different ways to configure such an association between PDCCH candidates is discussed below.

If the UE knows that the same DCI can be repeated across PDCCH resources, this allows the UE to perform soft combining of PDCCH candidates across PDCCH resources for increased decoding performance. However, since there can be many PDCCH candidates in a PDCCH resource, the blind decoding effort can be high if the UE needs to soft combine many combinations of PDCCH candidates across the PDCCH resources. Different ways to reduce the number of PDCCH candidate combinations is also discussed below.

UE Determination of Duplication Sets

In some cases, a UE may receive multiple identical DCIs during a time period, e.g. a slot, half a slot or a few symbols. The reception of single or multiple of these DCI may result in the same UE behavior, e.g. if the DCI is duplication-insensitive and time-sensitive within the time period (see discussion with regard to Time-(in)sensitive DCI, Duplication-(in)sensitive DCI). In some cases, the UE behavior may differ depending on which of the multiple DCIs it receives and correctly decodes, e.g. if the DCI is duplication-sensitive or time-sensitive within the time period. In this case, one approach is to let the network handle this uncertainty in UE behavior.

Another approach to the problem with duplication of duplication-sensitive or time-sensitive DCIs is to have the UE detect duplication and thereby avoid the issue with duplicated or ambiguous UE action. Hence, in some cases, a UE may determine that successfully decoded DCIs are duplicated and then treat it as such. In various examples, successfully decoded DCIs that belong to the same duplication set may be considered by the UE to be duplicated DCIs. On the other hand, two successfully decoded DCIs that belong to different duplication sets or to no duplication set might not be considered by the UE to be duplicated.

In various cases, a duplication set comprises a set of PDCCH candidates. A UE may determine whether two successfully decoded DCIs may be considered to be duplicated (e.g. belong to the same duplication set) based on if the DCIs were carried on PDCCHs received on PDCCH candidates belonging to the same duplication set. This case may occur, for instance, if the UE does not perform soft combining of PDCCH candidates, which may be suitable for example the UE doesn't know if the network will transmit PDCCHs with DCI duplication or not.

A UE may evaluate one or more conditions for determining if multiple successfully decoded DCIs belong to the same duplication set. In some cases, a UE evaluates one or more conditions prior to DCI decoding, e.g. for DCI combining or skipping some PDCCH candidates after a DCI in the set has been successfully decoded. A UE may also evaluate one or more conditions for determining if multiple PDCCH candidates (e.g. received or to be received) belong to the same duplication set.

In various cases, only PDCCH candidates from the same BWP may be included in a duplication set. In some cases, PDCCH candidates from different BWPs, e.g. from different serving cells may be included in a duplication set.

Example conditions for determining if multiple DCIs (or corresponding PDCCH candidates) belong to the same duplication set are listed below. In an example, DCI format is the same. In some cases, PDCCH candidates can be included in the same duplication set if they are configured to receive at least one DCI format that is the same across the candidates.

In an example condition, DCI format is of certain type, e.g., some DCI formats may be duplicated but not other formats. In some cases, the DCI formats that may be duplicated can be configurable. For example, duplication may only be considered for DCI formats 0_1, 0_2, 1_1 and 1_2.

In an example condition, some or all DCI parameter values are the same in the multiple DCIs. In some cases, not all DCI parameter values need to be the same. For example, for dynamic scheduling of PDSCH, duplication may be determined even if one or more of the PUCCH-related DCI parameters are different. PUCCH-related parameters may include: PUCCH resource indicator (PRI), PDSCH-to-HARQ feedback timing indicator, or TPC command for scheduled PUCCH. In particular for DCIs scheduling PDSCH, the HARQ process ID is the same in the multiple DCIs, in some cases. In some cases, e.g. when the DCIs were received in the same PDCCH monitoring occasion, the downlink assignment index (DAI) is the same in the multiple DCIs. In particular for DCIs scheduling PUSCH, the HARQ process ID is the same in the multiple DCIs, in some cases. In some cases, the value of the TCI parameter (e.g. in DCI format 1_1 or 1_2) may different between the multiple DCIs. In some cases, the value of the SRS resource indicator parameter (e.g. in DCI format 0_1 or 0_2) may different between the multiple DCIs. In some cases, it is configurable which DCI parameters that need to be the same.

In an example condition, UE action indicated by the DCIs is identical, e.g. even if the DCI parameter values are not identical. This may occur for example if the DCIs are received in different time instances and therefore include different time-related parameter values, e.g. the time offset until a scheduled DL or UL transmission.

In an example condition, RNTI is the same. In some cases, PDCCH candidates can be included in the same duplication set if they are configured to monitor at least one RNTI that is the same across the candidates.

In an example condition, RNTI type is the same. In some cases, PDCCH candidates can be included in the same duplication set if they are configured to monitor at least one RNTI type that is the same across the candidates. Example types are C-RNTI, MCS-C-RNTI, CS-RNTI, TPC-PUCCH-RNTI, TPC-PUSCH-RNTI, TPC-SRS-RNTI, INT-RNTI, SFI-RNTI, SP-CSI-RNTI, P-RNTI, SI-RNTI, RA-RNTI, or Temporary C-RNTI.

In an example condition, RNTI type is of a certain type, e.g., DCIs/candidates corresponding to some RNTI types may be duplicated but not other types. In some cases, the RNTI types that may be duplicated can be configurable. For example, only PDCCH candidates on which C-RNTI, MCS-C-RNTI or CS-RNTI are monitored are included in a duplication set.

In an example condition, the DCIs are received in search space sets of the same type.

In an example condition, DCIs are received in search space set of a certain type, e.g. duplication is detected for some search space set types but not for others. Example types are common search space (CSS) set, UE-specific search space (USS) set, Type0-PDCCH CSS set, Type0A-PDCCH CSS set, Type1-PDCCH CSS set, Type2-PDCCH CSS set, Type3-PDCCH CSS set. In some cases, the search space set type for which duplication can be detected is configurable.

In an example condition, CCE aggregation level of the PDCCH candidates that carry the DCIs is the same.

In an example condition, the PDCCHs carrying the DCIs are received within a certain time window, such as: the same slot; the same half-slot; the same set of contiguous symbols, e.g. 1, 2, 3, 4, 5, 6 symbols; a time window within which the DCI is time-insensitive; the symbols of the longest PDCCH among the PDCCHs carrying the DCIs; the PDCCHs carrying the DCIs were completely overlapping in time; a number of consecutive slots (e.g. the number of slots indicated by the duration parameter in the search space set configuration); or a span or a span gap. Further with regard to the time window, it may be the symbol(s) within a slot/half-slot/fraction of a slot spanned by a set of PDCCH resources, in various cases including or not including any symbols between such PDCCH resources. The set of PDCCH resources may for example correspond to a set of CORESETs, which may be configurable (e.g. according to one of the examples of CORESET association/linking below). The set of PDCCH resources may for example correspond to different CORESETs with different CORESETPoolIndex values, e.g. by combining a time window condition with condition below regarding UE being provided CORESETPoolIndex with value 0. In some cases, the time window, in which DCIs/PDCCH candidates may belong to the same duplication set, is configurable, e.g. among some of the examples above.

In an example condition, the UE is provided CORESETPoolIndex with value 0 for one or more first CORESETs and is provided CORESETPoolIndex with value 1 for one or more second CORESETs on the active DL BWP of the serving cell. In some cases, PDCCH resources corresponding to different values of CORESETPoolIndex, e.g. in a time window as in condition above regarding time window, may be in the same duplication set. In some cases, if there are multiple CORESETs with the same CORESETPoolIndex, the CORESET with highest or lowest CORESET ID may be included in the duplication set. In some cases, multiple PDCCH resources corresponding to the same value of CORESETPoolIndex may be included in a duplication set.

In an example condition, DCIs were received in different CORESETs. In an example condition, the DCIs were received using the same search space set.

In an example condition, in some cases, a duplication set $D_{i,nCI}$ may include PDCCH candidates (from a set of PDCCH resources) for which $f(m_{s,nCI}, s, c, p, L) = i$. In various cases, a duplication set includes only PDCCH candidates of the same aggregation level. In other cases, a duplication set may include PDCCH candidates of different aggregation levels, for example a PDCCH candidate with aggregation level L1 in a first PDCCH resource and L2 in a second PDCCH resource, with L1≠L2.

s is an index of a search space set of a PDCCH resource in the set of PDCCH resources.

c is a CORESET identity (e.g. as defined by IE ControlResourceSetId) of a PDCCH resource in the set of PDCCH resources.

p is a CORESETPoolIndex of a PDCCH resource in the set of PDCCH resources.

L is a CCE aggregation level, $n_{CI}$ is a carrier indicator field value, which is the same for PDCCH candidates in the duplication set.

$m_{s,nCI}$ is a PDCCH candidate index for a particular aggregation level L in search space s. Note that in some cases, the index $m_{s,nCI}$ of a first PDCCH candidate of aggregation level L1 may be equal to the index $m_{s,nCI}$ of a second PDCCH candidate of aggregation level L2 (≠L1), for search space set s. In some cases, for an aggregation level L and carrier indicator nCI, there is no more than one PDCCH candidate with a particular index $m_{s,n\_CI}$ in search space set s, e.g. $m_{s,N,CI}=0, \ldots, M_{s,NCI}^{L}-1$, where $M_{s,NCI}^{L}$ is the number of PDCCH candidates the UE is configured to monitor for aggregation level L of a search space set s for a serving cell corresponding to nCI. In some cases, the PDCCH candidates are counted per CORESET instead, e.g. the candidate index is alternatively m_(c,n_CI) for CORESET c. This may be a more suitable indexing for cases in which a search space set is associated with multiple CORESETs.

f($m_{s,n_{CI}}$, s, c, p, L) is a function that maps one or more of $m_{s,n_{CI}}$, s, c, p, L to a value i, which may be an integer. For example, f($m_{s,n_{CI}}$, s, c, p, L)=$m_{s,n_{CI}}$, or alternatively f($m_{c,n_{CI}}$, s, c, p, L)=$m_{c,n_{CI}}$. In other words, a duplication set $D_{i,n_{CI}}$ is a set of PDCCH candidates with index $m_{s,n_{CI}}=i$ (or $m_{c,n_{CI}}=i$) in a set of PDCCH resources. For the case that a duplication set may include PDCCH candidates of different aggregation level $D_{i,\ nCI}$ may include multiple PDCCH candidates from the same PDCCH resource with the same index $m_{s,\ nCI}=i$ (or $m_{c,\ nCI}=i$). On the other hand, for the case that a duplication set may only include PDCCH candidates of the same aggregation level, the notation $D_{i,\ nCI,\ L}$ may be more suitable since a duplication set $D_{i,\ nCI,\ L}$ only includes PDCCH candidates with index $m_{s,\ nCI}=i$ (or $m_{c,\ nCI}=i$) of aggregation level L.

In some cases, duplication set(s) are configurable, at least partly. In an example configurable case, a search space set can be configured with associations to multiple CORESETs. This would result in multiple PDCCH resources with at least the first symbols overlapping in time. Depending on the configuration of the CORESETs, these multiple PDCCH resource could use different frequency resources or be partly or fully overlapping in frequency, for example as discussed below. For example, a second associated CORESET could be configured in a search space set configuration, e.g. shown in Table 1. Note that additional conditions for PDCCH candidates to belong to the same duplication set may apply, e.g. according to one or more of the conditions above.

In an example configurable case, PDCCH candidates in PDCCH resources corresponding to different CORESETs but the same search space set may be included in the same duplication set.

In some cases, the function f (m s, nCI, s, c, p, L) (see above) is configurable.

In an example configurable case, Table 1 is an example of adding multiple CORESET associations in search space set configuration IE, such as "controlResourceSetId2-r17 ControlResourceSetId OPTIONAL, -- Need R".

TABLE 1

| SearchSpace information element |
|---|
| -- ASN1START |
| -- TAG-SEARCHSPACE-START |
| SearchSpace ::=    SEQUENCE { |
| searchSpaceId        SearchSpaceId, |
|   controlResourceSetId    ControlResourceSetId    OPTIONAL, -- Cond SetupOnly |
| --SOME PARTS REMOVED FOR BREVITY |
|                         OPTIONAL -- Cond Setup |
| [[ |
| controlResourceSetId2-r17    ControlResourceSetId    OPTIONAL, -- Need R |
| ]] |
| } |
| -- TAG-SEARCHSPACE-STOP |
| -- ASN1STOP |

In an example configurable case, multiple search space sets are linked by explicit configuration, for example as in Table 2. PDCCH candidates in PDCCH resources corresponding to linked search space sets may belong to the same duplication set. Note that additional conditions for PDCCH candidates to belong to the same duplication set may apply, e.g. according to one or more of the conditions above, in addition to the search space set linking.

Table 2 is an example implementation of adding search space set linking in search space set configuration IE, such as "linkedSearchSpace-r17 SearchSpaceId OPTIONAL, -- Need R," in Table 2.

TABLE 2

| SearchSpace information element |
|---|
| -- ASN1START<br>-- TAG-SEARCHSPACE-START<br>SearchSpace ::=　　　　SEQUENCE {<br>　searchSpaceId　　　　SearchSpaceId,<br>　controlResourceSetId　　ControlResourceSetId　　　OPTIONAL,<br>-- Cond SetupOnly<br>--SOME PARTS REMOVED FOR BREVITY<br>　　　　　　　　　　　　　　　　OPTIONAL -- Cond Setup<br>　[[<br>　　linkedSearchSpace-r17　　SearchSpaceId　　OPTIONAL, -- Need R<br>　]]<br>}<br>-- TAG-SEARCHSPACE-STOP<br>-- ASN1STOP |

In an example configurable case, multiple CORESETs are linked by explicit configuration, for example as in Table 3. PDCCH candidates in PDCCH resources corresponding to linked CORESETs may belong to the same duplication set. Note that additional conditions for PDCCH candidates to belong to the same duplication set may apply, e.g. according to one or more of the conditions above, in addition to the CORESET linking.

Table 3 is an example implementation of adding CORESET linking in CORESET configuration IE, such as "linkedControlResourceSet-r17 ControlResourceSetId OPTIONAL, -- Need R," in Table 3.

TABLE 3

| ControlResourceSet information element |
|---|
| -- ASN1START<br>-- TAG-CONTROLRESOURCESET-START<br>ControlResourceSet ::=　　　SEQUENCE {<br>　controlResourceSetId　　　ControlResourceSetId,<br>--SOME PARTS REMOVED FOR BREVITY<br>　tci-StatesPDCCH-ToAddList　　　SEQUENCE(SIZE(1 . . . maxNrofTCI-StatesPDCCH)) OF<br>TCI-StateId OPTIONAL, -- CondNotSIB1-initialBWP<br>　tci-StatesPDCCH-ToReleaseList　　SEQUENCE(SIZE(1 . . . maxNrofTCI-StatesPDCCH)) OF<br>TCI-StateId OPTIONAL, -- CondNotSIB1-initialBWP<br>　tci-PresentInDCI　　　　ENUMERATED {enabled}　　　　OPTIONAL,<br>-- Need S<br>　pdcch-DMRS-ScramblingID　　INTEGER (0 . . . 65535)　　　　OPTIONAL,<br>-- Need S<br>. . .,<br>　[[<br>　　linkedControlResourceSet-r17　ControlResourceSetId　　OPTIONAL, -- Need R<br>　]]<br>}<br>-- TAG-CONTROLRESOURCESET-STOP<br>-- ASN1STOP |

In an example configurable case, a list of CORESETs or a list of search space sets can be configured, for example in the PDCCH-Config IE as in Table 4. PDCCH candidates in PDCCH resources corresponding to linked CORESETs or search space sets may belong to the same duplication set. Note that additional conditions for PDCCH candidates to belong to the same duplication set may apply, e.g. according to one or more of the conditions above, in addition to the CORESET linking.

Table 4 is an example implementation of linking CORESETs by configuring a list.

TABLE 4

| PDCCH-Config information element |
|---|
| -- ASN1START<br>-- TAG-PDCCH-CONFIG-START<br>PDCCH-Config ::=　　　SEQUENCE {<br>　controlResourceSetToAddModList　　SEQUENCE(SIZE (1 . . . 3)) OF ControlResourceSet<br>OPTIONAL,　-- Need N |

TABLE 4-continued

PDCCH-Config information element

```
    controlResourceSetToReleaseList    SEQUENCE(SIZE (1 . . . 3)) OF ControlResourceSetId
OPTIONAL,    -- Need N
    searchSpacesToAddModList           SEQUENCE(SIZE (1 . . . 10)) OF SearchSpace
OPTIONAL,    -- Need N
    searchSpacesToReleaseList          SEQUENCE(SIZE (1 . . . 10)) OF SearchSpaceId
OPTIONAL,    -- Need N
--SOME PARTS REMOVED FOR BREVITY
    . . .,
    [[
    CORESETsWithDuplToAddModList-r17   SEQUENCE(SIZE (1 . . . 3)) OF ControlResourceSetId
OPTIONAL, -- Need N
    CORESETsWithDuplToReleaseModList-r17 SEQUENCE(SIZE (1 . . . 3)) OF ControlResource-
SetId
OPTIONAL, -- Need N
    ]]
}
-- TAG-PDCCH-CONFIG-STOP
-- ASN1STOP
```

In an example configurable case, a CORESET or a search space set can be configured for duplication, e.g. for inclusion in a duplication set, by including an "enable" parameter in the CORESET configuration (e.g. as in Table 5) or similarly in the search space set configuration. PDCCH candidates in PDCCH resources corresponding to a CORESET or a search space set with DCI duplication enabled could belong to a duplication set. Note that additional conditions for PDCCH candidates to belong to the same duplication set may apply, e.g. according to one or more of the conditions above, in addition to the enabling of duplication for a CORESET/search space set.

Table 5 is an example implementation of enabling DCI duplication in CORESET (similar implementation can be applied to a search space set configuration).

TABLE 5

ControlResourceSet information element

```
-- ASN1START
-- TAG-CONTROLRESOURCESET-START
ControlResourceSet ::=         SEQUENCE {
    controlResourceSetId       ControlResourceSetId,
--SOME PARTS REMOVED FOR BREVITY
    . . .,
    [[
    DCIDuplication-r17         ENUMERATED {enabled}        OPTIONAL, -- Need R
    ]]
}
-- TAG-CONTROLRESOURCESET-STOP
-- ASN1STOP
```

In yet another example, a search space set can be configured for duplication, e.g. for inclusion in a duplication set, by including one or more parameters for monitoring occasions in the time domain, such as the parameters monitoringSlotPeriodicityAndOffset, duration or monitoringSymbolsWithinSlot. Table 6 and in the examples of Table 7 and Table 8, a second monitoringSymbolsWithinSlot parameter may be configured (monitoringSymbolsWithinSlot2-r17). If so, duplication may be enabled. In some cases, the second parameter adds additional monitoring occasions to the slots defined by monitoringSlotPeriodicityAndOffset and duration. These additional monitoring occasions may need to be non-overlapping in some cases, also with the monitoring occasions defined by monitoringSymbolsWithinSlot. In some cases, the PDCCH resources in monitoring occasions added by monitoringSlotPeriodicityAndOffset2-r17 between two consecutive monitoring occasions defined by monitoringSlotPeriodicityAndOffset may be included in a duplication set together with the monitoring occasion immediately prior to these occasions. Consider an example with a 2-symbol CORESET associated with the search space set. The network configures two monitoring occasions in the slots defined by monitoringSlotPeriodicityAndOffset and duration, e.g. in symbols 0-1 and symbols 7-8. This can be achieved by configuring monitoringSymbolsWithinSlot="10000001000000". Now, the network configures additional monitoring occasions by configuring monitoringSymbolsWithinSlot2-r17="00100000010000", which adds monitoring occasions in symbols 2-3 and symbols 9-10. Since the monitoring occasion in symbol 2-3 is between the consecutive occasions in symbols 0-1 and symbols 7-8, the PDCCH resources in symbols 0-1 and symbols 2-3 may be included in a duplication set.

Further to the previous example, in Table 8, a second CORESET may be optionally configured. For framework 1, this means that a second TCI state, e.g. the TCI state activated for the second CORESET, may be applied to PDCCH transmission within the duplication set. For example, the TCI state ID activated for the first CORESET configured by controlResourceSetId may be the 1st TCI state ID (e.g. with index t=0) and the TCI state ID activated for the second CORESET configured by controlResourceSetId2-r17 may be the 2nd TCI state ID (e.g. with index t=1). These two TCI states IDs (T=2) may be associated with different PDCCH resources (or corresponding PDCCH monitoring occasions) in a duplication set. Let the PDCCH resources or occasions be indexed as m=0, . . . , M−1, where M is the number of PDCCH resources or PDCCH monitoring occasions within the duplication set. In some cases, the T activated TCI state Ids are cyclically assigned to the PDCCH resources or PDCCH monitoring occasions within the duplication set, e.g. the T TCI state Ids are consecutively assigned to resources/occasions m=0, . . . , T−1 and m= T, . . . , 2T−1 etc., assuming T<M.

In some cases, the T activated TCI state Id are assigned such that the first TCI state Id index (t=0) is assigned to a number of, for example V, consecutive PDCCH resource indices (or occasion indices) (e.g. m=0, . . . , V−1, where V=floor(M/T) or V=ceil(M/T)), the second TCI state Id index (t=1) is assigned to the next, for example, V consecutive PDCCH resource indices (or occasion indices), etc., until the last TCI state Id index (t=T−1) is assigned to the last consecutive PDCCH resource indices (or occasion indices) (e.g. m=V(T−1), . . . , M−1). Note that additional conditions for PDCCH candidates to belong to the same duplication set may apply, e.g. according to one or more of the conditions above, in addition to the conditions described here.

TABLE 6

SearchSpace information element

```
-- ASN1START
-- TAG-SEARCHSPACE-START
SearchSpace ::=          SEQUENCE {
    searchSpaceId            SearchSpaceId,
    controlResourceSetId     ControlResourceSetId        OPTIONAL,
--Cond SetupOnly
    monitoringSlotPeriodicityAndOffset    CHOICE {
        sl1                  NULL,
        sl2                  INTEGER (0 . . . 1),
        sl4                  INTEGER (0 . . . 3),
        sl5                  INTEGER (0 . . . 4),
        sl8                  INTEGER (0 . . . 7),
        sl10                 INTEGER (0 . . . 9),
        sl16                 INTEGER (0 . . . 15),
        sl20                 INTEGER (0 . . . 19),
        sl40                 INTEGER (0 . . . 39),
        sl80                 INTEGER (0 . . . 79),
        sl160                INTEGER (0 . . . 159),
        sl320                INTEGER (0 . . . 319),
        sl640                INTEGER (0 . . . 639),
        sl1280               INTEGER (0 . . . 1279),
        sl2560               INTEGER (0 . . . 2559)
    }                        OPTIONAL, --Cond Setup
    duration                 INTEGER (2 . . . 2559)      OPTIONAL, -- Need R
    monitoringSymbolsWithinSlotBIT        STRING (SIZE (14))       OPTIONAL,
-- Cond Setup
--SOME PARTS REMOVED FOR BREVITY
[[
    monitoringSlotPeriodicityAndOffset2-r17    CHOICE {
        sl1                  NULL,
        sl2                  INTEGER (0 . . . 1),
        sl4                  INTEGER (0 . . . 3),
        sl5                  INTEGER (0 . . . 4),
        sl8                  INTEGER (0 . . . 7),
        sl10                 INTEGER (0 . . . 9),
        sl16                 INTEGER (0 . . . 15),
        sl20                 INTEGER (0 . . . 19),
        sl40                 INTEGER (0 . . . 39),
        sl80                 INTEGER (0 . . . 79),
        sl160                INTEGER (0 . . . 159),
        sl320                INTEGER (0 . . . 319),
        sl640                INTEGER (0 . . . 639),
        sl1280               INTEGER (0 . . . 1279),
        sl2560               INTEGER (0 . . . 2559)
    }                        OPTIONAL, -- Need R
]]
}
-- TAG-SEARCHSPACE-STOP
-- ASN1STOP
```

TABLE 7

SearchSpace information element

```
-- ASN1START
-- TAG-SEARCHSPACE-START
SearchSpace ::=          SEQUENCE {
    searchSpaceIdSearch      SpaceId,
    controlResourceSetId     ControlResourceSetId        OPTIONAL,
```

TABLE 7-continued

| SearchSpace information element |
|---|

```
-- Cond SetupOnly
   monitoringSlotPeriodicityAndOffset      CHOICE {
      sl1                NULL,
      sl2                INTEGER (0 . . . 1),
      sl4                INTEGER (0 . . . 3),
      sl5                INTEGER (0 . . . 4),
      sl8                INTEGER (0 . . . 7),
      sl10               INTEGER (0 . . . 9),
      sl16               INTEGER (0 . . . 15),
      sl20               INTEGER (0 . . . 19),
      sl40               INTEGER (0 . . . 39),
      sl80               INTEGER (0 . . . 79),
      sl160              INTEGER (0 . . . 159),
      sl320              INTEGER (0 . . . 319),
      sl640              INTEGER (0 . . . 639),
      sl1280             INTEGER (0 . . . 1279),
      sl2560             INTEGER (0 . . . 2559)
   }                                                OPTIONAL, -- Cond Setup
   duration           INTEGER (2 . . . 2559)        OPTIONAL, --Need R
   monitoringSymbolsWithinSlot    BIT STRING (SIZE (14))        OPTIONAL,
-- Cond Setup
--SOME PARTS REMOVED FOR BREVITY
   [[
   monitoringSymbolsWithinSlot2-r17       BIT STRING (SIZE (14))
OPTIONAL, -- Need R
   ]]
}
-- TAG-SEARCHSPACE-STOP
-- ASN1STOP
```

TABLE 8

| SearchSpace information element |
|---|

```
-- ASN1START
-- TAG-SEARCHSPACE-START
SearchSpace ::=             SEQUENCE {
   searchSpaceId            SearchSpaceId,
   controlResourceSetId     ControlResourceSetId       OPTIONAL,
-- Cond SetupOnly
   monitoringSlotPeriodicityAndOffset    CHOICE {
      sl1                NULL,
      sl2                INTEGER (0 . . . 1),
      sl4                INTEGER (0 . . . 3),
      sl5                INTEGER (0 . . . 4),
      sl8                INTEGER (0 . . . 7),
      sl10               INTEGER (0 . . . 9),
      sl16               INTEGER (0 . . . 15),
      sl20               INTEGER (0 . . . 19),
      sl40               INTEGER (0 . . . 39),
      sl80               INTEGER (0 . . . 79),
      sl160              INTEGER (0 . . . 159),
      sl320              INTEGER (0 . . . 319),
      sl640              INTEGER (0 . . . 639),
      sl1280             INTEGER (0 . . . 1279),
      sl2560             INTEGER (0 . . . 2559)
   }                                                OPTIONAL, -- Cond Setup
   duration      INTEGER (2 . . . 2559)             OPTIONAL, -- Need R
   monitoringSymbolsWithinSlot     BIT STRING (SIZE (14))            OPTIONAL,
-- Cond Setup
--SOME PARTS REMOVED FOR BREVITY
   [[
   monitoringSymbolsWithinSlot2-r17          BIT STRING (SIZE (14))
OPTIONAL, -- Need R
   controlResourceSetId2-rl7ControlResourceSetId
   ]]
}
-- TAG-SEARCHSPACE-STOP
-- ASN1STOP
```

Table 7 illustrate such cases.

Note that additional conditions for PDCCH candidates to belong to the same duplication set may apply, e.g. according to one or more of the conditions above, in addition to the conditions described here.

In the example of Table 6, a second monitoringSlotPeriodicityAndOffset parameter may be configured (monitoringSlotPeriodicityAndOffset2-r17). If so, duplication may be enabled. In some cases, the regular duration and monitoringSymbolsWithinSlot parameter values are applicable to the additional occasion defined by monitoringSlotPeriodicityAndOffset2-r17.

In yet another example, a search space set can be configured for duplication, e.g. for inclusion in a duplication set, by including one or more parameters for monitoring occasions in the time domain, such as the parameters monitoringSlotPeriodicityAndOffset, duration or monitoringSymbolsWithinSlot. In Table 7-Table 9, a second monitoringSymbolsWithinSlot parameter may be configured (monitoringSymbolsWithinSlot2-r17). If so, duplication may be enabled. In some cases, the second parameter adds additional monitoring occasions to the slots defined by monitoringSlotPeriodicityAndOffset and duration. These additional monitoring occasions may need to be non-overlapping in some cases, also with the monitoring occasions defined by monitoringSymbolsWithinSlot. In some cases, the PDCCH resources in monitoring occasions added by monitoringSlotPeriodicityAndOffset2-r17 between two consecutive monitoring occasions defined by monitoringSlotPeriodicityAndOffset may be included in a duplication set together with the monitoring occasion immediately prior to these occasions.

Consider an example with a 2-symbol CORESET associated with the search space set. The network configures two monitoring occasions in the slots defined by monitoringSlotPeriodicityAndOffset and duration, e.g. in symbols 0-1 and symbols 7-8. This can be achieved by configuring monitoringSymbolsWithinSlot="10000001000000". Now, the network configures additional monitoring occasions by configuring monitoringSymbolsWithinSlot2-r17="00100000010000", which adds monitoring occasions in symbols 2-3 and symbols 9-10. Since the monitoring occasion in symbol 2-3 is between the consecutive occasions in symbols 0-1 and symbols 7-8, the PDCCH resources in symbols 0-1 and symbols 2-3 may be included in a duplication set.

In Table 7, a second CORESET may be optionally configured. For framework 1, this means that a second TCI state, e.g. the TCI state activated for the second CORESET, may be applied to PDCCH transmission within the duplication set. For example, the TCI state ID activated for the first CORESET configured by controlResourceSetId may be the 1st TCI state ID (e.g. with index t=0) and the TCI state ID activated for the second CORESET configured by controlResourceSetId2-r17 may be the 2nd TCI state ID (e.g. with index t=1). These two TCI states IDs (T=2) may be associated with different PDCCH resources (or corresponding PDCCH monitoring occasions) in a duplication set. Let the PDCCH resources or occasions be indexed as m=0, ..., M−1, where M is the number of PDCCH resources or PDCCH monitoring occasions within the duplication set. In some cases, the T activated TCI state Ids are cyclically assigned to the PDCCH resources or PDCCH monitoring occasions within the duplication set, e.g. the T TCI state Ids are consecutively assigned to resources/occasions m=0, ..., T−1 and m=T, ..., 2T−1 etc., assuming T<M.

In some cases, the T activated TCI state Id are assigned such that the first TCI state Id index (t=0) is assigned to a number of, for example V, consecutive PDCCH resource indices (or occasion indices) (e.g. m=0, ..., V−1, where V=floor(M/T) or V=ceil(M/T)), the second TCI state Id index (t=1) is assigned to the next, for example, V consecutive PDCCH resource indices (or occasion indices), etc., until the last TCI state Id index (t=T−1) is assigned to the last consecutive PDCCH resource indices (or occasion indices) (e.g. m=V(T−1), ..., M−1). Note that additional conditions for PDCCH candidates to belong to the same duplication set may apply, e.g. according to one or more of the conditions above, in addition to the conditions described here.

Table 8 illustrate such cases. Note that additional conditions for PDCCH candidates to belong to the same duplication set may apply, e.g. according to one or more of the conditions above, in addition to the conditions described here.

In the example of Table 6, a second monitoringSlotPeriodicityAndOffset parameter may be configured (monitoringSlotPeriodicityAndOffset2-r17). If so, duplication may be enabled. In some cases, the regular duration and monitoringSymbolsWithinSlot parameter values are applicable to the additional occasion defined by monitoringSlotPeriodicityAndOffset2-r17.

Table 6 illustrates an example implementation of enabling DCI duplication in search space set.

In the examples of Table 8 and Table 9, a second monitoringSymbolsWithinSlot parameter may be configured (monitoringSymbolsWithinSlot2-r17). If so, duplication may be enabled. In some cases, the second parameter adds additional monitoring occasions to the slots defined by monitoringSlotPeriodicityAndOffset and duration. These additional monitoring occasions may need to be non-overlapping in some cases, also with the monitoring occasions defined by monitoringSymbolsWithinSlot. In some cases, the PDCCH resources in monitoring occasions added by monitoringSlotPeriodicityAndOffset2-r17 between two consecutive monitoring occasions defined by monitoringSlotPeriodicityAndOffset may be included in a duplication set together with the monitoring occasion immediately prior to these occasions.

Consider an example with a 2-symbol CORESET associated with the search space set. The network configures two monitoring occasions in the slots defined by monitoringSlotPeriodicityAndOffset and duration, e.g. in symbols 0-1 and symbols 7-8. This can be achieved by configuring monitoringSymbolsWithinSlot="10000001000000". Now, the network configures additional monitoring occasions by configuring monitoringSymbolsWithinSlot2-r17="00100000010000", which adds monitoring occasions in symbols 2-3 and symbols 9-10. Since the monitoring occasion in symbol 2-3 is between the consecutive occasions in symbols 0-1 and symbols 7-8, the PDCCH resources in symbols 0-1 and symbols 2-3 may be included in a duplication set.

In Table 8, a second CORESET may be optionally configured. For framework 1, this means that a second TCI state, e.g. the TCI state activated for the second CORESET, may be applied to PDCCH transmission within the duplication set. For example, the TCI state ID activated for the first CORESET configured by controlResourceSetId may be the 1st TCI state ID (e.g. with index t=0) and the TCI state ID activated for the second CORESET configured by controlResourceSetId2-r17 may be the 2nd TCI state ID (e.g. with index t=1). These two TCI states IDs (T=2) may be associated with different PDCCH resources (or corresponding PDCCH monitoring occasions) in a duplication set. Let the PDCCH resources or occasions be indexed as m=0, ..., M−1, where M is the number of PDCCH resources or PDCCH monitoring occasions within the duplication set. In some cases, the T activated TCI state Ids are cyclically assigned to the PDCCH resources or PDCCH monitoring occasions within the duplication set, e.g. the T TCI state Ids are consecutively assigned to resources/occasions m=0, ..., T−1 and m=T, ..., 2T−1 etc., assuming T<M.

In some cases, the T activated TCI state Id are assigned such that the first TCI state Id index (t=0) is assigned to a number of, for example V, consecutive PDCCH resource indices (or occasion indices) (e.g. m=0, ..., V−1, where V=floor(M/T) or V=ceil(M/T)), the second TCI state Id index (t=1) is assigned to the next, for example, V consecutive PDCCH resource indices (or occasion indices), etc., until the last TCI state Id index (t=T−1) is assigned to the last consecutive PDCCH resource indices (or occasion indices) (e.g. m=V(T−1), ..., M−1). Note that additional conditions for PDCCH candidates to belong to the same duplication set may apply, e.g. according to one or more of the conditions above, in addition to the conditions described here.

Table 7 illustrates an example implementation of enabling DCI duplication in search space set. Table 8 illustrates an example implementation of enabling DCI duplication in search space set.

In yet another example, illustrated in Table 9 and Table 10, a search space set can be configured for duplication, e.g. for inclusion in a duplication set, by including a repetition parameter, such as repetitionfactor-r17 below. The values n2, n3, etc., may correspond to 2-times repetition, 3-times repetition, etc.

TABLE 9

SearchSpace information element

```
-- ASN1START
-- TAG-SEARCHSPACE-START
SearchSpace ::=              SEQUENCE {
   searchSpaceId             SearchSpaceId,
   controlResourceSetId      ControlResourceSetId         OPTIONAL,
-- Cond SetupOnly
   monitoringSlotPeriodicityAndOffset    CHOICE {
      sl1                    NULL,
      sl2                    INTEGER (0 ... 1),
      sl4                    INTEGER (0 ... 3),
      sl5                    INTEGER (0 ... 4),
      sl8                    INTEGER (0 ... 7),
      sl10                   INTEGER (0 ... 9),
      sl16                   INTEGER (0 ... 15),
      sl20                   INTEGER (0 ... 19),
      sl40                   INTEGER (0 ... 39),
      sl80                   INTEGER (0 ... 79),
      sl160                  INTEGER (0 ... 159),
      sl320                  INTEGER (0 ... 319),
      sl640                  INTEGER (0 ... 639),
      sl1280                 INTEGER (0 ... 1279),
      sl2560                 INTEGER (0 ... 2559)
   }                                                      OPTIONAL, -- Cond Setup
   duration       INTEGER (2 ... 2559)         OPTIONAL, -- Need R
   monitoringSymbolsWithinSlot    BIT STRING (SIZE (14))              OPTIONAL,
-- Cond Setup
--SOME PARTS REMOVED FOR BREVITY
   [[
   repetitionfactor-r17      ENUMERATED {n2, n3, n4, n6, n7, n8}     OPTIONAL,
-- Need R
   ]]
}
-- TAG-SEARCHSPACE-STOP
-- ASN1STOP
```

For example, each of the "original" monitoring occasions defined by (monitoringSlotPeriodicityAndOffset, duration, and monitoringSymbolsWithinSlot) may be repeated in the first available symbols (e.g. DL or DL/flexible symbols) following the monitoring occasion. In some cases, the UE repeats the monitoring occasions in the symbols immediately following the original occasion and skips a repetition if it happens to collide with another signal (with higher priority in the specification) or if it falls in an UL symbol. In various cases, PDCCH resources in the original monitoring occasion and the subsequently repeated monitoring occasions may be included in a duplication set.

In the example in Table 10, a second CORESET may be optionally configured. This may provide a second TCI state, similarly as described for Table 7 above. TCI state ID assignment to different PDCCH resources or PDCCH monitoring occasions may follow the description for Table 8.

TABLE 10

| SearchSpace information element |
|---|
| -- ASN1START |
| -- TAG-SEARCHSPACE-START |
| SearchSpace ::=              SEQUENCE { |
|   searchSpaceId              SearchSpaceId, |
|   controlResourceSetId       ControlResourceSetId       OPTIONAL, |
| -- Cond SetupOnly |
|   monitoringSlotPeriodicityAndOffset   CHOICE { |
|     sl1         NULL, |
|     sl2         INTEGER (0 ... 1), |
|     sl4         INTEGER (0 ... 3), |
|     sl5         INTEGER (0 ... 4), |
|     sl8         INTEGER (0 ... 7), |
|     sl10        INTEGER (0 ... 9), |
|     sl16        INTEGER (0 ... 15), |
|     sl20        INTEGER (0 ... 19), |
|     sl40        INTEGER (0 ... 39), |
|     sl80        INTEGER (0 ... 79), |
|     sl160       INTEGER (0 ... 159), |
|     sl320       INTEGER (0 ... 319), |
|     sl640       INTEGER (0 ... 639), |
|     sl1280      INTEGER (0 ... 1279), |
|     sl2560      INTEGER (0 ... 2559) |
|   }                                   OPTIONAL, -- Cond Setup |
|   duration        INTEGER (2 ... 2559)           OPTIONAL, -- Need R |
|   monitoringSymbolsWithinSlot    BIT STRING (SIZE (14))      OPTIONAL, |
| -- Cond Setup |
| --SOME PARTS REMOVED FOR BREVITY |
| [[ |
|   repetitionfactor-r17       ENUMERATED {n2, n3, n4, n6, n7, n8}    OPTIONAL, |
| -- Need R |
|   controlResourceSetId2-r17         ControlResourceSetId OPTIONAL,    --Need R |
|   ]] |
| } |
| -- TAG-SEARCHSPACE-STOP |
| -- ASN1STOP |

Note that additional conditions for PDCCH candidates to belong to the same duplication set may apply, e.g. according to one or more of the conditions above, in addition to the conditions described here.

Table 9 illustrates an example implementation of enabling DCI duplication in search space set.

Table 10 illustrates an example implementation of enabling DCI duplication in search space set.

DCI duplication may be enabled for a cell or for a BWP by configuration, e.g. by an RRC parameter in the PDCCH-Config IE, such as in Table 11.

Table 11 illustrates an example parameter enabling DCI duplication in the PDCCH-Config IE.

TABLE 11

| PDCCH-Config information element |
|---|
| -- ASN1START |
| -- TAG-PDCCH-CONFIG-START |
| PDCCH-Config ::=            SEQUENCE{ |
|   controlResourceSetToAddModList   SEQUENCE(SIZE (1 ... 3)) OF |
| ControlResourceSet           OPTIONAL, -- Need N |
|   controlResourceSetToReleaseList    SEQUENCE(SIZE (1 ... 3)) OF |
| ControlResourceSetId         OPTIONAL, -- Need N |
|   searchSpacesToAddModList       SEQUENCE(SIZE (1 ... 10)) OF SearchSpace |
| OPTIONAL, -- Need N |
|   searchSpacesToReleaseList        SEQUENCE(SIZE (1 ... 10)) OF |
| SearchSpaceId |
| OPTIONAL, -- Need N |
| --SOME PARTS REMOVED FOR BREVITY |
|   ..., |
|   [[ |
|     DCIDuplication-r17      ENUMERATED {enabled} |
| OPTIONAL, -- Need R |
|   ]] |
| } |
| -- TAG-PDCCH-CONFIG-STOP |
| -- ASN1STOP |

In various cases, the UE uses one or more of these conditions to determine if PDCCH candidates or successfully decoded DCIs belong to the same duplication set, e.g. using the "AND" or "OR" operation(s) between the conditions, and in some cases together with additional condition(s) not listed here.

A few examples, with two DCIs/PDCCH resources for simplicity, are:

Example 1a: Two successfully decoded DCIs are considered a duplicate if all conditions below are fulfilled.
DCI duplication is enabled for the BWP.
Both DCIs are received in a USS.
Both DCIs have CRC scrambled with the same RNTI.
Both DCIs use the same DCI format.
The parameter values are the same in both DCIs
Both DCIs are received within a certain time window.
Both DCIs are received on PDCCH candidates with the same PDCCH candidate index $m_{s1,nCI}=m_{s2,nCI}$, where s1 and s2 are the indices of the search space sets on which the DCIs were received and nCI is the carrier indicator field value, which is the same for both DCIs.

Example 1b: Two PDCCH candidates are considered to belong to a duplication set if all conditions below are fulfilled.
DCI duplication is enabled for the BWP.
Both PDCCH candidates correspond to a USS.
UE monitors DCIs with CRC scrambled with the same RNTI on both PDCCH candidates.
UE monitors DCIs with the same DCI format on both PDCCH candidates.
Both PDCCH candidates are received within a certain time window.
Both PDCCH candidate indices are the same, e.g. $m\_(s\_1, n\_CI)=m\_(s\_2,n\_CI)$, where s1 and s2 are the indices of the search space sets on which the PDCCH candidates were received and nCI is the carrier indicator field value, which is the same for both candidates.

Example 2a: Two successfully decoded DCIs are considered a duplicate if all conditions below are fulfilled.
DCI duplication is enabled for the UE.
Both DCIs are received in a USS.
Both DCIs have CRC scrambled with the same RNTI.
Both DCIs use the same DCI format.
If the DCIs are scheduling DL or UL data transmission, the HARQ process ID is the same in both DCIs.
Both DCIs are received within a certain time window.
The DCIs were received on CORESETs with different CORESET pool index.

Example 2b: Two PDCCH candidates are considered to belong to a duplication set if all conditions below are fulfilled.
DCI duplication is enabled for the UE.
Both PDCCH candidates correspond to a USS.
UE monitors DCIs with CRC scrambled with the same RNTI on both PDCCH candidates.
UE monitors DCIs with the same DCI format on both PDCCH candidates.
Both PDCCH candidates are received within a certain time window.
Both PDCCH candidates were received on CORESETs with different CORESET pool index.

In some cases, a UE can expect DCI duplication across a set of PDCCH candidates based on one or more conditions, e.g. as in the examples above.

In various cases, a UE does not expect a DCI to be duplicated within a PDCCH resource, e.g. if a duplication set includes no more than one PDCCH candidate from a PDCCH resource.

In some cases, this means the UE can expect that a DCI that is carried by a PDCCH on one of the PDCCH candidates in such a set is duplicated on each PDCCH candidate in the set. This could allow soft combining of PDCCH candidates in the set with reasonable UE complexity, but it would reduce the PDCCH transmission flexibility on the network side. Alternatively, this could allow a UE to skip receiving or decoding remaining PDCCH candidates in the set once it has successfully decoded a DCI from a PDCCH candidate in the set, since the UE expects the remaining PDCCH candidates in the duplication set to only carry DCI duplicates of the already decoded DCI.

In some cases, the UE can expect one or more of:
PDCCH transmission without duplication (DCI carried by one PDCCH transmitted on one PDCCH candidate in a duplication set, but not on others),
PDCCH transmission with partial duplication (DCI carried by multiple PDCCH transmitted on a subset of, but not all, the PDCCH candidates in a duplication set), or
PDCCH transmission with full duplication (DCI carried by PDCCH(s) transmitted on each PDCCH candidate in the duplication set).

This would allow flexibility on the network side to not duplicate DCI (e.g. single TRP transmission of PDCCH), some DCI duplication (e.g. "some-TRP" transmission of PDCCH) or full DCI duplication (e.g. "all-TRP" transmission of PDCCH).

Some DCIs are time-sensitive (see above). Methods and systems to handle this issue are described in more detail below.

Example UE Procedures

Figure 6B:
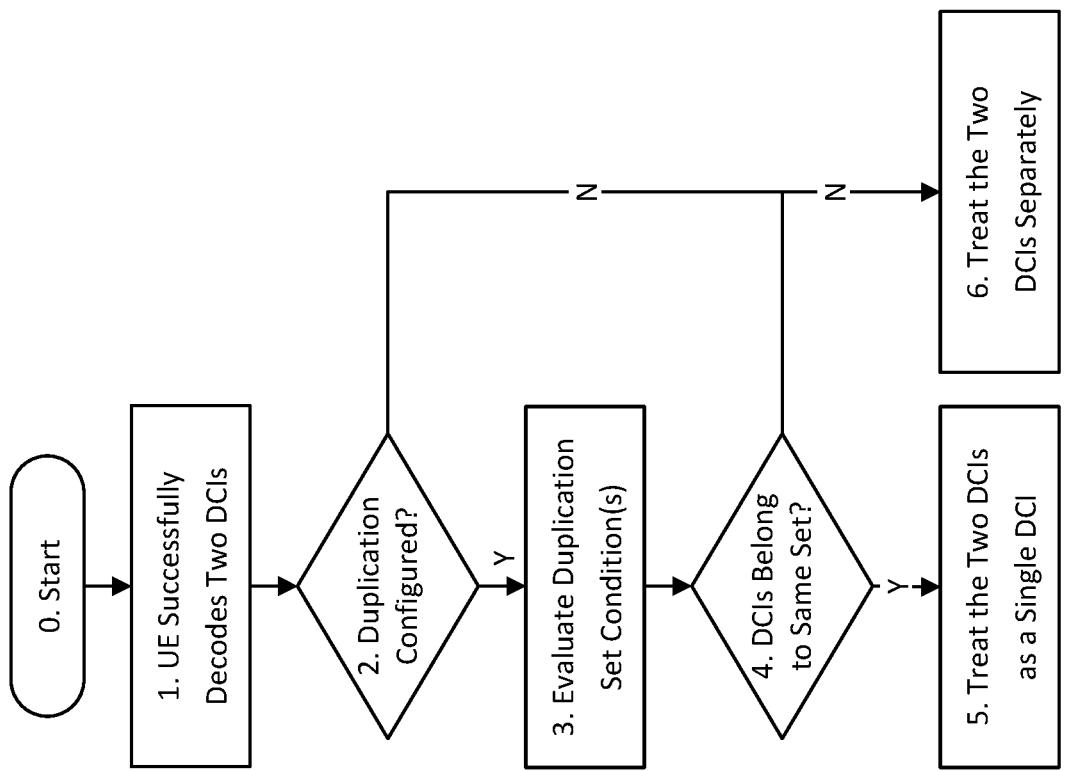
FIG. 6B illustrates procedure performed by the UE to determine DCI duplication.
Figure 6A:
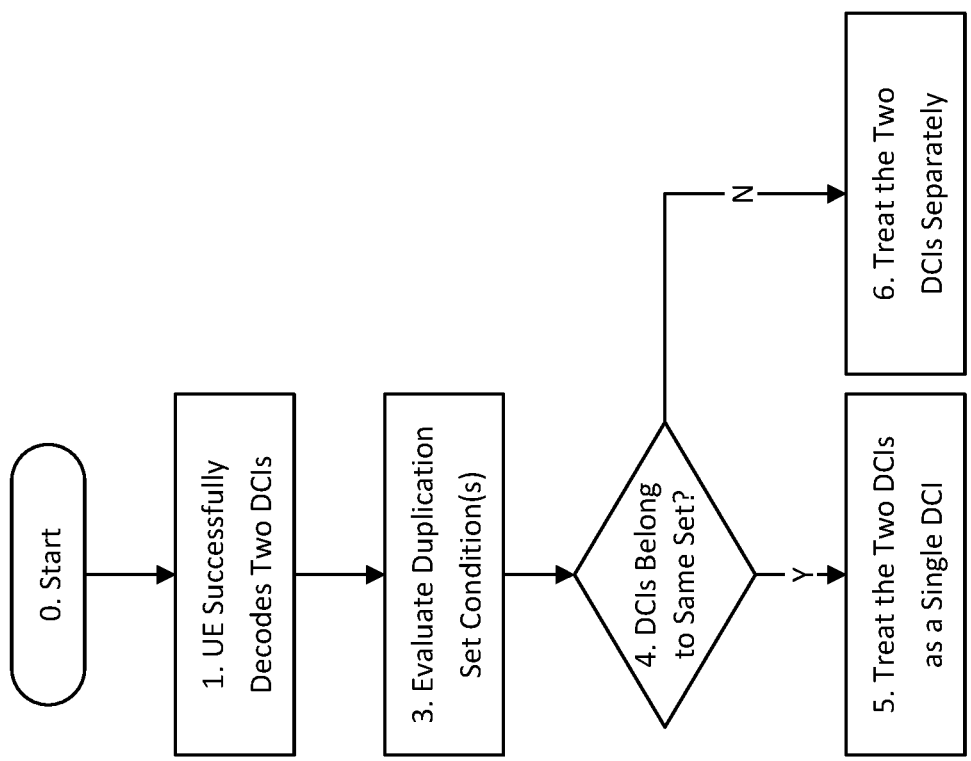
FIG. 6A illustrates procedure performed by the UE to determine DCI duplication.

Example UE procedures are illustrated in FIG. 6A and FIG. 6B. Upon PDCCH reception and successful decoding of two DCIs (e.g., step 211 or step 221), the UE evaluates if the two DCIs belong to the same duplication set (e.g., step 212 and step 213 or step 223 and step 224). If so, they are treated as a single DCI, which may solve the issue with duplication-sensitive DCIs (see below). If not, the DCIs are treated separately, e.g., the UE follows the indication(s) of each DCI. The difference between FIG. 6A and FIG. 6B is that FIG. 6B includes an additional check if the feature of DCI duplication is enabled, e.g. as in Table 10 and step 222. The procedure is readily generalized from two to multiple DCIs. As shown, FIG. 6A (Step 211-Step 215) and FIG. 6B (step 221-step 226) illustrate examples of procedures performed by a UE to determine DCI duplication.

Figure 7:
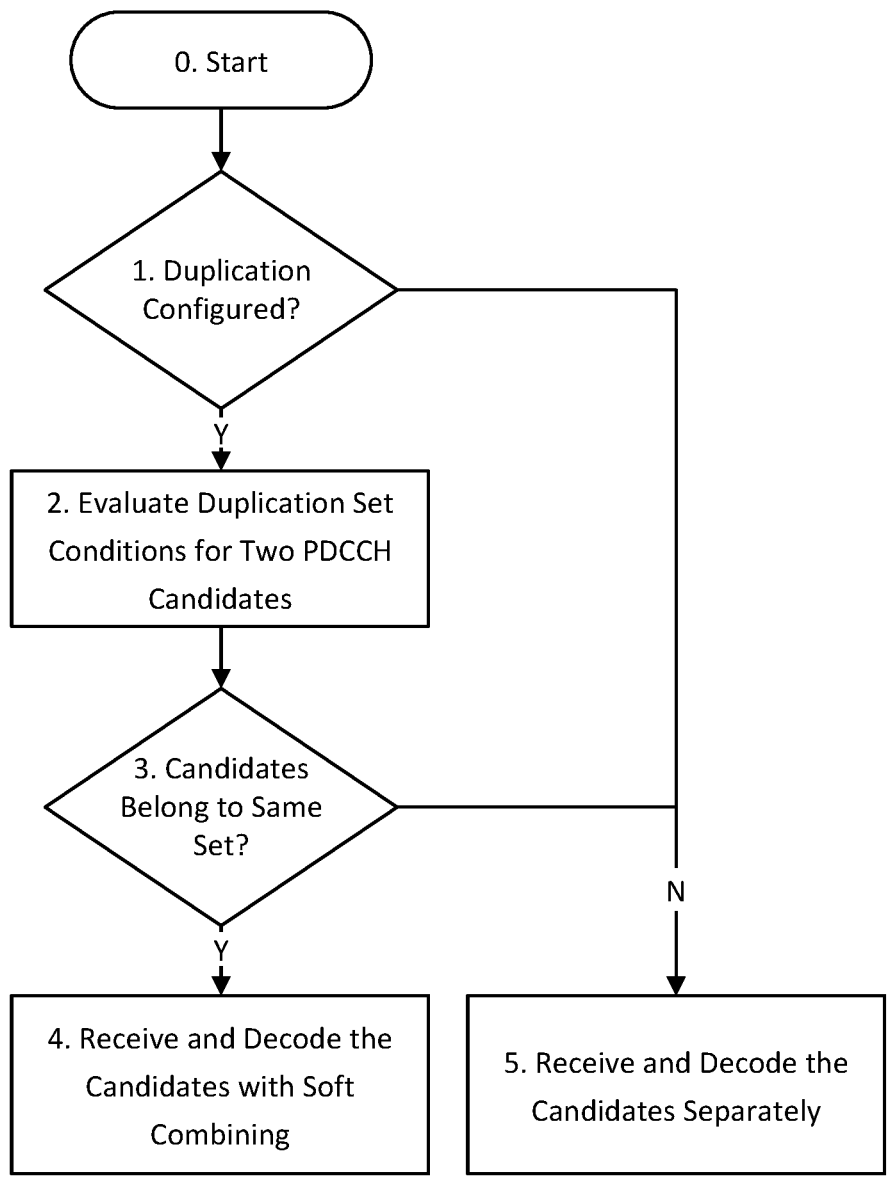
FIG. 7 illustrates procedures performed by a UE to determine PDCCH candidates for soft combining.

Another example procedure is illustrated in FIG. 7 (step 231-step 235) that illustrates UE procedures that may be performed to determine PDCCH candidates for soft combining. At step 231, a UE determines if DCI duplication has been configured. Step 231 may be omitted in some examples in which such an enabling configuration is not present. In step 232 and step 233, a UE evaluates if two PDCCH candidates belong to the same duplication set. If so, the UE receives and decodes these PDCCH candidates with soft combining (step 234). The UE may also receive and decode the PDCCH candidates without performing soft combining. Following step 234, the UE may also treat a successfully decoded DCI as a single DCI. If duplication was not configured, or the PDCCH candidates didn't belong to the same duplication set, the UE may receive and decode the PDCCH candidates separately, e.g. without soft combining (step 235). Following step 235, successfully decoded DCIs may be treated separately (step 236).

Figure 8:
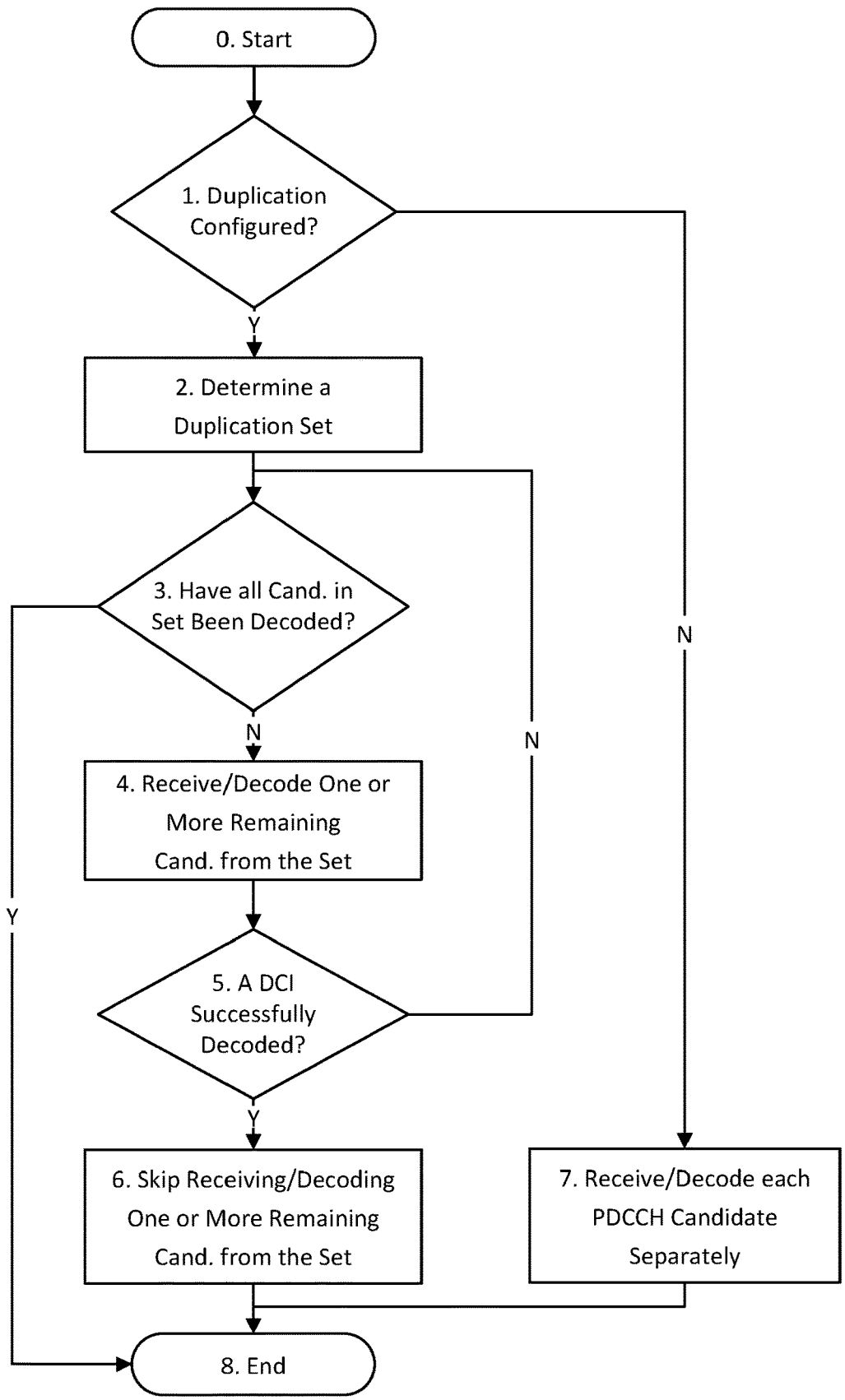
FIG. 8 illustrates procedure performed by a UE for reception or decoding of PDCCH candidates in a duplication set.

FIG. 8 illustrates a UE procedure in which the UE may skip receiving or decoding some PDCCH candidates, thereby reducing UE power consumption. In step 241, the UE determines if DCI duplication is configured. If not, the UE proceeds to step 247 and receives or decodes each PDCCH candidate separately, e.g. according to state-of-the-art procedures. If, on the other hand, DCI duplication is configured, the UE may proceed to determine a duplication set, e.g. as described above. In step 244, the UE may receive or decode one or more remaining PDCCH candidates from the duplication set, if any, e.g., candidates that have not yet been received or decoded. For example, if some of the PDCCH candidates in the duplication set are distributed in different TDMed PDCCH resource, the UE may receive or decode them in order of time. If some of these PDCCH candidates overlap in time, they may be received at the same time, but some associated processing and decoding may still be done sequentially, for example, channel estimation, equalization, demodulation, or decoding. If none of these received/decoded PDCCH candidates in the duplication set was successfully decoded, and there are remaining PDCCH candidates in the duplication set, the UE again receives or decodes one or more of those. If, on the other hand, one of the PDCCH candidates is successfully decoded, the UE may proceed to step 246, in which the UE may skip reception or decoding of remaining PDCCH candidates in the duplication set. The end step signifies the completion of reception and decoding of PDCCH candidates in a duplication set. Note that a duplication set may be localized in time, e.g. within a certain slot. Hence, the UE may repeatedly perform the procedure, or parts thereof, as time goes. In particular, step 242 to step 247 may be repeatedly performed as time goes and new duplication sets can be received or decoded. Also note that step 241 may be optional or not repeatedly performed. In general, some PDCCH candidates may belong to duplication sets, while other PDCCH candidates do not. Hence, a UE may perform a procedure according to step 224 to step 247 for such PDCCH candidates, while simultaneously performing separate PDCCH candidate reception and decoding for candidates that don't belong to a duplication set.

Methods and Systems Based on UE Selection of DCI(s) from DCI Set

In various cases, a UE receives and successfully decodes multiple DCIs and may discard one or more of them. In some cases, the UE may discard all but one DCI. In some cases, the UE may discard all but a few DCIs, for example two or three.

In various cases, the UE may select which DCI(s) to discard and which DCI(s) to act upon.

In various cases, the UE may determine a duplication set, e.g. as described above. The UE may determine a DCI set as a set of successfully decoded DCIs from PDCCH candidates belonging to a duplication set.

For example, a duplication set may include two PDCCH candidates, e.g. corresponding to two different TRPs. When the network transmits a DCI duplicated on the two PDCCH candidates or different DCIs on the two PDCCH candidates, the UE may successfully decode a DCI from either or both of the PDCCH candidates, e.g. depending on the radio conditions. This means that the DCI set comprises the DCI carried on the first PDCCH candidate, if only the DCI carried on the first PDCCH candidate was successfully decoded. The DCI set comprises the DCI carried on the second PDCCH candidate, if only the DCI carried on the second PDCCH candidate was successfully decoded. The DCI set comprises both the DCI carried on the first PDCCH candidate the DCI carried on the second PDCCH candidate, if both DCIs were successfully decoded.

Note that the DCIs in a DCI set may be identical (e.g. same DCI format, RNTI, parameter values, etc.), or different (e.g. one or more of DCI format, RNTI and parameter values are different).

In one example, DCIs carried in a duplication set (and consequently DCIs in a DCI set) may include some identical parameters, for instance parameters corresponding to the reception of PDSCH, e.g. one or more of the following: carrier indicator; frequency domain resource assignment; time domain resource assignment; VRB-to-PRB mapping; PRB bundling size indicator; rate matching indicator; MCS(s); New data indicator(s); Redundancy version(s); HARQ process number; Antenna port(s); CBG transmission information; CBG flushing out information; DMRS sequence initialization; or TCI.

For example, parameters that may differ between DCIs carried in a duplication set may include parameters related to a subsequent UL transmission, e.g. HARQ-ACK, PUCCH or CSI related parameters, such as one or more of the following: TPC command for scheduled PUCCH; PUCCH resource indicator; or PDSCH-to-HARQ_feedback timing indicator.

In some cases, a Transmission configuration indication (TCI) value may be different in different DCIs in a duplication set.

Note that in some cases, scheduling a PDSCH with a DCI may mean herein that the PDSCH is transmitted with some form of repetition scheme (different TCI states may be applied to different repetitions, sequentially or cyclically), for example one of the schemes described in 38.214: 'FDMSchemeA'; 'FDMSchemeB'; 'TDMSchemeA' (intra-slot repetition); "TDM scheme B" (e.g. "When a UE is configured by the higher layer parameter PDSCH-config that indicates at least one entry in pdsch-TimeDomainAllocationList including RepNumR16 in PDSCH-TimeDomain-ResourceAllocation", which may correspond to inter-slot repetition); or "SDM scheme" (e.g. "when a UE is not indicated with a DCI that DCI field "Time domain resource assignment' indicating an entry in pdsch-TimeDomainAllocationList which include RepNumR16 in PDSCH-TimeDomainResourceAllocation, and it is indicated with two TCI states in a codepoint of the DCI field 'Transmission Configuration Indication' and DM-RS port(s) within two CDM group in the DCI field "Antenna Port(s)"").

In some cases, a UE would successfully decode multiple DCIs in a duplication set, e.g. the corresponding DCI set would include multiple DCIs. In some cases, the multiple DCIs would schedule the same PDSCH, e.g. the PDSCH-related parameters would be the same in the DCIs in the DCI set. In some cases, the multiple DCIs would schedule a PDSCH with the same properties using different parameters, for example if the DCIs were received in different PDCCH monitoring occasions.

However, the DCIs in a DCI set that schedule a PDSCH may include different indications in other regards. In an example, different DCIs indicate different PUCCH resource, e.g. through different values of: "PUCCH resource indicator" or "PDSCH-to-HARQ_feedback timing indicator". In another example, different DCIs indicate different PUCCH TPC commands, e.g. through different values of "TPC command for scheduled PUCCH".

By indicating different PUCCH resources, which may correspond to different UE Tx beams through different spatial relation configurations, the network may introduce spatial diversity in a subsequent PUCCH transmission. The subsequent PUCCH transmission may be used for HARQ-ACK.

Figure 9:
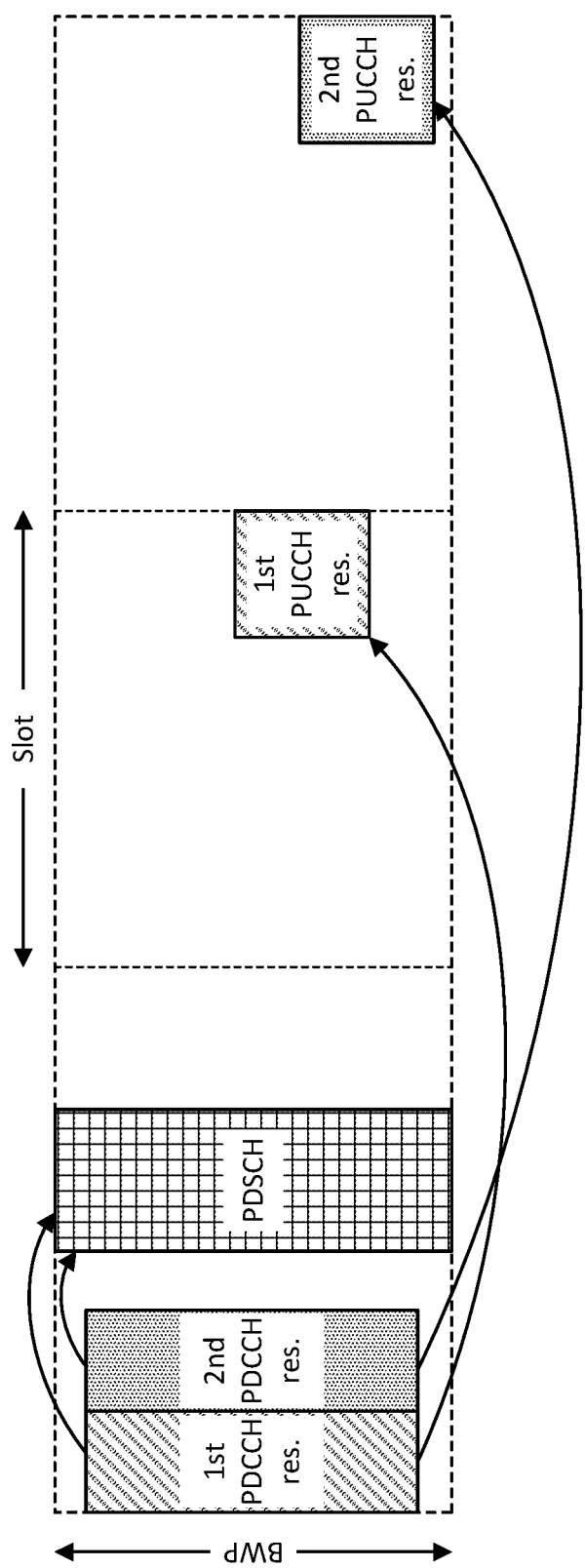
FIG. 9 illustrates a case that two PDCCH indicate that same PDSCH but different PUCCH resources, for the special case that the PDCCH, PDSCH and PUCCH are in the same BWP (e.g. also same carrier).

For example, consider a case with a duplication set of two PDCCH candidates, for example transmitted by two different TRPs, each PDCCH carrying a DCI that schedules the same PDSCH, as illustrated in FIG. 9. The two DCIs, however, indicate different PUCCH resources. Consider a case that a UE successfully decodes only the first DCI, which was transmitted by the first TRP, but not the second DCI, which was transmitted by the second TRP. In this case, the UE will use the first PUCCH resource indicated by the first DCI. This PUCCH resource may correspond to a UE Tx beam directed at the first TRP. This may be advantageous if the link between the second TRP and the UE is blocked. In another case, only the DCI from the second TRP is successfully decoded. In this case, the UE will use a second PUCCH resource, as indicated in the second DCI. The UE Tx beam configured for the second PUCCH resource may advantageously be directed to the second TRP by previous configuration and indication. In other words, the reliability of a PUCCH following a scheduled PDSCH can be increased by letting the different DCIs in a DCI set that are transmitted from different TRPs indicate different PUCCH resources that are associated with beam directed towards the corresponding TRP. This increased PUCCH reliability can be achieved at least for cases in which there is a correlation between the PDCCH reliability and the corresponding PUCCH reliability, e.g. when the PDCCH is transmitted in the same band as the PUCCH.

FIG. 9 is an illustration of the case that two PDCCH indicate that same PDSCH but different PUCCH resources, for the special case that the PDCCH, PDSCH and PUCCH are in the same BWP (e.g. also same carrier).

In some cases, the UE may successfully decode multiple DCIs from a duplication set, e.g. the corresponding DCI set will include multiple DCIs. In this case, these DCIs may include indications for different PUCCH resources. In some cases, a UE would transmit the multiple indicated PUCCH. In other cases, the UE may select one or a subset of the PUCCH resources indicated by the DCIs in the DCI set. This UE selection of one or a subset of the DCIs, whose content the UE will follow, may be based on a set of criteria. The criteria may include one or more of the following:

Any successfully decoded DCI is followed (no selection).

A measurement of a reference signal associated with the different PDCCHs carrying the DCIs in the DCI set is used to determine which DCI(s) to follow. For example, the UE may use the PDCCH DM-RS or a CSI-RS associated with the PDCCH, e.g. a CSI-RS or an SSB that is configured or indicated to be QCL with the PDCCH DM-RS. The measurement may be RSRP, RSRQ or SINR. In one example, the UE may use the DCI(s) corresponding to the highest measurement result(s). In another example, the UE may select any DCI as long as its measurement result is above a threshold, which may be configurable.

It is up to the UE to select which one or more DCIs from the DCI set to follow.

The UE selects a DCI that indicates a PUCCH resource that does not collide with another signal or channel.

The UE selects a DCI that indicates a PUCCH resource that results in the lowest latency or a latency within a certain latency limit.

The UE selects one or more DCIs from the DCI set to follow based on the UE capability. For example, if multiple DCIs indicate PUCCH resources that overlap in time, the UE may select those multiple DCIs if the UE is capable to transmit the overlapping PUCCH, for instance if the UE has multi-panel transmission capability.

In some cases, multiple DCIs in a DCI set indicate the same PUCCH resource. The PUCCH resource may be associated with multiple UL Tx beams. For example, the PUCCH resource may have two activated spatial relation infos (e.g. with a PUCCH-SpatialRelationInfoId), where each spatial relation info may correspond to an UL Tx beam. The different activated spatial relation infos of a PUCCH resource may correspond to different TRPs. For example, different activated spatial relation infos of a PUCCH resource may be associated with different values of a CORESET pool indices (e.g. parameter CORESETPoolIndex). The UE may select one or both of the two activated spatial relation infos of the indicated PUCCH resource, for example based on one or more of the criteria proposed above. For instance, if a UE successfully decodes only a single DCI, the UE may select the spatial relation info that is associated with the same CORESET pool index as the CORESET on which the decoded DCI was received.

Beside the indication of a PUCCH resource, and possibly indirectly a UE Tx beam to use for PUCCH, the DCIs may indicate different PUCCH TPC commands. In some cases, the UE may maintain separate power control loops (states) for different groups of PUCCH resources. Different groups of PUCCH resources may be associated with different CORESET pool indices, e.g. different CORESET pool indices may have separate PUCCH transmit power control loops. If a UE receives a PUCCH TPC command in a successfully decoded DCI received on a CORESET with a CORESET pool index, the UE may apply the PUCCH TPC command to the power control loop associated with the same CORESET pool index.

Note that for the case that a UE may select a DCI from multiple DCIs in a DCI set, the UE may continue receiving and decoding PDCCH candidates also after a DCI has been successfully decoded from a PDCCH candidate in the duplication set. This may be contrary to some examples given above in which the UE skipped reception or decoding of some PDCCH candidates.

In some cases, a UE would successfully decode multiple DCIs in a duplication set, e.g. the corresponding DCI set would include multiple DCIs. In some cases, the multiple DCIs would schedule the same PDSCH, e.g. the PDSCH-related parameters would be the same in the DCIs in the DCI set, except the indicated TCI. In some cases, the indicated TCI needs to be the same for DCIs received on PDCCH resources associated with the same CORESET pool index, e.g. the indicated TCI may be different in DCIs received on PDCCH resources associated with different CORESET pool indices.

In some cases, the UE does not expect to be indicated with a higher number of different TCI states (across the DCIs corresponding to a PDSCH transmission, possibly including PDSCH repetition) for the scheduled PDSCH(s) (possibly incl. repetitions) than the maximum number of TCI states for such PDSCH transmission, where the maximum number may be based on the specification, the UE capability or configuration from the network.

The UE may receive the subsequent PDSCH(s) based on the set of TCI states (e.g. T DCI states) indicated across the different DCIs.

For example, consider a duplication set with two PDCCH candidates. If the UE receives a DCI only on the first candidate in the set, it may use the TCI indicated in DCI carried on the first PDCCH candidate when receiving the PDSCH(s). Similarly, if the UE receives a DCI only on the second candidate, it may use the TCI indicated in the second DCI when receiving the PDSCH(s). If the UE successfully receives DCIs on both PDCCH candidates in the set, and the TCIs indicate different TCI states, the UE may apply both TCI states when receiving the PDSCH. The network may transmit PDSCH assuming that the UE receives both DCIs, which should be the normal case. If one link is blocked, both the of the PDCCHs may be lost, but also a part of the subsequent PDSCH(s) corresponding to the TCI state not received.

In various cases, PDCCHs received from different TRPs, e.g. on different PDCCH resources, schedule different PDSCHs or PUSCHs transmissions. The different PDSCHs or PUSCHs may carry the same transport block, for instance different redundancy versions, or different transport blocks. In some cases, these PDCCHs are received in a duplication set, even though DCI duplication as such is not applicable in this case. Still, the corresponding functionality of linking PDCCH candidates may be useful. For example, consider a UE that receives two PDCCHs, which schedule different PDSCHs, e.g. time- or frequency-multiplexed. In some cases, if the two PDCCHs belong to the same duplication set, the UE expects the corresponding different PDSCHs to carry repetition(s) of the same transport block, for instance using different redundancy versions (each PDCCH may schedule PDSCH with repetition). In various cases, the TCI state(s) used to receive one of these PDSCHs is based on the PDCCH/DCI that scheduled the corresponding PDSCH. Hence, if the UE only correctly decodes one PDCCH (from one TRP), the UE might receive PDSCH(s) using only TCI state(s) based on that PDCCH. Note that if the DCI includes a TCI state indication, it may be possible for a PDCCH from a first TRP to indicate a TCI state corresponding to a second TRP or to indicate two TCI states that correspond to the first and the second TRP, respectively. Hence, it is possible to schedule a multi-TRP PDSCH transmission using a single PDCCH from a TRP, as in state-of-the-art systems.

Framework 2: Multiple Activated TCI States Per CORESET

Overview

In various embodiments discussed above, there is no more than one activated TCI state for a CORESET. In Framework 2, the maximum number of activated TCI states for a CORESET is increased to more than one. Since a TCI state may be associated with a TRP, multiple activated TCI states per CORESET means that a UE may receive one or more PDCCH(s) in a PDCCH resource from multiple TRPs.

In some cases, the multiple activated TCI states are applied to a PDCCH candidate, e.g. each PDCCH candidate corresponding to the CORESET. This means that multi-TRP diversity gain can be obtained also when receiving a single PDCCH candidate.

Methods and systems to achieve the multiple activated TCI states for a PDCCH candidate based on applying the different TCI states to different FDMed resources are disclosed below.

Methods and system may be based applying the multiple activated TCI states to overlapping resources, e.g. SDM, are disclosed below.

The T TCI state ID(s) associated with the CORESET are ordered and indexed as t=0, ..., (T−1), where t is a TCI state ID index for this CORESET (not the TCI state ID) and T is the number of activated TCI state IDs for this CORESET.

The activated TCI state ID(s) for a CORESET may be ordered (1st TCI state ID, 2nd TCI state ID, etc.) according to an ordinal position in a MAC CE or an ordinal position of the corresponding MAC CE, e.g. as described below.

FDM Scheme 2.1: TCI State Per REG Bundle

In various cases, a PDCCH candidate comprises a set of CCEs. Different PDCCH candidates comprise different sets of CCEs. In various cases, a CCE comprises a set of REG bundles, e.g. 1, 2 or 3 REG bundles. In some cases, a UE may assume that the same precoding is used at the DL Tx side within an REG bundle, for example when the CORESET is configured with parameter precoderGranularity set to sameAsREG-bundle. For some cases in which a CORESET is associated with multiple TCI states, different TCI states may be applied to different REG bundles within a CORESET.

For example, T TCI state IDs can be consecutively assigned to T REG bundles in frequency order and then cyclically assigned across all REGs of the CORESET, as illustrated in Table 4, with T=2. If the REG bundles are assigned indices i=0, 1, 2, ..., (the number of REG bundles in CORESET−1), the REG bundle i may be assigned TCI state mod(i, T), where mod(a,b) is the "a modulo b" operation.

In another example, different TCI states are assigned to (roughly) the same number of consecutive REG bundles, e.g. similarly as for PDCCH candidates described above. For example, with T=2, the lower (e.g. in index or frequency) half of the REG bundles are assigned to the first TCI state t=0 and the upper half of the REG bundles are assigned to the other TCI state t=1.

An advantage of TCI state assignment per REG bundle is that the diversity offered by multiple TCIs states, e.g. corresponding to multiple TRPs, may be obtained within the CCEs.

Figure 10:
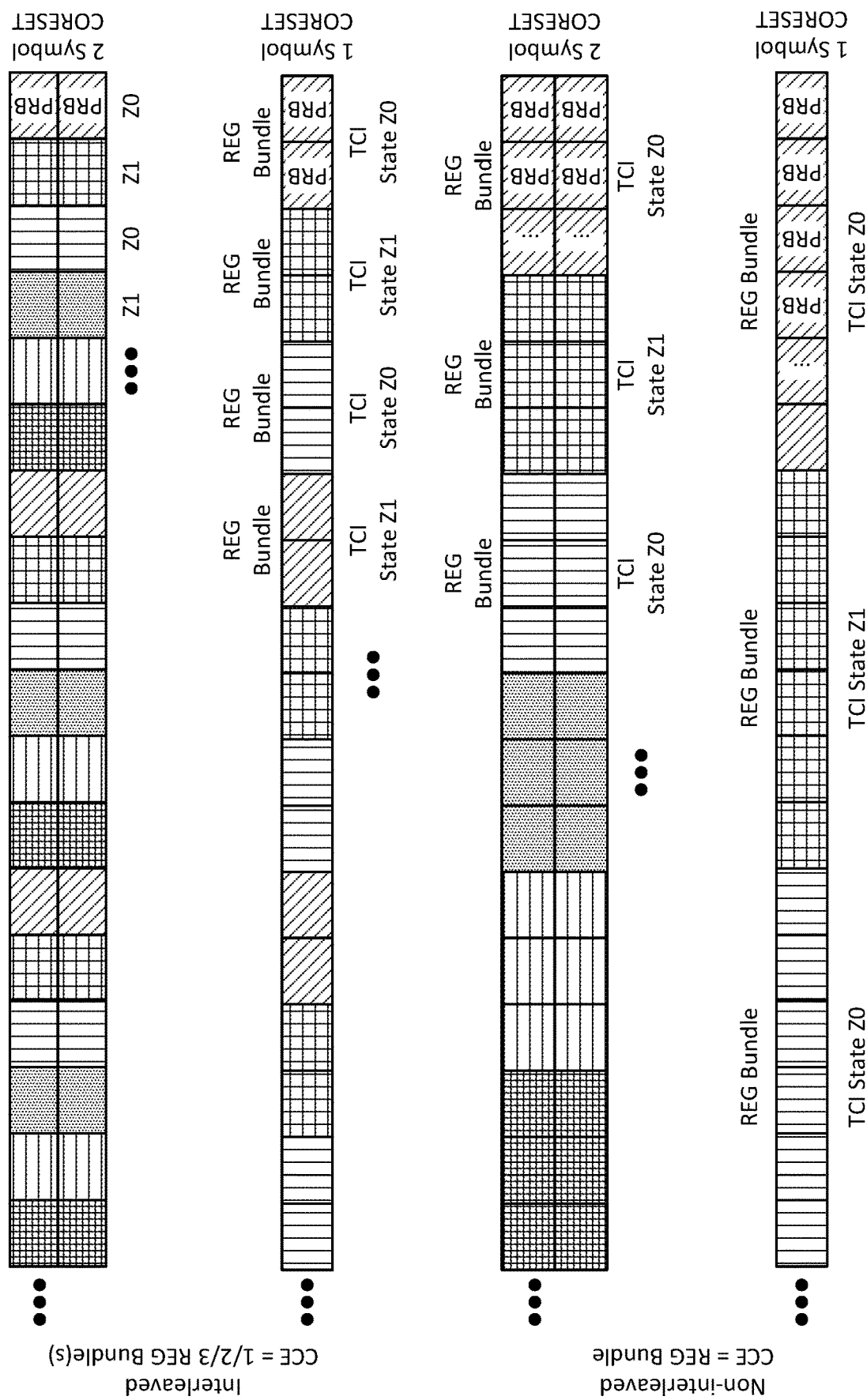
FIG. 10 illustrates an assignment of two TCI states (Z0 and Z1) per REG bundle for various CORESET configurations.

FIG. 10 illustrates an assignment of two TCI states (Z0 and Z1) per REG bundle for various CORESET configurations.

In some cases, TCI states are assigned to REG bundles by using a bitmap, for example as illustrated in Table 12 (an example implementation of TCI state assignment to different REG bundles by using a bitmap). For example, the most significant (left) bit represents the first REG bundle (e.g. i=0) and the second most significant (left) bit represents the second REG bundle (e.g. i=1) and so on. The length of the bitmap could for instance be fixed (e.g. the maximum number of REG bundles in a CORESET) or flexible (e.g. equal to the number of REG bundles in the CORESET). The two bit values could correspond to the two TCI states, e.g. '0' could correspond to the first activated TCI state ID and '1' could correspond to the second TCI state ID.

TABLE 12

ControlResourceSet information element

-- ASN1START
-- TAG-CONTROLRESOURCESET-START
ControlResourceSet ::=        SEQUENCE {
    controlResourceSetId        ControlResourceSetId,

TABLE 12-continued

ControlResourceSet information element

```
-- SOME PARTS REMOVED FOR BREVITY
    ...,
    [[
    TCIStateREGBundleMap    BIT STRING (SIZE (M))    OPTIONAL, -- Need R
    ]]
}
-- TAG-CONTROLRESOURCESET-STOP
-- ASN1STOP
```

FDM Scheme 2.2: TCI State Per CCE

In some cases, in which a CORESET is associated with multiple (T) TCI state IDs, a TCI state may be assigned per CCE.

Similarly as for REG bundles as described above, if CCEs can for example be indexed as j=0, 1, . . . (the number of CCEs in CORESET−1), TCI state ID index mod(j, T) may be assigned to CCE j.

In another example, different TCI states are assigned to (roughly) the same number of consecutive CCEs, e.g. similarly as for PDCCH candidates described above. For example, with T=2, the lower (e.g. in index or frequency) half of the CCEs are assigned to the first TCI state t=0 and the upper half of the CCEs are assigned to the other TCI state t=1.

In some cases, TCI states are assigned to CCEs by using a bitmap, for example as illustrated in Table 13 that illustrates an example of an implementation of a TCI state assignment to different REG bundles by using a bitmap. For example, the most significant (left) bit represents the first CCE (e.g. j=0) and the second most significant (left) bit represents the second CCE (e.g. j=1) and so on. The length of the bitmap could for instance be fixed (e.g. the maximum number of CCEs in a CORESET) or flexible (e.g. equal to the number of CCs in the CORESET). The two bit values could correspond to the two TCI states, e.g. '0' could correspond to the first activated TCI state ID and '1' could correspond to the second TCI state ID.

TABLE 13

ControlResourceSet information element

```
-- ASN1START
-- TAG-CONTROLRESOURCESET-START
ControlResourceSet ::=    SEQUENCE {
    controlResourceSetId    ControlResourceSetId,
--SOME PARTS REMOVED FOR BREVITY
    ...,
    [[
    TCIStateCCEMap   BIT STRING (SIZE (M))    OPTIONAL,
-- Need R
    ]]
}
-- TAG-CONTROLRESOURCESET-STOP
-- ASN1STOP
```

FDM Scheme 2.2: TCI State Per CCE

In some cases, in which a CORESET is associated with multiple (T) TCI state IDs, a TCI state may be assigned per CCE.

Similarly as for REG bundles as described above, if CCEs can for example be indexed as j=0, 1, . . . (the number of CCEs in CORESET−1), TCI state ID index mod(j, T) may be assigned to CCE j.

In another example, different TCI states are assigned to (roughly) the same number of consecutive CCEs, e.g. similarly as for PDCCH candidates described below. For example, with T=2, the lower (e.g. in index or frequency) half of the CCEs are assigned to the first TCI state t=0 and the upper half of the CCEs are assigned to the other TCI state t=1.

Figure 11:
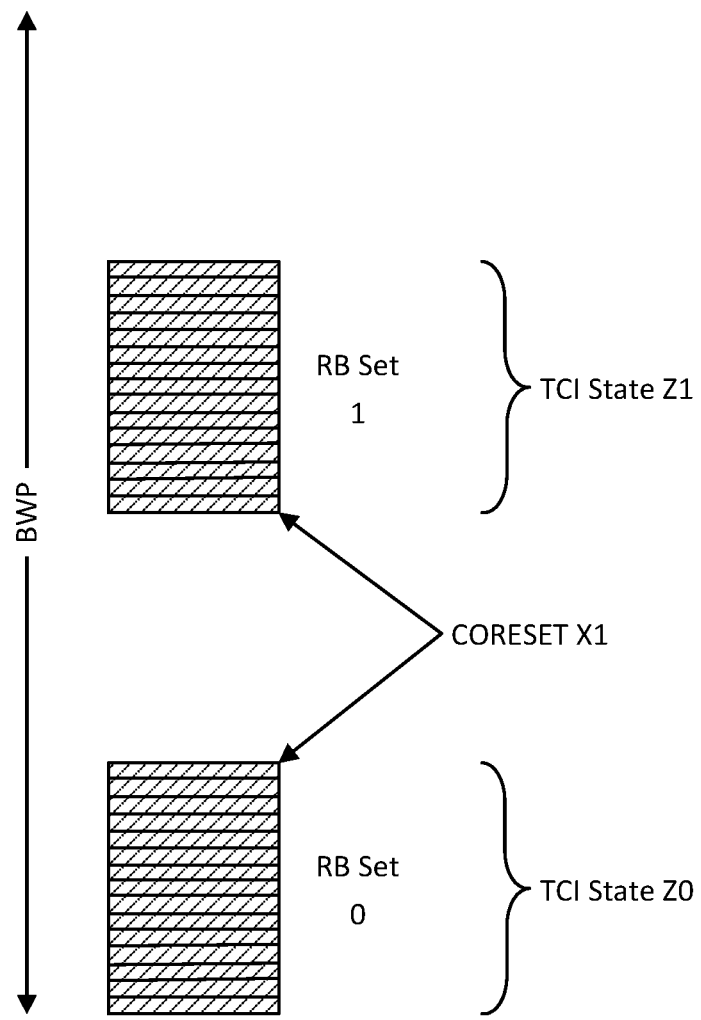
FIG. 11 illustrates an assignment of two TCIs states to a CORESET comprising two sets of contiguous RBs.

In some cases, TCI states are assigned to CCEs by using a bitmap, for example as illustrated in FIG. 11 that illustrates an implementation of a TCI state assignment to different CCEs by using bitmap. For example, the most significant (left) bit represents the first CCE (e.g. j=0) and the second most significant (left) bit represents the second CCE (e.g. j=1) and so on. The length of the bitmap could for instance be fixed (e.g. the maximum number of CCEs in a CORESET) or flexible (e.g. equal to the number of CCs in the CORESET). The two bit values could correspond to the two TCI states, e.g. '0' could correspond to the first activated TCI state ID and '1' could correspond to the second TCI state ID.

FDM Scheme 2.3: TCI State Per Subset of RBs that is Contiguous in Frequency

In some cases, a UE assumes that the same DL Tx precoder is used over a set of contiguous RBs, for example when the CORESET is configured with parameter precoderGranularity set to allContiguousRBs.

Similarly as for REG bundles and CCEs above, if the sets of contiguous RBs within a CORESET can be indexed as m=0, 1, . . . , (number of sets of contiguous RBs within the CORESET−1), e.g. in frequency order, TCI state ID index mod(m, T) may for example be assigned to contiguous RB set m. This is illustrated in FIG. 11, with T=2 and two sets of contiguous RBs.

In another example, different TCI states are assigned to (roughly) the same number of consecutive sets of contiguous RBs, e.g. similarly as for PDCCH candidates in described above. For example, with T=2, the lower (e.g. in index or frequency) half of the sets are assigned to the first TCI state t=0 and the upper half of the sets are assigned to the other TCI state t=1.

SDM Scheme 2.4: Multiple SDMed TCI States Per CORESET

In some embodiments, in which multiple TCI state IDs can be activated for a CORESET, the multiple TCI state IDs are associated with the same PDCCH DMRS port. In other words, orthogonal time-frequency CORESET resources are not associated with different TCI state IDs, as in some schemes described above. Instead, the multiple activated TCI state IDs are associated with the same resources, e.g. RB of the CORESET. In practice, this may mean that multiple TRPs transmit PDCCH(s), e.g. the same PDCCHs, on the same time-frequency resources, e.g. using the same DMRS sequence. In some cases, the different TCI state IDs may be associated with different DMRS sequences. For example, if up to two TCI state IDs may be activated for a CORESET, an optional second DMRS sequence may be configured for a CORESET, as illustrated in Table 14 that illustrates a CORESET with multiple configured DMRS sequences.

TABLE 14

ControlResourceSet information element

```
-- ASN1START
-- TAG-CONTROLRESOURCESET-START
ControlResourceSet ::=          SEQUENCE {
    controlResourceSetId        ControlResourceSetId,
--SOME PARTS REMOVED FOR BREVITY
    pdcch-DMRS-ScramblingID     INTEGER (0 ... 65535)       OPTIONAL, -- Need S
    ...,
    [[
    pdcch-DMRS-ScramblingID2-r17    INTEGER (0 ... 65535)   OPTIONAL, --Need R
    ]]
}
-- TAG-CONTROLRESOURCESET-STOP
-- ASN1STOP
```

It may be up to the UE how to receive such a CORESET. If the UE has multi-panel reception capability, it may receive the CORESET using one TCI state ID on one panel and using another TCI state ID on another panel. In other cases, a UE may choose one of the TCI state IDs prior to PDCCH reception, e.g. based on measurements on RS that are included in the multiple activated TCI states.

Multiplexing Scheme 2.5: TCI State Per PDCCH Candidate

In some cases, different PDCCH candidates in a PDCCH resource are associated with different TCI states. In one example, two TRPs could transmit the same DCI on two different PDCCH candidates of the same PDCCH resource. Depending on for example a UEs capabilities or recently estimated channel conditions, a UE may try to receive one or both PDCCH candidates.

In some cases, a duplication set (as described above) may be defined for PDCCH candidates within a PDCCH resource, such that a UE can determine on which PDCCH candidates to expect duplication/repetition.

In some cases, the association of TCI state per PDCCH candidate within a PDCCH resource is combined with duplication across multiple monitoring occasions For example, PDCCH candidates in a PDCCH resource for an aggregation level L may be indexed as $m_{s,nCI} = 0, \ldots, M_{s,nCI}^{(L)}-1$, where $M_{s,nCI}^{(L)}$ is the number of PDCCH candidates the UE is configured to monitor for aggregation level L of a search space set s for a serving cell corresponding to nCI (see above).

In some cases, the T activated TCI state Ids associated with the PDCCH resource are cyclically assigned to the PDCCH candidates, e.g. the T TCI state Ids are consecutively assigned to candidates $m_{s,nCI}=0, \ldots, T-1$ and $m_{s,nCI}=T, \ldots, 2T-1$, etc., assuming $T < M_{s,nCI}^{(L)}$.

In some cases, the T activated TCI state Id are assigned such that the first TCI state Id index (t=0) is assigned to a number of, for example, V consecutive PDCCH candidate indices (e.g. $m_{s,nCI}=0, \ldots, V-1$, where $V=\lfloor (M_{s,nCI}^{(L)}/T \rfloor$ or $V=\lceil (M_{s,nCI}^{(L)})/T \rceil$), the second TCI state Id index (t=1) is assigned to the next, for example, V consecutive PDCCH candidate indices, etc., until the last TCI state Id index (t=T-1) is assigned to the last consecutive PDCCH candidate indices (e.g. $M_{s,nCI}=V(T-1), \ldots, M_{s,nCI}^{(L)})-1$).

MAC CE for Activating Multiple TCI States for a CORESET

An Example MAC CE that Activates Two TCI States for a CORESET

In various cases, multiple TCI states can be activated for a CORESET, e.g. by a MAC CE indicating two TCI state IDs, as illustrated below. TCI State ID0 may correspond to a first activated TCI state for the CORESET and TCI State ID1 may correspond to a second activated TCI state for the CORESET.

The TCI State Indication for UE-specific PDCCH MAC CE is identified by a MAC subheader with a logical channel ID (LCID). This logical channel ID may be a newly specified logical channel ID for the purpose of activating multiple TCI states for a CORESET and differentiating this MAC CE from legacy MAC CEs. It may have a fixed size of 24 bits with following fields: Serving Cell ID, CORESET ID, TCI State IDi, or Reserved bit (e.g., R set to 0).

Serving Cell ID: This field indicates the identity of the Serving Cell for which the MAC CE applies. The length of the field is 5 bits.

CORESET D: This field indicates a Control Resource Set, e.g. identified with ControlResourceSetId as specified in 38.331 [6], for which the TCI States is being indicated. In case the value of the field is 0, the field refers to the Control Resource Set configured by controlResourceSetZero as specified in 38.331 [6]. The length of the field is 4 bits.

TCI State IDi: This field indicates an ith TCI state, e.g. identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

R: Reserved bit, set to 0.

Figure 12:
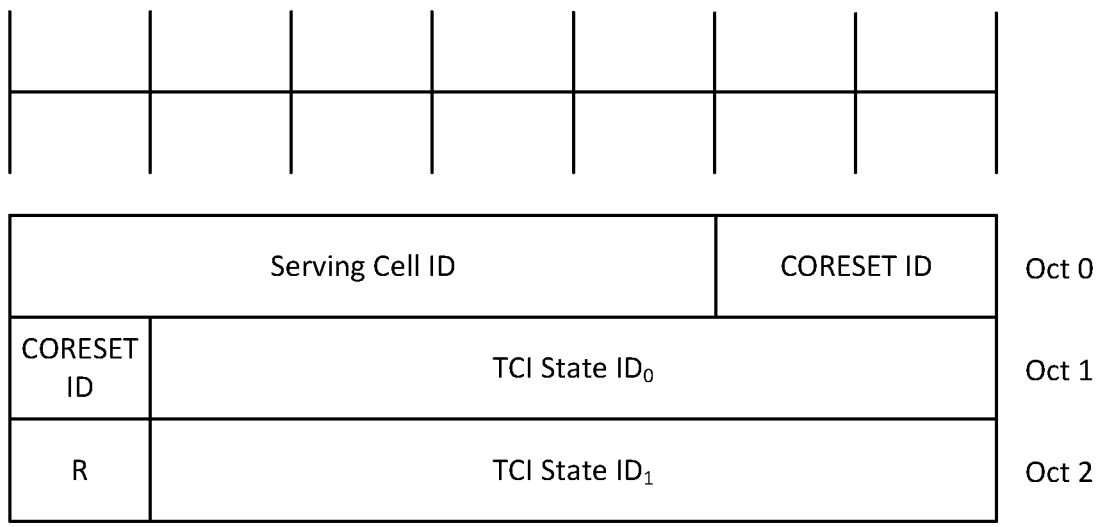
FIG. 12 illustrates an example indication of two TCI State IDs for UE-specific PDCCH MAC CE.

FIG. 12 illustrates an example of an Example indication of two TCI State IDs for UE-specific PDCCH MAC CE.

In the case more than two TCI state IDs are activated for a CORESET, the MAC CE may be extended by one additional octet per additional activated TCI state ID, where each additional octet may include a reserved bit R and a 7 bits TCI State ID. Furthermore, the MAC CE may be of a variable size with a length indicator filed, wherein the length indicator may indicate how many TCI State IDs is configured for the CORESET indicated by the CORESET ID field.

Activating Two TCI States for a CORESET by Using Multiple MAC CEs

In various cases, multiple TCI states (e.g. 2) can be activated for a CORESET by multiplexing multiple MAC CEs for CORESET TCI state ID activation (e.g. 2) into the same MAC PDU, where each of these multiple MAC CEs activate a single TCI state for the same serving cell (Serving cell ID is identical in the multiple MAC CEs) and CORESET (CORESET ID is identical in the multiple MAC CEs), e.g. by using a MAC CE. Note that a MAC PDU carrying multiple MAC CEs that activate multiple TCI state IDs for a CORESET in a serving cell may also carry other MAC CEs activating single or multiple TCI states for other CORESET(s) or serving cell(s).

An example UE procedure is given below, with two indicated TCI states for simplicity. In a first step, UE successfully decodes a PDSCH that carries at least one MAC CE for TCI State Indication for UE-specific PDCCH MAC CE. In a second step, for each such MAC CE in the MAC PDU: a) Determine (s,c): s=Serving cell ID and c=CORESET ID indicated in the MAC CE; or b) if the number of activated TCI states for (s,c) is less than a maximum value (optional condition), activate the indicated the TCI State ID for (s,c).

The condition in step 2.b may be removed in various cases, e.g. if the UE does not expect to have more TCI state IDs activated for a serving cell and CORESET than a maximum value. The maximum value may be based on a reported UE capability, e.g. that the UE supports two activated TCI states for a CORESET, or a network configuration, e.g. that maximum two activated TCI states for a CORESET are enabled.

In case of multiple TCI states IDs activated for a CORESET, the TCI state IDs may be ordered based on the order (e.g. ordinal position) of the corresponding MAC CEs in the MAC PDU, so that one TCI state ID is the 1st activated TCI state ID for the CORESET, another TCI state ID is the 2nd activated TCI state ID for the CORESET, etc.

In some cases, a CORESET can be configured to operate with two activated TCI state IDs. If so, UE can maintain a set of one or two activated TCI state IDs for the CORESET. If a UE receives a MAC CE to activate one TCI state ID, it activates this TCI state ID for the CORESET if the number of already activated TCI state IDs is less than two. If the number of already activated TCI state IDs for the CORESET is two, the UE still activates the newly received TCI state ID, but simultaneously deactivates an already activated TCI state ID, for example the TCI state ID that was activated for the CORESET the longest time ago, or during reception of prior or preceding MAC PDU. If the UE receives activation for two TCI state IDs in a MAC PDU, the UE activates these two TCI state IDs and deactivates the previously activated 1 or 2 TCI state ID(s).

Reference PDCCH Resource

In some cases, PDCCHs received on multiple PDCCH resources carrying duplicated DCIs are received in different sets of symbols. For example, the corresponding PDCCH resources can be TDMed as in FIG. 4. In other cases, a PDCCH carrying a DCI is received (without PDCCH repetition) over multiple PDCCH resources, which may be TDMed.

Subsequent UE action(s) may depend on the time of the received PDCCH that triggered the corresponding UE action(s).

For example, which QCL assumption(s) to apply when receiving a PDSCH may depend on the time difference between the reception of the PDCCH carrying the scheduling DCI and the start of the scheduled PDSCH.

A DCI that is repeated across two time-multiplexed PDCCH resources may be successfully decoded in the first, the second or in both PDCCH resource(s). Hence, there may be an uncertainty on the network side on which action the UE will take.

Similarly, for a DCI that is received across multiple PDCCH resources (without repetition), it may be unclear which PDCCH resource to use as timing reference.

To avoid this uncertainty, a reference PDCCH resource may be defined. A reference PDCCH resource may be a first (in time) PDCCH resource or a last (in time) PDCCH resource in a set of PDCCH resources.

This set of PDCCH resources may be the set of PDCCH resources the UE considers for DCI duplication, e.g. according to one of the examples of duplication set above. For example in which a time window is used as a condition for DCI duplication (as discussed above), a first and last PDCCH resource may refer to a first and last PDCCH resource (in time) within the time window, respectively.

The reference PDCCH resource may be the last PDCCH resource for the cases that time after PDCCH reception matters, e.g. timelines after the reception of a PDCCH. The reference PDCCH resource may be the first PDCCH resource for the cases that the time before PDCCH reception matters, e.g. timelines before the reception of a PDCCH.

In some cases, a single DCI may have multiple reference resources, e.g. if the DCI is such that it indicates UE behavior with a timeline before PDCCH reception as well as UE behavior with a time line after PDCCH reception. In such a case, both the first and last PDCCH resource may be reference resources for the DCI, and which reference resource to apply depends on which UE behavior that is considered (the one for which time before PDCCH matters or the one for which time after PDCCH matters).

Figure 13:
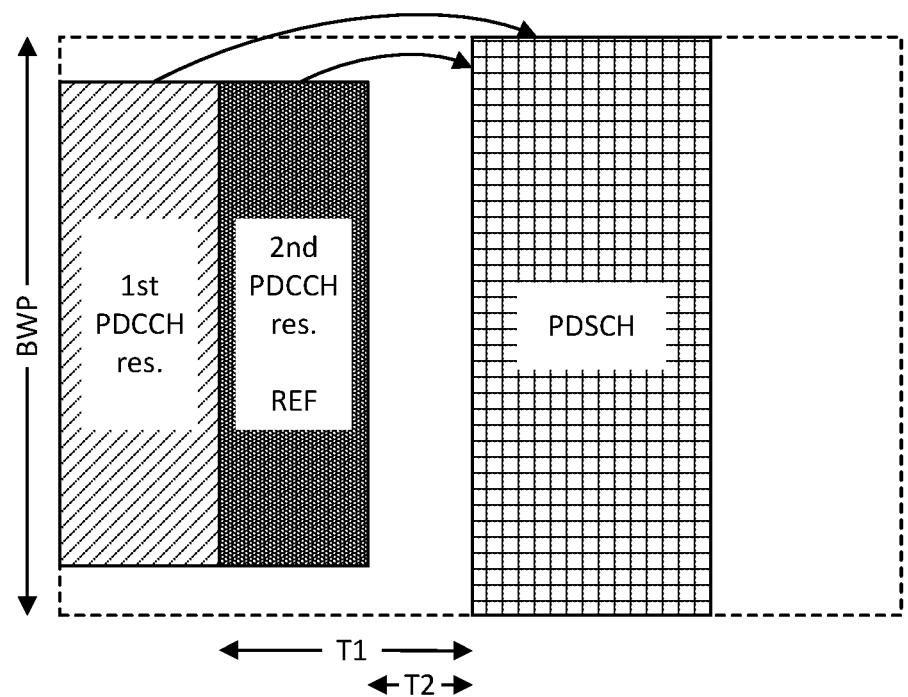
FIG. 13 illustrates a reference PDCCH resource for the case of determining QCL assumption(s) for the subsequent scheduled PDSCH.

In one example, consider a case with two TDMed PDCCH resources that the UE considers for DCI duplication, e.g. a duplication set. The duplicated DCI is of DCI format 1_1 having the TCI field present, which schedules a PDSCH. For the case of determining QCL assumption(s) for the PDSCH reception, the time after the PDCCH reception matters. This is illustrated in FIG. 13 that shows a reference PDCCH resource for the case of determining QCL assumption(s) for the subsequent scheduled PDSCH. Since the corresponding timeline is based on the time after PDCCH reception, the second PDCCH resource is used as the reference resource for this case. For this case, the time between the PDCCH reception and the scheduled PDSCH is T2, even if the DCI was received in the 1st PDCCH resource. Therefore, the last PDCCH resource, e.g. the second of the two TDMed PDCCH resources, is the reference resource. Regardless if the UE actually receives the DCI on the first PDCCH resource, the second PDCCH resource or on both PDCCH resources, the UE will use the second PDCCH resource as reference when determining the QCL assumption(s) for the subsequent scheduled PDSCH.

Figure 14:
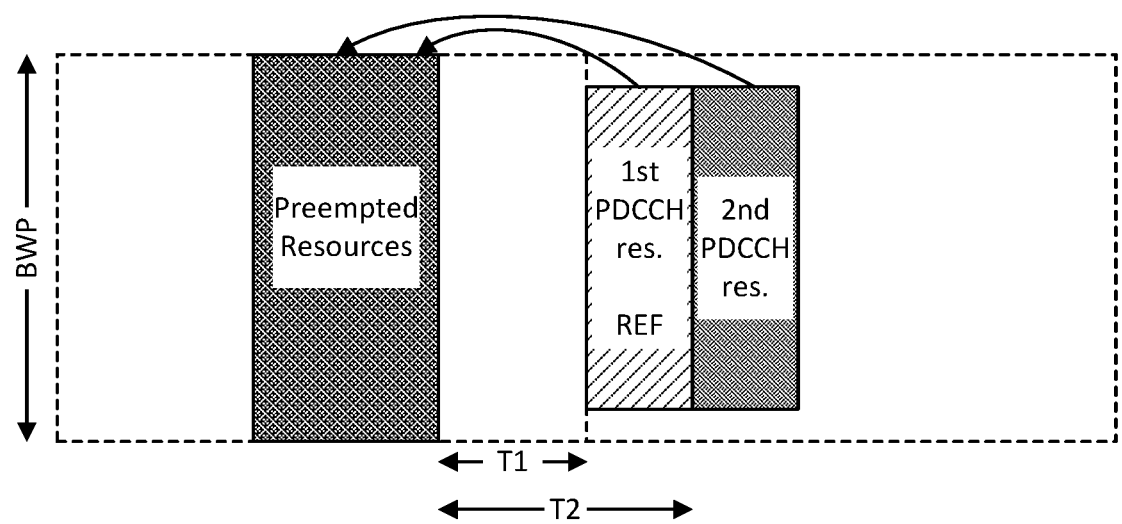
FIG. 14 illustrates a reference PDCCH resource for the case of indication of preempted DL resources.

In another example, consider again a case with two TDMed PDCCH resources that the UE considers for DCI duplication (e.g. duplication set). The duplicated DCI is of DCI format 2_1, which can be used to indicate a downlink preemption to the UE. For the case of preemption indication, the time before the PDCCH reception matters. This is illustrated in FIG. 14 that shows a reference PDCCH resource for the case of indication of preempted DL resources. Since the corresponding timeline is based on the time before PDCCH reception, the first PDCCH resource is used as the reference resource for this case. For this case, the time between the preempted resources and the PDCCH reception is T1, even if the DCI was received in the 2nd PDCCH resource. Therefore, the first PDCCH resource, e.g.

the first of the two TDMed PDCCH resources, is the reference resource. Regardless if the UE actually receives the DCI on the first PDCCH resource, the second PDCCH resource or on both PDCCH resources, the UE will use the first PDCCH resource as reference when determining pre-empted resources.

Figure 15:
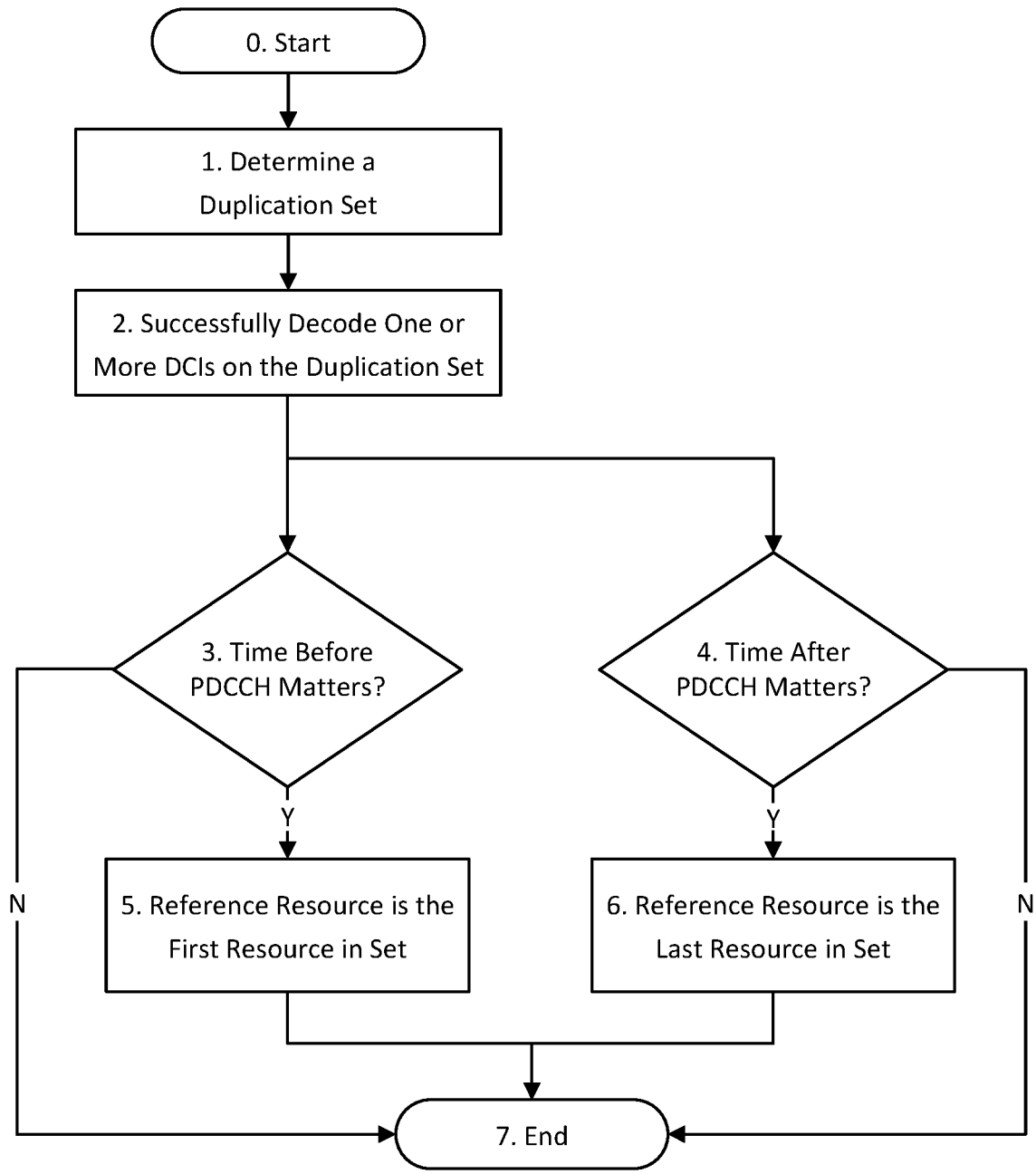
FIG. 15 illustrates an example procedure performed by the UE to determine one or more reference resources.

FIG. 15 illustrates an exemplary UE procedure for determining reference resource(s). In step 251, the UE may determine a duplication set, for example corresponding to a few TDMed PDCCH resources. In step 252, which may precede step 251 in some cases, the UE successfully decodes one or more duplicated DCIs in the duplication set. In step 253 and 254, the UE determines if there is a UE action indicated by the DCI(s) for which the time before the PDCCH matters, and if there is a UE action indicated by the DCI(s) for which the time after the PDCCH matters, respectively. Note that a DCI may indicate two (or more) UE actions, of which one (or more) UE action is such that the time before the PDCCH matters, and one (or more) UE action is such that the time after the PDCCH matters. If one or both of before/after is applicable, the UE select one or two reference resources (step 255 or step 256). Note that if the UE action(s) in the DCI are such that both the time before the PDCCH and the time after the PDCCH matter, the UE may select two reference resources: the PDCCH resource in the set that is first in time, and the PDCCH resource in the set that is last in time. If neither time before the PDCCH or after the PDCCH matters, there may be no need to select a reference resource and the procedure may end. For additional perspective with regard to the above, the case to cover here is the case that a DCI indicates two UE actions. For the first UE action, the time before the PDCCH reception is of relevance. Hence, the first PDCCH resource in time would be a suitable reference resource. For the second UE action, the time after the PDCCH reception is of relevance. Hence, the last PDCCH resource in time would be a suitable reference resource. A solution this may be to select two reference resources—the first PDCCH resource for the first UE action, and the last PDCCH resource for the last UE action.

In some cases, a reference resource is the union of the PDCCH resources in a duplication set. In the case of PDCCH reception without duplication, a reference resource may be the PDCCH resource on which a DCI is received.

Default Beam(s) for PDSCH

In various schemes discussed herein, a UE may successfully decode a DCI whose reception was associated with multiple TCI-state PDCCH reception. In an example, a successfully decoded DCI was carried by one or more PDCCHs in a duplication set (see above), where PDCCH candidates in the duplication set are associated with different TCI states. In an example, a successfully decoded DCI was carried by a PDCCH that is associated with multiple TCI states, e.g. it was received on a CORESET with multiple activated TCI states.

For brevity, such cases may be called multi-TCI DCI. A successfully decoded DCI that was received on a PDCCH associated to a single TCI state may be called a single-TCI DCI.

In some cases, e.g. if 'QCL-TypeD' (e.g. QCL with respect to spatial Rx parameter) is configured for at least one TCI state in the considered serving cell, the UE assumption regarding TCI state or QCL for a PDSCH may depend on the time offset between the reception of the DCI (e.g. the end of the PDCCH resource or the reference resource as discussed above) and the corresponding scheduled PDSCH. For instance, if the time offset is equal to or greater than a threshold, the UE may use one assumption regarding TCI state(s)/QCL for the PDSCH, and if the time offset is smaller than a threshold the UE may use another assumption. In some cases, the threshold value may be configurable or based on a UE capability the UE has reported to the network, e.g. based on the parameter timeDurationForQCL.

Note that herein, the TCI state(s) or QCL for a PDSCH may refer to the TCI state(s) or QCL for the DM-RS of the PDSCH. The PDSCH may be in the same or different BWP or cell as the corresponding PDCCH(s) or the CORESET (s)/PDCCH resource(s) considered below.

In some cases, if a CORESET is configured with an enabled parameter tci-PresentInDCI or tci-PresentInDCI-ForFormat1_2, a DCI may include the DCI field 'Transmission Configuration Indication', in short, a TCI field. The TCI field can be used to indicate one or more TCI states for subsequent scheduled PDCSH(s).

In some cases, a UE receives a DCI scheduling one or more PDSCH(s) with a DCI format that does not have a TCI field present. In some cases, if also the time offset is equal to or greater than a threshold, the UE may assume that that the TCI state(s) or the QCL assumption for the PDSCH(s) is identical to the TCI state(s) or QCL assumption (whichever is applied) used for the CORESET(s) used for the transmission of the PDCCH(s) that carried the DCI. For example, if the scheduling DCI is a multi-TCI DCI, the TCI states associated with the reception of the scheduling DCI can be used as TCI state(s)/QCL assumption for the corresponding scheduled PDSCH(s).

Note that "TCI state(s) or QCL assumption (whichever is applied)" means, in some cases, that a CORESET has no activated TCI state(s). Instead, the UE may use another QCL assumption, for example based on the SSB determined in the initial access procedure with respect to 'QCL-TypeA' (e.g. QCL with respect to Doppler shift, Doppler spread, average delay, delay spread), and when applicable, also with respect to 'QCL-TypeD' (e.g. QCL with respect to spatial Rx parameter). The term "QCL assumption" may imply QCL with respect to a single or multiple different QCL types or may refer to a single or multiple different RS.

In some cases, if the time offset is smaller than a threshold, the UE may for the PDSCH use the TCI state(s)/QCL assumption used for receiving a monitored PDCCH resource in the latest slot with a monitored PDCCH resource in the active BWP. If the latest slot includes multiple monitored CORESETs, the TCI state(s)/QCL assumption for the CORESET with lowest CORESET ID (e.g. controlResourceSetId) in this latest slot may be used.

In some cases, if the time offset is smaller than a threshold and the UE is configured with two different values of CORESETPoolIndex for CORESETs in the BWP, the TCI state(s)/QCL assumption a UE can use for a PDSCH may depend on in which CORESET the PDCCH that scheduled the PDSCH was received. The UE can use the TCI state(s)/QCL assumption used for a monitored PDCCH resource in the latest slot with a monitored PDCCH resource associated with the same CORESETPoolIndex as the CORESET on which the scheduling DCI was received. If the latest slot includes multiple monitored CORESETs with the same CORESETPoolIndex as the CORESET on which the scheduling DCI was received, the TCI state(s)/QCL assumption for the CORESET with lowest CORESET ID (e.g. control-ResourceSetId) among these multiple CORESETs in this latest slot may be used. If the scheduling DCI is a multi-TCI DCI, the TCI states associated with the reception of the scheduling DCI can be used as TCI state(s)/QCL assumption for the corresponding scheduled PDSCH(s).

In various cases described above, the multiple TCI states, e.g. two, associated with the DCI scheduling PDSCH(s) may be used as TCI state(s)/QCL assumption for the scheduled PDSCH(s). This brings various problems which are solved below.

TCI State Mapping to PDSCH DM-RS Antenna Port(s)

The one or more TCI state(s) to be used for the scheduled PDSCH(s) are ordered and indexed as t=0, . . . , (T−1), where t is a TCI state ID index (not a TCI state Id) and T is the number of activated TCI state IDs, e.g. based on the TCI state(s) associated with the scheduling DCI or a monitored PDCCH resource in the latest slot (see above).

The activated TCI state ID(s) for a CORESET may be ordered (1st TCI state ID, 2nd TCI state ID, etc.) according to an ordinal position or index in a MAC CE or an ordinal position of the corresponding MAC CE, e.g. as described above.

In some cases, the multi-TCI DCI scheduling PDSCH(s) was carried by one or more PDCCHs in a duplication set, where PDCCH candidates in the duplication set are associated with different TCI states. These TCI states may be ordered and indexed as well, e.g. in order of time and frequency of the corresponding PDCCH resources or in order of the corresponding CORESET Id.

Note that a DCI may schedule a PDSCH with repetition, e.g. based on 'FDMSchemeA', 'FDMSchemeB', 'TDMSchemeA' (intra-slot repetition), "TDM scheme B" (inter-slot repetition), or "SDM scheme" (see above).

Also note that a DCI may indicate a set of DM-RS antenna ports to be used for receiving the PDSCH(s), through the DCI field "Antenna port(s)". Different antenna ports may be associated with different code division multiplexing (CDM) groups. Hence, an indication of a set of DM-RS antenna ports may also indicate, e.g. implicitly, a set of CDM groups. It may be beneficial for communication performance to use a single TCI state for all antenna ports belonging to the same CDM group. CDM groups may be indexed as λ=0, 1, . . . .

In some cases, one of the T TCI states is used for receiving the scheduled PDSCH(s), e.g. the first TCI state (t=0), e.g. the same TCI state is applied to all scheduled antenna port(s) and CDM group(s).

In some cases, one of the T TCI states is used for receiving the scheduled PDSCH(s), e.g. the first TCI state (t=0), if the number of scheduled CDM groups is one, e.g. the same TCI state is applied to all scheduled antenna port(s) within the single CDM group.

In some cases, e.g. with T>1, two of the T TCI states are used for receiving the scheduled PDSCH(s) if the number of scheduled CDM groups is two, e.g. the first TCI state (t=0) is applied to all antenna port(s) within a first CDM scheduled group (e.g. with lowest CDM group index λ) and the second TCI state (t=1) is applied to all antenna port(s) within the second scheduled CDM group.

In some cases, one or more antenna ports belonging to each scheduled CDM group λ is indicated by the scheduling DCI. In some cases, TCI state with Id index mod(λ+k,T) is applicable to CDM group λ when receiving the PDSCH, where mod(a,b) is the "a modulo b" operation. In some cases, k=0, e.g. Id index is mod(λ,T). In some cases, k is the redundancy version used in the PDSCH transmission, e.g. as indicated by DCI field "Redundancy version".

In some cases, the T TCI states are applied to scheduled CDM groups such that the first TCI state Id index is assigned to scheduled CDM groups with the lowest indices, etc., and the highest TCI state Id index is assigned to scheduled CDM groups with highest indices. For example, with T=2, t=0 is assigned to CDM group 0 and 1, and t=1 is assigned to CDM group 2. In another example, t=0 is assigned to CDM group 0, and t=1 is assigned to CDM group 1 and 2.

In some cases, in which a PDSCH repetition scheme was configured or indicated by the DCI, the same TCI state(s), e.g. according to one of the examples herein, is used in each repetition.

In some cases, e.g. when 'TDMSchemeA' is enabled (e.g. UE is configured by the higher layer parameter RepSchemeEnabler set to 'TDMSchemeA'), the number of PDSCH transmission occasions is derived by T. If T=1, a single PDSCH transmission occasion is used, and the single TCI state (e.g. t=0) is applicable to the PDSCH reception. If T=2, two PDSCH transmission occasions is used, and the first TCI state (e.g. t=0) is applicable to the first PDSCH occasion and the second TCI state (e.g. t=1) is applicable to the second PDSCH occasion.

In some cases, the scheduled CDM group λ decides the TCI state. For example, if the DCI schedules CDM group λ=0, the TCI state Id index t=0 is applied. If the DCI schedules CDM group λ=1, the TCI state Id index t=0 (or alternatively t=1) is applied. If the DCI schedules CDM group λ=2, the TCI state Id index t=1 is applied. Similarly, in some cases, the scheduled CDM group determines which TCI state Id index to apply to which frequency portion, in the case of an FDM scheme.

In some cases, e.g. when "TDM scheme B" is enabled (e.g. when a UE configured by the higher layer parameter PDSCH-config that indicates at least one entry in pdsch-TimeDomainAllocationList include RepNumR16 in PDSCH-TimeDomainResourceAllocation), the following scheme may be used. The UE may be further configured to enable cyclic or sequential TCI state mapping (e.g. through CycMapping or SeqMapping in RepTCIMapping). If T=1, the same single TCI state (e.g. t=0) is applied to each repetition. If T=2, and cyclic mapping is enabled, and the DM-RS antenna port(s) indicated in the DCI are within one CDM group, the first and second TCI states (e.g. t=0 and t=1) are applied to the first and second PDSCH transmission occasions, respectively, and the same TCI mapping pattern continues through the remaining PDSCH transmission occasions.

If T=2 and sequential mapping is enabled, and the DM-RS antenna port(s) indicated in the DCI are within one CDM group, first TCI state (e.g. t=0) is applied to the first and second PDSCH transmissions, and the second TCI state (e.g. t=1) is applied to the third and fourth PDSCH transmissions, and the same TCI mapping pattern continues through the remaining PDSCH transmission occasions.

If T=2, and the DM-RS antenna port(s) indicated in the DCI are within two CDM groups, the first and second TCI states (e.g. t=0 and t=1) are applied to the two CDM groups in each repetition. In some cases, the same TCI state is applied to the same CDM group in each repetition, e.g. t=0 is applied to the CDM group with lowest λ, and t=1 is applied to the other CDM group. In some cases, the mapping between the TCI states and the CDM groups is reversed in each repetition, e.g. TCI state with Id index mod(r,T) is applied to the first CDM group and TCI state with Id index mod(r+1,T) is applied to the second CDM group, where r=0, 1, . . . is the index of the PDSCH transmission occasion.

When a UE is configured with an FDM repetition scheme (e.g. by higher layer parameter RepSchemeEnabler set to one of 'FDMSchemeA' or 'FDMSchemeB'), if the DM-RS antenna port(s) indicated in the DCI are within one CDM group, the following scheme may be applied.

In some cases, e.g. when the UE is configured to 'FDMSchemeA', if T=2, the UE shall receive a single PDSCH transmission occasion of the transport block with the first TCI state (e.g. t=0) associated to a first frequency domain resource allocation and the second TCI state (e.g. t=1) associated to a second frequency domain resource allocation that is non-overlapping with respect to the first frequency domain resource allocation.

In some cases, e.g. when the UE is configured to 'FDMSchemeB', if T=2, the UE shall receive two PDSCH transmission occasions of the same TB with the first TCI state (e.g. t=0) associated to a PDSCH transmission occasion with a first frequency domain resource allocation and the second TCI state (e.g. t=1) associated to a PDSCH transmission occasion with a second frequency domain resource allocation that is non-overlapping with respect to the first frequency domain resource allocation.

Example UE Procedures

An example UE procedure is as follows.
1. A UE successfully decodes a DCI on one or more received PDCCH candidates.
   a. The DCI schedules PDSCH(s).
   b. If the DCI was received on a PDCCH candidate associated with multiple activated TCI states, then these comprise the T TCI states.
2. If the time offset between DCI reception (e.g. based on a PDCCH reference resource) and the corresponding PDSCH is smaller than a threshold, then the UE determines the T TCI state(s) as the TCI state(s)/QCL assumption associated with a monitored PDCCH resource in the latest slot with a monitored PDCCH resource in the active BWP. Furthermore:
   a. If there are multiple such monitored PDCCH resources, then the UE selects the one with lowest CORESET Id (for the purpose of determining T TCI state(s)).
   b. If the UE is configured with two different values of CORESETPoolIndex for CORESETs in the BWP, then the UE selects a monitored PDCCH resource (for the purpose of determining T TCI state(s)) with the same CORESETPoolIndex as the PDCCH resource on which the DCI was received in the latest slot with a monitored PDCCH resource with the same CORESETPoolIndex as the PDCCH resource on which the DCI was received. If the DCI was received in a duplication set with PDCCH candidates associated with both values of CORESETPoolIndex, then the UE may select two monitored PDCCH resources (for the purpose of determining T TCI state(s)) in the latest slot(s) including monitored PDCCH resources associated with the different CORESETPoolIndex values. For instance, if the last slot includes the latest monitored PDCCH resource with CORESETPoolIndex=0 and the second last slot includes the latest monitored PDCCH resource with CORESETPoolIndex=1, then the UE may use the combined TCI state(s) associated with the two monitored PDCCH resources as the T TCI state(s) applied to the PDSCH reception.
3. If the time offset between DCI reception (e.g. reference resource) and the corresponding PDSCH is equal to or greater than the threshold, and
   a. If the DCI lacks a TCI field:
      i. If the DCI was received on a PDCCH candidate belonging to a duplication set, e.g. as described above, then the duplication set comprises PDCCH candidates associated with T different TCI states.
      ii. If the DCI was received on a PDCCH candidate associated with multiple activated TCI states, then these comprise the T TCI states.
   b. If the DCI includes a TCI field, then the UE follows the TCI field indication.
4. Step 3 is about determining TCI states that are subsequently used for reception in step 4. The UE receives the PDSCH(s) using the previously determined T TCI states, and based on the UE configuration and DCI content, such as antenna port(s). Selection from the T TCI states in the case of less than T indicated CDM groups may follow various examples discussed above.

Default Beam(s) for PUSCH

As above, consider multi-TCI DCI and single-TCI DCI.

In some cases, e.g. for PUSCH scheduled by DCI format 0_0 on a cell and if the higher layer parameter enableDefaultBeamPlForPUSCH0_0 is set 'enabled', the UE is not configured with PUCCH resources on the active UL BWP and the UE is in RRC connected mode, the UE shall transmit PUSCH according to the spatial relation(s), if applicable, with a reference to the RS (e.g. DL RS) with 'QCL-Type-D' corresponding to the QCL assumption of the CORESET with the lowest ID.

In some cases, e.g. for PUSCH scheduled by DCI format 0_0 on a cell and if the higher layer parameter enableDefaultBeamPlForPUSCH0_0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation(s), if applicable, with a reference to the RS with 'QCL-Type-D' corresponding to the QCL assumption of the CORESET with the lowest ID in case CORESET(s) are configured on the CC.

Transmitting PUSCH according to a spatial relation with a reference to a DL RS with 'QCL-Type-D' may mean that the UE determines its PUSCH transmission precoder (or spatial domain transmission filter), partly (e.g. in combination with precoder information and number of layers in DCI) or fully based on the spatial domain filter (e.g. UE RX beam) used for receiving the DL RS.

In some cases, e.g. for PUSCH scheduled by DCI format 0_0 on a cell and if the higher layer parameter enableDefaultBeamPlForPUSCH0_0 is set 'enabled', the UE is not configured with PUCCH resources on the active UL BWP and the UE is in RRC connected mode, the UE shall transmit PUSCH according to the activated TCI state (s) for the PUSCH (e.g. UL TCI state(s)), if applicable, with a reference to the RS (e.g. DL RS) with 'QCL-Type-D' corresponding to the QCL assumption of the CORESET with the lowest ID.

In some cases, e.g. for PUSCH scheduled by DCI format 0_0 on a cell and if the higher layer parameter enableDefaultBeamPlForPUSCH0_0 is set 'enabled', the UE is configured with PUCCH resources on the active UL BWP where all the PUCCH resource(s) are not configured with any TCI state(s) (or no TCI state is activated) and the UE is in RRC connected mode, the UE shall transmit PUSCH according to the TCI state(s), if applicable, with a reference to the RS with 'QCL-Type-D' corresponding to the QCL assumption of the CORESET with the lowest ID in case CORESET(s) are configured on the CC.

Transmitting PUSCH according to the activated TCI state(s) with a reference to a DL RS with 'QCL-Type-D' may mean that the UE determines its PUSCH transmission precoder(s) (or spatial domain transmission filter(s)), partly or fully based on the spatial domain filter(s) (e.g. UE RX beam(s)) used for receiving the DL RS.

Note that herein, the TCI state(s), spatial relation(s), or QCL for a PUSCH may refer to the TCI state(s) or QCL for the DM-RS of the PUSCH. The PUSCH may be in the same or different BWP or cell as the corresponding PDCCH(s) or the CORESET(s)/PDCCH resource(s) considered below.

The examples above illustrate cases in which one or multiple activated TCI state(s) of a CORESET are used to determine precoder(s) or spatial domain transmission filter (s) for PUSCH transmission(s). For example, if the scheduling DCI is a multi-TCI DCI, the TCI states associated with the reception of the scheduling DCI can be used as spatial relation(s)/TCI state(s)/QCL assumption for the corresponding scheduled PUSCH(s).

In some cases, e.g. if the UE is configured with two different values of CORESETPoolIndex for CORESETs in the BWP, the spatial relation(s)/TCI state(s)/QCL assumption a UE can use for a PUSCH may depend on in which CORESET the PDCCH that scheduled the PUSCH was received. The UE can use the TCI state(s)/QCL assumption used for the CORESET on which the scheduling DCI was received. If the scheduling DCI is a multi-TCI DCI, the TCI states associated with the reception of the scheduling DCI can be used as spatial relation(s)/TCI state(s)/QCL assumption for the corresponding scheduled PUSCH(s).

In various cases described above, the multiple TCI states, e.g. two, associated with the DCI scheduling PUSCH(s) may be used as spatial relation(s)/TCI state(s)/QCL assumption for the scheduled PUSCH(s). This brings various problems which are solved below.

TCI State Mapping to PUSCH DM-RS Antenna Port(s)

The one or more TCI state(s) to be used for the scheduled PUSCH(s) are ordered and indexed as t=0, . . . , (T−1), where t is a TCI state ID index (not a TCI state Id) and T is the number of activated TCI state IDs, e.g. based on the TCI state(s) associated with the scheduling DCI or a CORESET, e.g. a CORESET with a lowest Id, (see above).

Note that the term "TCI state" of a PUSCH is used below for brevity, but it may correspond to "spatial relation", if "spatial relation" is used to describe the spatial domain transmission filter(s) or transmit beam used for PUSCH transmission.

The activated TCI state ID(s) for a CORESET may be ordered (1st TCI state ID, 2nd TCI state ID, etc.) according to an ordinal position or index in a MAC CE or an ordinal position of the corresponding MAC CE, e.g. as described above.

In some cases, the multi-TCI DCI scheduling PUSCH(s) was carried by one or more PDCCHs in a duplication set, where PDCCH candidates in the duplication set are associated with different TCI states. These TCI states may be ordered and indexed as well, e.g. in order of time and frequency of the corresponding PDCCH resources or in order of the corresponding CORESET Id.

Note that a DCI may schedule a PUSCH with repetition, e.g. based on similar repetition schemes as described for PDSCH, e.g. 'FDMSchemeA', 'FDMSchemeB', 'TDMSchemeA' (intra-slot repetition), "TDM scheme B" (inter-slot repetition), or "SDM scheme" (see above).

Also note that a DCI may indicate a set of DM-RS antenna ports to be used for transmitting the PUSCH(s), through the DCI field "Antenna port(s)". Different antenna ports may be associated with different code division multiplexing (CDM) groups. Hence, an indication of a set of DM-RS antenna ports may also indicate, e.g. implicitly, a set of CDM groups. It may be beneficial for communication performance to use a single spatial relation/TCI state for all antenna ports belonging to the same CDM group. CDM groups may be indexed as λ=0, 1, . . . .

In some cases, one of the T TCI states is used for transmitting the scheduled PUSCH(s), e.g. the first TCI state (t=0), e.g. the same TCI state is applied to all scheduled antenna port(s) and CDM group(s).

In some cases, one of the T TCI states is used for transmitting the scheduled PUSCH(s), e.g. the first TCI state (t=0), if the number of scheduled CDM groups is one, e.g. the same TCI state is applied to all scheduled antenna port(s) within the single CDM group.

In some cases, e.g. with T>1, two of the T TCI states are used for transmitting the scheduled PUSCH(s) if the number of scheduled CDM groups is two, e.g. the first TCI state (t=0) is applied to all antenna port(s) within a first CDM scheduled group (e.g. with lowest CDM group index λ) and the second TCI state (t=1) is applied to all antenna port(s) within the second scheduled CDM group.

In some cases, one or more antenna ports belonging to each scheduled CDM group λ is indicated by the scheduling DCI. In some cases, TCI state with Id index mod(λ+k,T) is applicable to CDM group λ when transmitting the PUSCH, where mod(a,b) is the "a modulo b" operation. In some cases, k=0, e.g. Id index is mod(λ,T). In some cases, k is the redundancy version used in the PUSCH transmission, e.g. as indicated by DCI field "Redundancy version".

In some cases, the T TCI states are applied to scheduled CDM groups such that the first TCI state Id index is assigned to scheduled CDM groups with the lowest indices, etc., and the highest TCI state Id index is assigned to scheduled CDM groups with highest indices. For example, with T=2, t=0 is assigned to CDM group 0 and 1, and t=1 is assigned to CDM group 2. In another example, t=0 is assigned to CDM group 0, and t=1 is assigned to CDM group 1 and 2.

In some cases, in which a PUSCH repetition scheme was configured or indicated by the DCI, the same TCI state(s), e.g. according to one of the examples herein, is used in each repetition.

In some cases, e.g. when 'TDMSchemeA' is enabled (e.g. UE is configured by the higher layer parameter RepSchemeEnabler set to 'TDMSchemeA'), the number of PUSCH transmission occasions is derived by T. If T=1, a single PUSCH transmission occasion is used, and the single TCI state (e.g. t=0) is applicable to the PUSCH transmission. If T=2, two PUSCH transmission occasions is used, and the first TCI state (e.g. t=0) is applicable to the first PUSCH occasion and the second TCI state (e.g. t=1) is applicable to the second PUSCH occasion.

In some cases, the scheduled CDM group λ decides the TCI state. For example, if the DCI schedules CDM group λ=0, the TCI state Id index t=0 is applied. If the DCI schedules CDM group λ=1, the TCI state Id index t=0 (or alternatively t=1) is applied. If the DCI schedules CDM group λ=2, the TCI state Id index t=1 is applied. Similarly, in some cases, the scheduled CDM group determines which TCI state Id index to apply to which frequency portion, in the case of an FDM scheme.

In some cases, e.g. when "TDM scheme B" is enabled (e.g. when a UE configured by the higher layer parameter PUSCH-config that indicates at least one entry in pusch-TimeDomainAllocationList include RepNumR17 in PUSCH-TimeDomainResourceAllocation), the following scheme may be used. The UE may be further configured to enable cyclic or sequential TCI state mapping (e.g. through CycMapping or SeqMapping in RepTCIMapping).

If T=1, the same single TCI state (e.g. t=0) is applied to each repetition.

If T=2, and cyclic mapping is enabled, and the DM-RS antenna port(s) indicated in the DCI are within one CDM group, the first and second TCI states (e.g. t=0 and t=1) are applied to the first and second PUSCH transmission occasions, respectively, and the same TCI mapping pattern continues through the remaining PUSCH transmission occasions.

If T=2 and sequential mapping is enabled, and the DM-RS antenna port(s) indicated in the DCI are within one CDM group, first TCI state (e.g. t=0) is applied to the first and second PUSCH transmissions, and the second TCI state (e.g. t=1) is applied to the third and fourth PUSCH transmissions, and the same TCI mapping pattern continues through the remaining PUSCH transmission occasions.

If T=2, and the DM-RS antenna port(s) indicated in the DCI are within two CDM groups, the first and second TCI states (e.g. t=0 and t=1) are applied to the two CDM groups in each repetition. In some cases, the same TCI state is applied to the same CDM group in each repetition, e.g. t=0 is applied to the CDM group with lowest $\lambda$, and t=1 is applied to the other CDM group. In some cases, the mapping between the TCI states and the CDM groups is reversed in each repetition, e.g. TCI state with Id index $\mod(r,T)$ is applied to the first CDM group and TCI state with Id index $\mod(r+1,T)$ is applied to the second CDM group, where $r=0, 1, \ldots$ is the index of the PUSCH transmission occasion.

When a UE is configured with an FDM repetition scheme (e.g. by higher layer parameter RepSchemeEnabler set to one of 'FDMSchemeA' or 'FDMSchemeB'), if the DM-RS antenna port(s) indicated in the DCI are within one CDM group, the following scheme may be applied.

- In some cases, e.g. when the UE is configured to 'FDMSchemeA', if T=2, the UE shall transmit a single PUSCH transmission occasion of the transport block with the first TCI state (e.g. t=0) associated to a first frequency domain resource allocation and the second TCI state (e.g. t=1) associated to a second frequency domain resource allocation that is non-overlapping with respect to the first frequency domain resource allocation.
- In some cases, e.g. when the UE is configured to 'FDMSchemeB', if T=2, the UE shall transmit two PUSCH transmission occasions of the same TB with the first TCI state (e.g. t=0) associated to a PUSCH transmission occasion with a first frequency domain resource allocation and the second TCI state (e.g. t=1) associated to a PUSCH transmission occasion with a second frequency domain resource allocation that is non-overlapping with respect to the first frequency domain resource allocation.

Example UE Procedures

An example UE procedure is as follows.

1. A UE successfully decodes a DCI on one or more received PDCCH candidates.
   a. The DCI schedules PUSCH(s).
   b. If the DCI was received on a PDCCH candidate associated with multiple activated TCI states, then these comprise the T TCI states.
2. If some conditions hold, e.g. the UE is such configured, then the UE determines the T TCI state(s), e.g. as the TCI state(s)/QCL assumption associated with a CORESET (e.g. with lowest Id) or associated with the decoded DCI.
3. The UE transmits the PUSCH(s) using the previously determined T TCI states, and based on the UE configuration and DCI content, such as antenna port(s). Selection from the T TCI states in the case of less than T indicated CDM groups may follow various examples discussed above.

Default Beam(s) for PUCCH

Introduction

As above, consider multi-TCI DCI and single-TCI DCI. In some cases, e.g. if a UE
- reports beamCorrespondenceWithoutUL-BeamSweeping,
- is not provided pathlossReferenceRSs in PUCCH-PowerControl,
- is provided enableDefaultBeamPlForPUCCH, and
- is not provided PUCCH-SpatialRelationInfo, then a spatial setting for a PUCCH transmission from the UE is same as a spatial setting for PDCCH receptions by the UE in the CORESET with the lowest ID on the active DL BWP of the cell (e.g. a PCell, PSCell, or PUCCH SCell).

Transmitting PUCCH with a spatial relation being the same as a spatial setting for PDCCH receptions by the UE in a CORESET may mean that the UE determines its PUCCH transmission precoder (or spatial domain transmission filter), partly or fully based on the spatial domain filter (e.g. UE RX beam) used for receiving the PDCCH.

Note that herein, the TCI state(s), spatial relation(s), or QCL for a PUCCH may refer to the TCI state(s) or QCL for the DM-RS of the PUCCH. The PUCCH may be in the same or different BWP or cell as the corresponding PDCCH(s) or the CORESET(s)/PDCCH resource(s) considered below.

The examples above illustrate cases in which one or multiple activated TCI state(s) of a CORESET are used to determine precoder(s) or spatial domain transmission filter(s) for PUCCH transmission(s).

In various cases described above, the multiple TCI states, e.g. two, associated with a CORESET (e.g. with lowest ID on the active DL BWP) may be used as spatial relation(s)/TCI state(s)/QCL assumption for PUCCH transmission. This brings various problems which are solved below.

TCI State Mapping to PUCCH

The one or more TCI state(s) to be used for the PUCCH(s) are ordered and indexed as $t=0, \ldots, (T-1)$, where t is a TCI state ID index (not a TCI state Id) and T is the number of activated TCI state IDs, e.g. based on the TCI state(s) associated with the scheduling DCI or a CORESET, e.g. a CORESET with a lowest Id, (see above).

Note that the term "TCI state" of a PUCCH is used below for brevity, but it may correspond to "spatial relation", if "spatial relation" is used to describe the spatial domain transmission filter(s) or transmit beam used for PUCCH transmission.

The activated TCI state ID(s) for a CORESET may be ordered (1st TCI state ID, 2nd TCI state ID, etc.) according to an ordinal position or index in a MAC CE or an ordinal position of the corresponding MAC CE, e.g. as described above.

In some cases, the multi-TCI DCI was carried by one or more PDCCHs in a duplication set, where PDCCH candidates in the duplication set are associated with different TCI states. These TCI states may be ordered and indexed as well, e.g. in order of time and frequency of the corresponding PDCCH resources or in order of the corresponding CORESET Id. This may be applicable for instance in the case that PUCCH transmission follows DCI reception, e.g. HARQ-ACK (for a scheduled PDSCH) carried on a PUCCH.

In some cases, one of the T TCI states is used for transmitting the PUCCH(s), e.g. the first TCI state (t=0), e.g. the same TCI state is applied to all scheduled antenna port(s) and CDM group(s).

In some cases, in which a PUCCH repetition scheme was configured or indicated by the DCI, the same TCI state(s), e.g. according to one of the examples herein, is used in each repetition.

In some cases, the number of PUCCH transmission occasions is derived by T:
- If T=1, a single PUCCH transmission occasion is used, and the single TCI state (e.g. t=0) is applicable to the PUCCH transmission.
- If T=2, two PUCCH transmission occasions is used, and the first TCI state (e.g. t=0) is applicable to the first PUCCH occasion and the second TCI state (e.g. t=1) is applicable to the second PUCCH occasion.

In some cases, the following scheme may be used. The UE may be further configured to enable cyclic or sequential TCI state mapping (e.g. through CycMapping or SeqMapping in RepTCIMapping).
- If T=1, the same single TCI state (e.g. t=0) is applied to each repetition.
- If T=2, and cyclic mapping is enabled, the first and second TCI states (e.g. t=0 and t=1) are applied to the first and second PUCCH transmission occasions, respectively, and the same TCI mapping pattern continues through the remaining PUCCH transmission occasions.
- If T=2 and sequential mapping is enabled, first TCI state (e.g. t=0) is applied to the first and second PUCCH transmissions, and the second TCI state (e.g. t=1) is applied to the third and fourth PUCCH transmissions, and the same TCI mapping pattern continues through the remaining PUCCH transmission occasions.

When a UE is configured with an FDM repetition scheme (e.g. by higher layer parameter RepSchemeEnabler set to one of 'FDMSchemeA' or 'FDMSchemeB'), if the DM-RS antenna port(s) indicated in the DCI are within one CDM group, the following scheme may be applied.

In some cases, e.g. when the UE is configured to 'FDMSchemeA', if T=2, the UE shall transmit a single PUCCH transmission occasion with the first TCI state (e.g. t=0) associated to a first frequency domain resource allocation and the second TCI state (e.g. t=1) associated to a second frequency domain resource allocation that is non-overlapping with respect to the first frequency domain resource allocation.

In some cases, e.g. when the UE is configured to 'FDMSchemeB', if T=2, the UE shall transmit two PUCCH transmission occasions with the first TCI state (e.g. 1=0) associated to a first PUCCH transmission occasion with a first frequency domain resource allocation and the second TCI state (e.g. t=1) associated to a second PUCCH transmission occasion with a second frequency domain resource allocation that is non-overlapping with respect to the first frequency domain resource allocation.

Default Beam(s) for Aperiodic CSI-RS

In various cases, one or more aperiodic CSI-RS resource(s) can be triggered by a DCI carried by one or more PDCCHs, e.g. a multi-TCI DCI or a single-TCI DCI as discussed above. The triggering PDCCH(s) and the CSI-RS(s) may have the same or different numerology, e.g. subcarrier spacing, cyclic prefix, etc.

A CSI-RS resource may be associated with a QCL configuration, e.g. a TCI state indicated through RRC configuration.

If the time offset (scheduling offset) between the last symbol of a PDCCH carrying the DCI, e.g. a PDCCH on a reference PDCCH resource, and the first symbol of a triggered aperiodic CSI-RS resource is greater than a threshold, the UE may be expected to apply the QCL assumptions in the TCI state(s) for the triggered aperiodic CSI-RS resource(s).

The threshold may be based on a value reported by a UE, e.g. a UE capability, for example a parameter beamSwitchTiming or beamSwitchTiming-r16. In some cases, additional conditions beside the time offset may be applied above. In an example, the threshold value is one of the values of {14,28,48} [symbols] and another parameter, e.g. enableBeamSwitchTiming is not provided to the UE and the CSI-RS resource set is not configured with yet another higher layer parameter, e.g. trs-Info.

In an example, the threshold value is one of the values of {14,28,48} and the CSI-RS resource set is configured with a higher layer parameter, e.g. trs-Info.

In an example, a parameter, e.g. enableBeamSwitchTiming, is provided to the UE and the CSI-RS resource set is configured with the higher layer parameter repetition set to 'on'.

In some cases, UE may be expected to apply the QCL assumptions in the TCI state(s) for the triggered aperiodic CSI-RS resource(s) if the time offset is equal to or greater than 48 when the UE provides a parameter, e.g. beamSwitchTiming-r16 and yet another parameter, e.g. enableBeamSwitchTiming, is provided to the UE and the CSI-RS resource set is configured with the higher layer parameter repetition set to 'off' or configured without the higher layer parameters repetition and trs-Info.

In various other cases, the UE may apply the QCL assumption(s) used for the CORESET associated with a monitored search space with the lowest controlResourceSetId in the latest slot in which one or more CORESETs within the active BWP of the serving cell are monitored. Such cases may be applicable if other one or more conditions are fulfilled, for example that at least one CORESET is configured for the BWP in which the aperiodic CSI-RS is received, or that a parameter, e.g. enableTwoDefaultTCIStates, isn't configured.

If the CORESET has more than one activated TCI state, the UE may for instance apply QCL assumption(s) in a first or those activated TCI states, where the TCI state order (e.g. first, second) may for instance based on an ordinal position in a MAC CE used for CORESET TCI state activation. In another example, the UE may apply QCL assumption(s) from one of those activated TCI states based on the TCI state ID, e.g. the TCI state with lowest or highest TCI state ID.

In some cases, e.g. if the UE is RRC configured with a parameter to enable such behavior (e.g. enableTwoDefaultTCIStates), the UE may apply QCL assumptions from more than one activated TCI state to all or a subset of the triggered CSI-RS resources. In one example, a first TCI state is applied to a first subset of CSI-RS resources and a second TCI state is applied to a second subset of CSI-RS resources. The first and second subset may correspond to different sets of symbols, e.g. the UE applies the different QCL assumptions in different disjoint sets of symbols that include the CSI-RS resources. In some cases, the multiple, e.g. two, TCI states are applied to the same symbol that carries a CSI-RS resource. In some cases, a first and second TCI state are applied to CSI-RS resources in the same symbol(s), but the first TCI state is applied to a first code-division multiplexing (CDM) group, whereas the second TCI state is applied to a second CDM group.

In some cases, the UE may apply QCL assumptions from more than one activated TCI states of one or more CORESET(s) carrying the PDCCH(s) (multi-TCI DCI) that triggered aperiodic CSI-RS resource(s) to the triggered CSI-RS resource(s). In one example, this is done also if the time offset is greater than or equal to a threshold.

Definitions and Abbreviations

The following Table 15 shows a list of acronyms that may appear in the above description. Unless otherwise specified, the acronyms used herein refer to the corresponding term listed below:

TABLE 15

| | |
|---|---|
| ACK | Acknowledgement |
| BWP | Bandwidth Part |
| CCE | Control Channel Element |
| CORESET | Control Resource Set |
| CRC | Cyclic Redundancy Check |
| CSI-RS | Channel State Information RS |
| CSS | Common Search Space |
| DAI | Downlink Assignment Index |
| DCI | Downlink Control Information |
| DL | Downlink |
| DMRS | Demodulation RS |
| DRX | Discontinuous Reception |
| eMBB | enhanced Mobile Broadband |
| ETWS | Earthquake and Tsunami Warning System |
| FDM | Frequency Division Multiplexing |
| FDMed | Frequency Division Multiplexed |
| gNB | NRNodeB |
| HARQ | Hybrid Automatic Repeat Request |
| ID | identity or index |
| IE | Information Element |
| MAC | Medium Access Control |
| MAC CE | MAC Control Element |
| MCS | Modulation and Coding Scheme |
| NACK | Negative Acknowledgement |
| NR | New Radio |
| NW | Network |
| PCell | Primary Cell |
| PDCCH | Physical Downlink Control CHannel(s) |
| PDSCH | Physical Downlink Shared CHannel(s) |
| PUCCH | Physical Uplink Control CHannel(s) |
| PUSCH | Physical Uplink Shared CHannel(s) |
| PHY | Physical Layer |
| PRB | Physical RB |
| PRI | PUCCH Resource Indicator |
| PSCell | Primary SCG Cell |
| QCL | Quasi Co-location |
| RAN | Radio Access Network |
| RB | Resource Block |
| RE | Resource Element |
| REG | Resource Element Group |
| RNTI | Radio Network Temporary Identification |
| RRC | Radio Resource Control |
| RS | Reference Signal(s) |
| RSRP | Reference Signal Received Power |
| RV | Redundancy Version |
| SCell | Secondary Cell |
| SCG | Secondary Cell Group |
| SpCell | Special Cell (PCell or PSCell) |
| SRI | SRS Resource Indicator |
| SRS | Sounding RS |
| SSB | SS/PBCH Block |
| TCI | Transmission Configuration Indicator |
| TDD | Time Division Duplex |
| TDM | Time Division Multiplexing |
| TDMed | Time Division Multiplexed |
| TPC | Transmit Power Control |
| TRP | Transmission or Reception Point |
| TRS | Tracking Reference Signal |
| UE | User Equipment |

TABLE 15-continued

| | |
|---|---|
| UL | Uplink |
| URLLC | Ultra reliable and low latency communications |
| USS | UE-specific Search Space |
| ZP CSI-RS | Zero Power CSI-RS |

It is understood that the entities performing the steps illustrated herein, such as FIG. 3, FIG. 6A-FIG. 8, or FIG. 15, may be logical entities. The steps may be stored in a memory of, and executing on a processor of, a device, server, or computer system such as those illustrated in FIG. 1F or FIG. 1G. Skipping steps, combining steps, or adding steps between exemplary methods disclosed herein (e.g., FIG. 3, FIG. 6A-FIG. 8, or FIG. 15) is contemplated.

In describing preferred methods, systems, or apparatuses of the subject matter of the present disclosure—delivery mode switch for multicast and broadcast service in a network, such as 5G—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for transmitting, via a plurality of transmission mediums and to a user device, PDCCH transmissions. The plurality of transmission mediums may be at least one of a transmission from a plurality of Transmission/Reception Points (TRP)s, multi-beam transmission, or repeated transmission of the PDCCH transmissions. The PDCCH may be transmitted on a plurality of Control Resource Sets (CORESET)s wherein each of the plurality of CORESETs is associated with a Transmission Control Indicator (TCI) state. The PDCCH may be transmitted on a single Control Resource Set (CORESET) and the single CORESET is associated with a plurality of Transmission Control Indicator (TCI) states. Methods, systems, and apparatuses, among other things, as described herein may provide for determining a duplication set; decoding one or more duplicated downlink control information (DCI) associated with the duplication set; determining that there is a first UE action indicated by the DCI that may be before the reception of a PDCCH; and based on the determining that there is the first UE action indicated by the DCI that is before the reception of a PDCCH, selecting one or more reference resources. The UE may perform the action, based on the timing of the reference resource. The selecting may be more than one reference resource based determining that there may be at least a second UE action indicated by the DCI that is after the reception of the PDCCH. The DCI may be associated with multiple transmission configuration indicator (TCI)-state PDCCH reception. The DCI may be carried by one or more PDCCHs in the duplication set. When Quasi Co-location (QCL) with respect to spatial Rx parameter is configured for at least one transmission configuration indicator (TCI) state in a considered serving cell, determining QCL for a PDSCH, wherein QCL may depend on a time offset between reception of the DCI and corresponding scheduled PDSCH. When Quasi Co-location (QCL) with respect to spatial Rx parameter may be configured for at least one transmission configuration indicator (TCI) state in a considered serving cell, determining TCI state, wherein the TCI state may depend on time offset between reception of the DCI and corresponding scheduled PDSCH. When a time offset may be equal to or greater than a threshold, using a first predetermined indication of a transmission configuration indicator (TCI) state or a Quasi Co-location (QCL) for a PDSCH. All combinations in this paragraph and the below paragraph (including the removal or addition of steps) are contemplated in a manner that is consistent with the other portions of the detailed description Methods, systems, and apparatuses, among other things, as described herein may provide for determining a duplication set comprising multiple PDCCH candidates; receiving one or more PDCCH candidates associated with a duplication set; decoding one or more duplicated downlink control information (DCI) associated with the duplication set from the one or more PDCCH candidates; determining that there is a first UE action indicated by the DCI that is before the reception of a PDCCH; and based on the determining that there is the first UE action indicated by the DCI that is before the reception of a PDCCH, selecting one or more reference resources. Methods, systems, and apparatuses, among other things, as described herein may provide for performing the first UE action using the reference resource as a time reference for the UE action. The one or more PDCCH candidates in the duplication set are associated with different TCI states. Methods, systems, and apparatuses, among other things, as described herein may provide for determining a duplication set comprising multiple PDCCH candidates; determining that there is a first UE action to be indicated by a DCI; based on the determining that there is the first UE action to be indicated by the DCI, selecting one or more reference resources; based on the selection of one or more reference resources, encoding a downlink control information (DCI); and transmitting the DCI on one or more PDCCH candidates associated with a duplication set. The apparatuses may be a network device. All combinations in this paragraph and the previous paragraph (including the removal or addition of steps) are contemplated in a manner that is consistent with the other portions of the detailed description.

What is claimed:

1. A method for reliability of a physical downlink control channel (PDCCH) in a communication network, the method comprising:
   determining a duplication set comprising multiple PDCCH candidates;
   receiving one or more PDCCH candidates associated with the duplication set;
   decoding one or more duplicated downlink control information (DCI) from the one or more PDCCH candidates;
   determining that there is a first user equipment (UE) action indicated by the DCI;
   based on the determining that there is the first UE action indicated by the DCI, selecting one or more reference resources; and
   performing the first UE action using the reference resource as a time reference for the first UE action.

2. The method of claim 1, wherein the selecting is more than one reference resource based determining that there is at least a second UE action indicated by the DCI that is after the reception of the PDCCH.

3. The method of claim 1, wherein the DCI is associated with multiple transmission configuration indicator (TCI)-state PDCCH reception.

4. The method of claim 1, wherein the one or more PDCCH candidates in the duplication set are associated with different TCI states.

5. The method of claim 1, further comprising when Quasi Co-location (QCL) with respect to spatial Rx parameter is configured for at least one transmission configuration indicator (TCI) state in a considered serving cell, determining QCL for a PDSCH, wherein QCL depends on a time offset between reception of the DCI and corresponding scheduled PDSCH.

6. The method of claim 1, further comprising when Quasi Co-location (QCL) with respect to spatial Rx parameter is configured for at least one transmission configuration indicator (TCI) state in a considered serving cell, determining TCI state, wherein the TCI state depends on time offset between reception of the DCI and corresponding scheduled PDSCH.

7. The method of claim 1, further comprising when a time offset is equal to or greater than a threshold, using a first predetermined indication of a transmission configuration indicator (TCI) state or a Quasi Co-location (QCL) for a PDSCH.

8. An apparatus for reliability of a physical downlink control channel (PDCCH) in a communication network, the apparatus comprising:
   a memory storing executable instructions; and
   processing circuitry coupled with the memory that is configured to
   determine a duplication set comprising multiple PDCCH candidates,
   receive one or more PDCCH candidates associated with the duplication set,
   decode one or more duplicated downlink control information (DCI) from the one or more PDCCH candidates,
   determine that there is a first user equipment (UE) action indicated by the DCI,
   based on the determining that there is the first UE action indicated by the DCI, select one or more reference resources, and
   perform the first UE action using the reference resource as a time reference for the first UE action.

9. The apparatus of claim 8, wherein the processing circuitry is configured to select more than one reference resource based determining that there is at least a second UE action indicated by the DCI that is after the reception of the PDCCH.

10. The apparatus of claim 8, wherein the DCI is associated with multiple transmission configuration indicator (TCI)-state PDCCH reception.

11. The apparatus of claim 8, wherein the one or more PDCCH candidates in the duplication set are associated with different TCI states.

12. The apparatus of claim 8, wherein the processing circuitry is further configured to, when Quasi Co-location (QCL) with respect to spatial Rx parameter is configured for at least one transmission configuration indicator (TCI) state in a considered serving cell, determine QCL for a PDSCH, wherein QCL depends on a time offset between reception of the DCI and corresponding scheduled PDSCH.

13. The apparatus of claim 8, wherein the processing circuitry is further configured to, when Quasi Co-location (QCL) with respect to spatial Rx parameter is configured for at least one transmission configuration indicator (TCI) state in a considered serving cell, determine TCI state, wherein the TCI state depends on time offset between reception of the DCI and corresponding scheduled PDSCH.

14. The apparatus of claim 8, wherein the processing circuitry is further configured to, when a time offset is equal to or greater than a threshold, use a first predetermined indication of a transmission configuration indicator (TCI) state or a Quasi Co-location (QCL) for a PDSCH.

15. The apparatus of claim 8, wherein the apparatus is a UE.

16. A network device comprising:
a memory storing executable instructions; and
processing circuitry coupled with the memory that is configured to
determine a duplication set comprising multiple physical downlink control channel (PDCCH) candidates,
determine that there is a first UE action to be indicated by a downlink control information (DCI),
based on the determining that there is the first UE action to be indicated by the DCI, select one or more reference resources,
based on the selection of one or more reference resources, encode DCI, and
transmit the encoded DCI on one or more PDCCH candidates associated with the duplication set.

17. The apparatus of claim 16, wherein the processing circuitry is further configured to, when Quasi Co-location (QCL) with respect to spatial Rx parameter is configured for at least one transmission configuration indicator (TCI) state in a considered serving cell, determine TCI state, wherein the TCI state depends on time offset between reception of the DCI and corresponding scheduled PDSCH.

18. The apparatus of claim 16, wherein the processing circuitry is further configured to, when a time offset is equal to or greater than a threshold, use a first predetermined indication of a transmission configuration indicator (TCI) state or a Quasi Co-location (QCL) for a PDSCH.

19. The apparatus of claim 16, wherein the DCI is associated with multiple transmission configuration indicator (TCI)-state PDCCH reception.

20. The network device of claim 16, wherein the network device is a base station component.

* * * * *